(12) United States Patent
Watanabe

(10) Patent No.: US 12,388,640 B2
(45) Date of Patent: Aug. 12, 2025

(54) IC CHIP WITH AUTO-IDENTIFICATION

(71) Applicant: Yukiko Watanabe, Kaohsiung (TW)

(72) Inventor: Hiroshi Watanabe, Kanagawa (JP)

(73) Assignee: Yukiko Watanabe, Kaohsiung (TW)

( * ) Notice: Subject to any disclaimer, the term of this patent is extended or adjusted under 35 U.S.C. 154(b) by 272 days.

(21) Appl. No.: 18/245,944

(22) PCT Filed: Sep. 7, 2021

(86) PCT No.: PCT/JP2021/032746
§ 371 (c)(1),
(2) Date: May 9, 2023

(87) PCT Pub. No.: WO2022/065016
PCT Pub. Date: Mar. 31, 2022

(65) Prior Publication Data
US 2023/0370264 A1 Nov. 16, 2023

(30) Foreign Application Priority Data

Sep. 22, 2020 (JP) ................... 2020-158045
Feb. 6, 2021 (JP) ................... 2021-017877

(51) Int. Cl.
*H04L 9/30* (2006.01)
*H04L 9/08* (2006.01)

(52) U.S. Cl.
CPC ............... *H04L 9/30* (2013.01); *H04L 9/088* (2013.01)

(58) Field of Classification Search
CPC .................. H04L 9/30; H04L 9/088
See application file for complete search history.

(56) References Cited

U.S. PATENT DOCUMENTS

| 9,018,972 B1 | 4/2015 | Gurrieri et al. |
| 10,177,923 B2 | 1/2019 | Watanabe et al. |
| 10,341,122 B2 | 7/2019 | Watanabe et al. |

(Continued)

FOREIGN PATENT DOCUMENTS

| CN | 105323069 A | 2/2016 |
| JP | H04235652 A | 8/1992 |

(Continued)

OTHER PUBLICATIONS

Antonopoulos, A. M., N T T, Jul. 21, 2016, pp. 67-115 and 176-182, ISBN 978-4-7571-0367-2, specifically, chapters 4, 7, (NTT Publishing Co., Ltd.), non-official translation (Bitcoin and Blockchain).

*Primary Examiner* — Yonas A Bayou
(74) *Attorney, Agent, or Firm* — WPAT, PC

(57) ABSTRACT

An authentication (or identification) of an electronic apparatus is performed using a response to be generated from a specific random number, which is specific to an IC chip included in the electronic apparatus, and a challenge, which is input to the electronic apparatus. A physical firewall, which is composed of the authenticated electronic apparatuses, is configured. Furthermore, a pair of a secret and public keys are generated using the said response. The said public key or a code information generated using the said public key serves as a logical address of the said electronic apparatus. An electronic signature generated using the said secret key is used to perform data transmission between electronic apparatuses inside the physical firewall.

22 Claims, 46 Drawing Sheets

(56) References Cited

U.S. PATENT DOCUMENTS

| | | | |
|---|---|---|---|
| 10,460,824 B2 | 10/2019 | Nagai et al. | |
| 2011/0002461 A1* | 1/2011 | Erhart | G06F 21/73 340/5.83 |
| 2012/0182042 A1* | 7/2012 | Jeong | G11C 29/883 326/9 |
| 2013/0019105 A1* | 1/2013 | Hussain | G06F 21/31 713/189 |
| 2014/0064480 A1* | 3/2014 | Hartley | H04L 9/0877 380/30 |
| 2015/0163211 A1* | 6/2015 | Chellappa | H04L 63/08 713/155 |
| 2015/0188717 A1* | 7/2015 | Wu | H03K 19/003 380/44 |
| 2016/0307194 A1* | 10/2016 | Bhatnagar | H04L 63/0838 |
| 2017/0031412 A1* | 2/2017 | Gendler | G06F 9/38 |
| 2017/0221581 A1* | 8/2017 | Nagai | G09C 1/00 |
| 2018/0019882 A1* | 1/2018 | Watanabe | G06F 21/44 |

FOREIGN PATENT DOCUMENTS

| | | |
|---|---|---|
| JP | 2016513899 A | 5/2016 |
| JP | 2017139757 A | 8/2017 |
| JP | 2018011298 A | 1/2018 |

\* cited by examiner

IC CHIP WITH AUTO-IDENTIFICATION

CROSS REFERENCE TO RELATED APPLICATION

The application is a National Phase Entry of PCT application PCT/JP2021/032746, filed on Sep. 7, 2021, which claims the benefit of Japan Patent application serial No. 2020-158045, filed on Sep. 22, 2020, and serial No. 2021-017877, filed on Feb. 6, 2021, and the entire contents of which are incorporated herein by reference.

FIELD OF THE INVENTION

The present invention relates to memory chip technology with auto-identification.

DESCRIPTION OF THE RELATED ART

The application range of network technologies has been drastically widened as a result of the spread of the internet in the 20-th century. It has been expected that this trend would be reaccelerated as the internet-of-things (IoT) in the 21-th century. On the other hand, IoT network across the borders increases the risk that a hacker outside a nation (in particular, an illegal hacker to commit a crime) remote controls IoT apparatuses.

IoT network is a network of electronic apparatuses. However, the difference from the conventional internet has been left ambiguous indeed.

Cybernetwork is a network among virtual accounts. The current network, if it is IoT network or if it is cybernetwork, are an infrastructure of information communication, wherein electronic data is exchanged. A virtual account is a logical account on the network and naturally different from any electronic apparatus itself. On the internet, there is a physical address for a part of protocol to link this electronic apparatus to a logical address.

Protocol is a routine process to process communication of code information. The encoded routine process itself can be treated with as code information. That is, the protocol is software, and does NOT come from any specific electronic apparatus. While a predetermine specification is satisfied, it can be installed and can equally work in any electronic apparatus. That is, a physical address does NOT come from any specific electronic apparatus. It has been artificially (on protocol) deemed that a certain physical address links to a certain electronic apparatus. A hacker can tamper this physical address anytime.

Nevertheless, electronic apparatuses on the network link each other so that electronic information can surely come and go among them. This link is sometime wired and other time wireless. The tampering of physical addresses is identical to deceive the protocol on the internet, even though there is no problem on information communication between logical addresses, that is, no problem on the cybernetwork.

FIG. 1 is a drawing to illustrate this situation. There is a network comprising the electronic apparatuses A-C (named, the network of electronic apparatuses, IoT network, or physical network) in the above. There is a network comprising logical addresses A-C (named, the logical network or cybernetwork) in the bottom. Dotted lines connecting those above and bottom networks respectively link the electronic apparatuses A-C to the logical addresses A-C. In other words, these dotted lines are physical addresses. The internet protocol (named, the protocol hereinafter) governs information communication among logical addresses with physical addresses.

There is the reason that physical addresses can be altered anytime. It relates to the definition (or the origin) of software itself.

Following the idea of Turing Machine, it is able to code any arithmetic processing that an electronic apparatus can do. By requesting an aggregation of coded processes (i.e., software) to work similarly in any electronic apparatuses having been designed in a same specification, hardware and software can be independently developed. As hardware and software increase their performances independently, it may be sometimes required that software moves from an old hardware to a new one (named, the reinstall of software). In this event, a logical address which is necessary to use software to be reinstalled on the internet is once unlinked from an old hardware (electronic apparatus 1) and is newly linked to a new hardware (electronic apparatus 2). A reverse operation of this is the update of software.

Like this, the edit of physical address (named, the link of electronic apparatus and logical address) is a necessary function to maintain the computing system. The edit of a physical address, if an illegal hacker does it, turns out a fraudulence.

If the gross wherein the internet protocol governs information communication is thus regarded as the internet, then it (the internet) does include the cybernetwork and physical addresses in FIG. 1 but does NOT the electronic apparatus A-C. In other words, as illustrated in FIG. 2, the internet can be divided into the network comprising logical addresses A-C and the dotted lines to link those logical addresses to something (named, physical address). It is particularly important that the internet protocol has no concern in what this something is. If the internet protocol was concerned in such a matter, it would negate the origin of software.

On the contrary, the IoT network (named, the network of electronic apparatuses or physical network) can be obtained by subtracting all components in FIG. 2 from FIG. 1. See FIG. 3. As described above, it turns out that the IoT network (physical network or the network of electronic apparatuses) is inconsistent with what is called the internet at present. However, with no application in FIG. 3, the IoT network cannot do any efficient work.

While FIG. 1 is regarded as the IoT network, an illegal hacker can easily break any security on the cybernetwork (i.e., cybersecurity) by using a method of the spoofing. FIGS. 4-6 are drawings to illustrate an example of the spoofing.

First, like in FIG. 4, an illegal hacker may choose one of regular logical addresses. For example, it is the logical address B. Next, this hacker may exchange it with a logical address (logical address B') having been allocated to an electronic apparatus that he owns (e.g., his laptop). This means that the link of the electronic apparatus B and the logical address B is tampered and then the logical address B is linked to the device that this illegal hacker owns (e.g., his laptop in the figure). The result is as in FIG. 6.

If it is assumed that the link of an electronic apparatus and a logical address (named, the internet protocol) is perfect, then information communication between electronic apparatuses can be regarded as always consistent to that between corresponding logical addresses. This causes a misunderstanding that the network of electronic apparatuses is safe while only the cybersecurity can be enforced enough. It is self-evident that this is a misunderstanding in FIG. 6.

In FIG. 6, there is the laptop that the illegal hacker owns, who has tampered the link of the electronic apparatus B and the logical address B (i.e, the physical address B) and then copied the logical address B to the laptop, between the electronic apparatus A having been allocated with the logical address A and the electronic apparatus C having been allocated with the logical address C. By doing this, the illegal hacker can spoof to become the man in the middle between the electronic apparatuses A and C by using the logical address B that he copied to his laptop.

As described like this, since the spoofing is an attack to use the origin or the definition of software itself, any kind of protections on the software is helpless.

(Man in the Middle Attack)

An illegal hacker can tamper information communication between the electronic apparatuses A and C. The attack like this is called the man in the middle attack. Even though the information communication between the logical addresses A and C was encrypted, it would be impossible to avoid the man in the middle attack. Because the aim of the man in the middle attack is not always the interception of the information communication between the electronic apparatuses A and C. Even though it is unable to steal a glance, it is able to provide false information between the electronic apparatuses A and C to disturb the cooperation of the electronic apparatuses A and C.

An example of main applications of IoT is that plural electronic apparatuses actively cooperate to carry out large-scale complicated operations jointly. A main aim of the man in the middle attack is to remotely disturb the IoT network (the cooperation of electronic apparatuses) that is carrying out these large-scale complicated operations. As IoT has been widespread, the potential damage that the man in the middle attack would cause has become extensive.

For example, the electronic apparatuses composing the IoT network (named, IoT devices) are information terminals like smartphones, tablets, laptops, and PCs, and smart meters, sensors, surveillance cameras, and drones or vehicles with plural sensors etc., and so forth. As illustrated in FIG. 7, these IoT devices are widely deployed in the lowest level of the business model with the top being the artificial intelligence (AI). BigData in the middle level is an aggregation of various information that these IoT devices having been or to be widely deployed in the streets collect. It is expected that the artificial intelligence (AI) in the top level uses it to resolve various problems.

However, if there is an IoT device (electronic apparatus) which has been spoofed, then information tampered by the man in the middle attack is involved into the information communication. It causes the reliability of big data to be questioned. It, thus, increases the risk of the malfunction of the artificial intelligence (AI). In a smart factory, machines to be connected by the high-speed communication like 5G jointly carry out operations. If those machines or control boards etc. are spoofed, then there may be the possibility of the suspension of the smart factory. A vehicle, called a connected car and connected to the internet, mounts plenty of electronic apparatuses. If a part of those electronic apparatuses is spoofed, then the autodriving system may malfunction or, in the worst case, be hijacked.

Like this, it may be self-evident that damage by the spoofing of electronic apparatuses causes the destruction of things, the suspension of factories, the lives and so forth. It is an unprecedented threat which is different from the conventional cyberattack.

FIG. 8 is the drawing to briefly illustrate an example of the protocol that the electronic apparatus A identify (or authenticate) the electronic apparatus B.

First, the electronic apparatus A requests the electronic apparatus B to respond to the identification challenge. For the ease of explanation in this figure, the challenge is written "Hey B, who are you?". But, of course, some kind of digital code (challenge) is, in fact, sent from the electronic apparatus A to the electronic apparatus B. In reply to this, the electronic apparatus B responds, "I am the logical address B". In fact, of course, some kind of electronic code (response) is sent from the electronic apparatus B to the electronic apparatus A.

It might appear that the secure identification was carried out while this exchange of challenge and response (identification communication) is certainly protected by some kind of cybersecurity tool.

FIG. 9 is a drawing to Illustrate an example of challenge and response in the case that the electronic apparatus B is spoofed.

If the electronic apparatus A sends the challenge same as in FIG. 8, "Hey B, who are you?" to the hacker's laptop having spoofed the logical address B, then his laptop responses "I am the logical address B". That is, the set of challenge and response would not change even with the spoofing.

It might appear that the secure identification was carried out while this exchange of challenge and response (identification communication) is certainly protected by some kind of cybersecurity tool. However, it means that the cybersecurity tool protects the communication with the hacker's laptop. That is, even though we try to find out and exclude a spoofed information device from the network, the cybersecurity tool protects hacker's laptop as well.

As mentioned above, how strong the cybersecurity tool is, it is difficult for the cybersecurity to make the measure for the spoofing. It does not differ from using the most advanced cybersecurity tool like the blockchain.

(Real)

Subsequently, let us see how information is transmitted among information apparatuses. First, information is converted into digital data (or data) so that it can be transmitted from an information apparatus to another. Accordingly, it is necessary to know how data is treated with inside each information apparatus.

Most of all information apparatuses, used on the network at present, can be regarded as a Neuman type computer. (Or Neuman computer, or computer). FIG. 10 is to illustrate the flow of data entering into (input) and coming out of (output) computer.

A computer receives an input from the input-output device (I/O) and then forwards it to an arrhythmic unit. The arrhythmic unit accesses memory every time it executes the arrhythmic operation. By tradition, there is a hierarchy with multiple levels in memories. From the top, there are resistor, cash memory (SRAM etc.), main memory (DRAM etc.), and storage memory (flash memory etc.), which does not loose data even though turning off the power, at the bottom layer. In upper layers, the operation speed is high. In lower layers, the bit capacitor is high.

As an example, suppose that an arrhythmic unit includes processor core, resistor, and cash memory. Combining DRAM to this as a stand-along main memory and adding flash memory etc. as necessary, a rough design of information apparatus (or computer) can be obtained. The data quantity that an information apparatus can deal with without DRAM is substantially reduced.

An example of the first information apparatus outputting data via the I/O and then this data is input to the second information apparatus via the I/O is helpful to consider data exchange between information apparatuses. As illustrated in FIG. 11 as an example, data is transmitted from the first information apparatus (top row) to the second information apparatus (middle row).

First, data readout from the memory chip (IC chip) at the top row is forwarded to the arrhythmic unit at the top row. After processing data appropriately therein, this data is output from the I/O at the top row. The output data is exposed to the network and then the I/O to receive it is looked for. When finding the I/O of the receiver at the middle row, the data is included into (input to) the information apparatus at the middle row. After further processing this data appropriately at the middle row, it is written into (stored in) the memory chip at the middle row.

Subsequently, data readout from the memory chip at the middle row is forwarded to the arrhythmic unit at the middle row. After processing data appropriately therein, this data is output from the I/O at the middle row. The output data is exposed to the network and then the I/O to receive it is looked for. When finding the I/O of the receiver at the bottom row, the data is included into (input to) the information apparatus at the bottom row. After further processing this data appropriately at the bottom row, it is written into (stored in) the memory chip at the bottom row.

Like this, it turns out that data is transmitted among chips from the top, middle and to the bottom rows. That is, the monitoring of information flow among information apparatuses is identical to monitor data transmission among memory chips. It should be noted that, in this explanation, any logical address (IP address etc.) allocated in the cyberspace has not been seen.

Let us consider again regarding information exchange among the electronic apparatuses A, B, and C, illustrated in FIG. 1.

The electronic apparatuses A, B, and C in FIG. 1 have the units of information apparatuses (computers) at the top, middle, and bottom rows in FIG. 11, respectively. Or the electronic apparatuses A, B, and C in FIG. 1 are the information apparatuses (computers) at the top, middle and bottom rows in FIG. 11, respectively. That is, information exchanges having been explained in FIGS. 1-6, 8, and 9 are all identical to data transmission (or data communication) among memory chips at the top, middle, and bottom rows in FIG. 11.

However, there is no information regarding the logical address in FIG. 11. That is, there has not been any certainly defined relationship between information exchange in the cyberspace and data communication (or data transmission) in real in the IoT network.
(Cyber)

Next, let us see how information is transmitted in the cyberspace (i.e., logical network) briefly. FIG. 12 is an example of an information transfer method which is adopted in Blockchain etc.

The arrival of information (hash value (N−1)) is the logical account (N) at present. The logical account (N−1) has finally forwarded information (hash value (N−1)) to this logical account (N). In the logical account (N−1), this hash value (N−1) has been generated using the hash value (N−2). The logical account (N−2) has finally forwarded information (hash value (N−2)) to this logical account (N−1). In the logical account (N−2), this hash value (N−2) has been generated using the hash value (N−3).

The public keys (N), (N−1), and (N−2) respectively correspond to the logical addresses of those logical accounts. The public keys (N), (N−1), and (N−2) are uniquely linked to the secret keys (N), (N−1), and (N−2) by the public key encryption infrastructure (PKI), respectively.

The logical account (N−2) obtains the public key (N−1) that is public on the network and serves as the logical address of the logical account (N−1), and then converts the public key (N−1) and the hash value (N−3) to the electronic signature (N−2) using the secret key (N−2). Furthermore, the logical account (N−2) generates the hash value (N−2) by hashing the set of the public key (N−2), the hash value (N−3) and the electronic signature (N−3). Then, the logical account (N−2) transfers the hash value (N−2) as well as the electronic signature (N−2) to the logical account (N−1).

The logical account (N−1) obtains the public key (N) that is public on the network and serves as the logical address of the logical account (N), and then converts the public key (N) and the hash value (N−2) to the electronic signature (N−1) using the secret key (N−1). Furthermore, the logical account (N−1) generates the hash value (N−1) by hashing the set of the public key (N−1), the hash value (N−2) and the electronic signature (N−2). Then, the logical account (N−1) transfers the hash value (N−1) as well as the electronic signature (N−1) to the logical account (N).

However, in FIG. 12, there is not any information regarding the memory chips of information apparatuses. That is, there has not been any certainly defined relationship between information exchange in the cyberspace and data communication (or data transmission) in real in the IoT network.

SUMMARY OF THE INVENTION

The present invention has been made considering the above-mentioned situation. The present invention aims to provide a technology to automatically inspect the spoofing of electronic apparatuses (information apparatuses or information terminals) and to automatically exclude spoofed electronic apparatuses while using the advanced cybersecurity tools with Blockchain etc.

The present disclosure adopts the following methods in order to solve the above-mentioned problems.

The solution that this invention provides is characteristics of a network electronic apparatus, which comprises plural electronic apparatuses, wherein, M of the said plural electronic apparatuses are the first to M-th inspection devices, at least one of the others among the said plural electronic apparatuses is an inspector, the said first to M-th inspection devices are the first to M-th peripheral devices, respectively, the said inspector inputs the first challenge to the said first to M-th peripheral devices, the said first to M-th peripheral devices respectively return the first to M-th responses to the said inspector in response to the said first challenge according to a response function, the said first to M-th responses form the first response set, which comprises the said first to M-th responses, the said inspector stores the said first challenge and the said first response set, at least one of the said first to M-th peripheral devices receives the second challenge to be sent from the said inspector, generates the (M+1)-th response, and then generates the pair of the (M+1)-th secret key and the (M+1)-th public key from the said (M+1)-th response, the said first to M-th peripheral devices respectively comprise the first to M-th IC chips, the said response function has the arguments, the said first challenge as well as the specific random numbers that are respectively specific to the said first to M-th IC chips, and respectively generates the said first to M-th responses, the said response function has the arguments, the said second challenge as well as the specific random number that is specific to the IC chip to which the said second challenge was input, and then generates the said (M+1)-th response. Or, the solution that this invention provides is characteristics of a network of electronic apparatuses, which comprises plural electronic apparatuses, wherein, M of the said plural electronic apparatuses are the first to M-th inspection devices, at least two of the others of the said plural electronic apparatuses are the first and second inspectors, the said first to M-th inspection devices are respectively the first to M-th peripheral devices, the said first inspector inputs the first challenge to the said first to M-th peripheral devices, the said first to M-th peripheral devices respectively respond the first to M-th responses to the said first inspector in response to the said first challenge according to a response function, the said first to M-th responses form the first response set, which comprises the said first to M-th responses, the said first inspector stores the said first challenge and the said first response set, the said first peripheral device receives the second challenge to be sent from the said second inspector, generates the (M+1)-th response, and then generates the pair of the (M+1)-th secret key and the (M+1)-th public key using the said (M+1)-th response, the said first to M-th peripheral devices respectively comprise the first to M-th IC chips, the said response function has the arguments, the said first challenge as well as the specific random numbers that are respectively specific to the said first to M-th IC chips, and respectively generates the said first to M-th responses, the response function has the arguments, the said second challenge as well as the specific random number that is specific to the first IC chip to which the said second challenge was input, and then generates the said (M+1)-th response.

The solution that the present invention provides has, further, the following characteristics. The said IC chip has cell array, row decoder, peripheral controller, code generator, specific inner memory, and external input-output, wherein, the said cell array is divided into the first and second cell arrays, the said row decoder is divided into the first and second row decoders, wherein, the said first and second row decoders respectively control access to the said first and second cell arrays, the said peripheral controller receives the code of retrieving redundancy mode and the challenge from the said external input-output, controls the said first and second row decoders based on the said code of retrieving redundancy mode, forwards the said challenge to the said code generator, retrieves the said specific random number from the access to the said first and second cell arrays based on the redundancy code stored in the said specific inner memory, and then forwards the said specific random number to the said code generator, the said code generator uses the said response function, generates the said response from the said challenge and the said specific random number, and then forwards the said response to the external input-output, the said external input-output receives input of the said code of retrieving redundancy mode and the said challenge from the external, receives the said response from the said code generator, and outputs or enables for outputting the said response to the external of the said IC chip.

The solution that the present invention provides has, further, the following characteristics. The solution that this invention provides is characteristics of a network of electronic apparatuses, which comprises plural electronic apparatuses, wherein, the first electronic apparatus is an inspector and the second electronic apparatus is an inspection device among the said plural electronic apparatuses, the said inspector inputs a challenge to the said second electronic apparatus, the said second electronic apparatus generates a response in response to the said challenge based on a response function, the said second electronic apparatus has at least one IC chip, the said IC chip has cell array, row decoder, column decoder, peripheral controller, code generator, specific inner memory, and external input-output, wherein, the said cell array is divided into the first and second cell arrays, the said row decoder is divided into the first and second row decoders, wherein, the said first and second row decoders respectively control access to the said first and second cell arrays, the said peripheral controller receives the code of retrieving redundancy mode and the said challenge from the said external input-output, controls the said first and second row decoders based on the said code of retrieving redundancy mode, forwards the said challenge to the said code generator, retrieves a specific random number that is specific to the said IC chip from the access to the said first and second cell arrays based on the redundancy code stored in the said specific inner memory, and forwards the said specific random number to the said code generator, the said code generator generates the said response using the said challenge and the said specific random number, the said external input-output receives input of the said code of retrieving redundancy mode and the said challenge from the external, receives the said response from the said code generator, and outputs the said response to the external of the said IC chip, the said code of retrieving redundancy mode has the setting option of authentication, the mode of indicating exclusive bit, the access option, and the operation option, wherein, the said cell array is divided into plural subblocks, the said IC chip, further, has the table of cell block addresses, the said table of cell block addresses is the correspondence table of an arbitrary address on the said cell array and a set of a subblock address and an inner address inside a subblock, the said mode of indicating exclusive bit has an address of indicated bit (indicated bit address) as an argument, the said indicated bit address is an exclusive authentication bit inside the said subblock, the said setting option of authentication comprises authentication mode and non-authentication mode, the said exclusive authentication bit is selected as a selected bit address inside the said subblock if the said authentication mode is chosen, a bit other than the said exclusive authentication bit is selected as a selected bit address inside the said subblock if the said non-authentication mode is chosen, the said access option controls the set of the said column decoder and the said first and second row decoders, and instructs access to each bit address on the said cell array, the said operation option has those of write, erase and read at the said each of bit address, the said peripheral controller reads the said specific random number from the said cell array, based on the said redundancy code, by switching the set of the said access option and the said operation option, if the said authentication mode is chosen, the said response function generates the said response using the said challenge and the said specific random number that is specific to the said IC chip as arguments. Or, the solution that the present invention is characteristics of a network of electronic apparatuses, which comprises plural electronic apparatuses, wherein, the first electronic apparatus is an inspector and the second electronic apparatus is an inspection device among the said plural electronic apparatuses, the said inspector inputs a challenge to the said second electronic apparatus, the said second electronic apparatus generates a response in response to the said challenge based on a response function, the said second electronic apparatus has at least one IC chip, the said IC chip has cell array, row decoder, column decoder, peripheral controller, code generator, specific inner memory, and external input-output, wherein, the said cell array is divided into the first and second cell arrays, the said row decoder is divided into the first and second row decoders, wherein, the said first and second row decoders respectively control access to the said first and second cell arrays, the said peripheral controller receives the code of retrieving redundancy mode and the said challenge from the said external input-output, controls the said first and second row decoders based on the said code of retrieving redundancy mode, forwards the said challenge to the said code generator, retrieves a specific random number that is specific to the said IC chip from the access to the said first and second cell arrays based on the redundancy code stored in the said specific inner memory, and forwards the said specific random number to the said code generator, the said code generator generates the said response using the said challenge and the said specific random number, the said external input-output receives input of the said code of retrieving redundancy mode and the said challenge from the external, receives the said response from the said code generator, and outputs the said response to the external of the said IC chip, the said code of retrieving redundancy mode has the setting option of authentication, the mode of indicating exclusive column, the access option, and the operation option, wherein, the said mode of indicating exclusive column has an indicated column number as an argument, the said setting option of authentication comprises authentication mode and non-authentication mode, the said indicated column number indicates an exclusive authentication column and the said exclusive authentication column is selected as a selected column, if the said authentication mode is chosen, A column other than the said indicated column number is chosen as a selected column, if the said non-authentication mode is chosen, the said access option chooses the set of the said first and second row decoders, and then instructs access to addresses defined by the set of the said row decoder and the said chosen column, the said operation option has those of write, erase and read at the said bit address, the said peripheral controller reads the said specific random number from the said cell array, based on the said redundancy code, by switching the set of the said access option and the said operation option, if the said authentication mode is chosen, the said response function generates the said response using the said challenge and the said specific random number that is specific to the said IC chip as arguments.

DETAILED DESCRIPTION OF THE INVENTION

Below, the most preferable embodiments for carrying out the invention is concretely illustrated.

In the present invention, as illustrated above, the communication system of digital information, wherein, the identification (or authentication) of an electronic apparatus (electron device) is carried out to form a physical firewall, which comprises the authenticated electronic apparatuses, using the specific random number that is included in the IC chip mounted in the electronic apparatus and the first challenge (input) to the electronic apparatus, and, furthermore, the pair of secret and public keys are obtained using the second response that can be obtained by inputting the second challenge to the said IC chip, the said public key or code information to be generated from the said public key serves as the logical address of the said electronic apparatus, and the electronic signature to be generated using the said secret key is used for data transmission (data exchange) between electronic apparatuses inside the physical firewall, is proposed.

Below, the present invention will be concretely explained using the drawings.
(Fusion of Cyber and Real)

Figure 1:
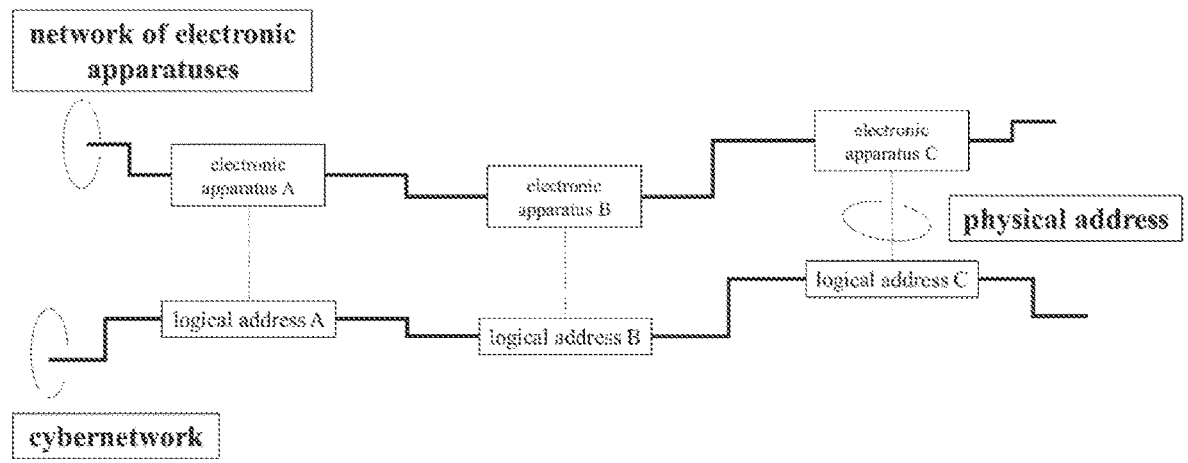
FIG. 1 is a drawing to illustrate an example of a relationship between a network of electronic apparatuses and a cybernetwork (logical network).
Figure 2:
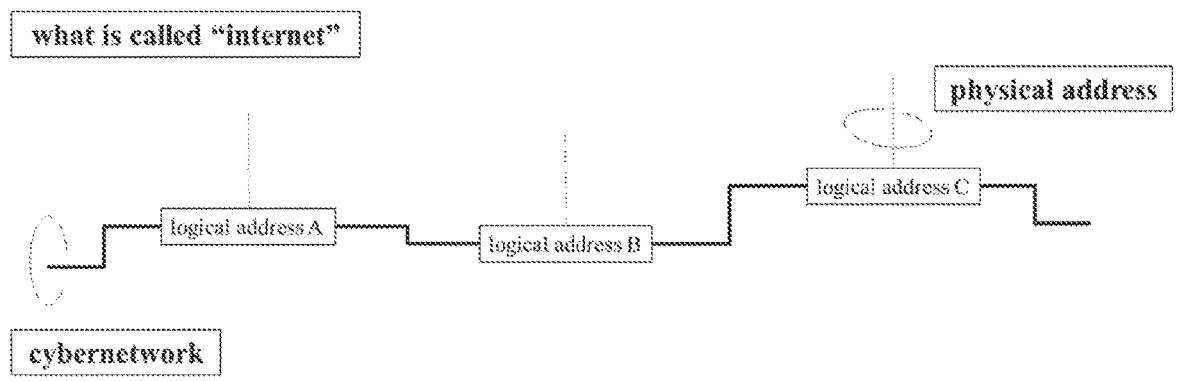
FIG. 2 is a drawing to illustrate an example of a relationship between a network of electronic apparatuses and a cybernetwork (logical network).
Figure 3:
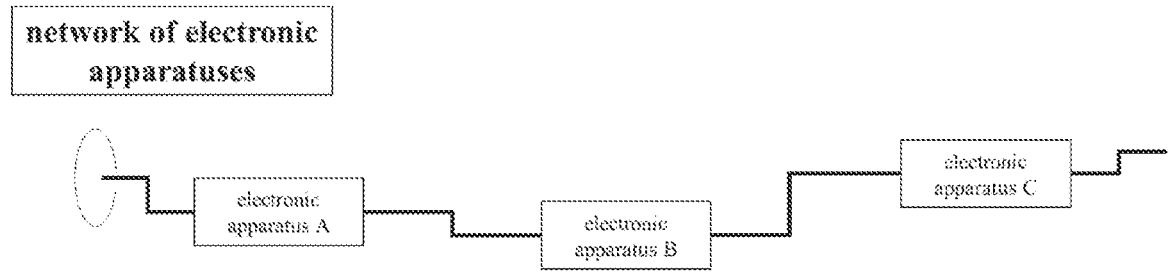
FIG. 3 is a drawing to illustrate an example of a network of electronic apparatuses.
Figure 4:
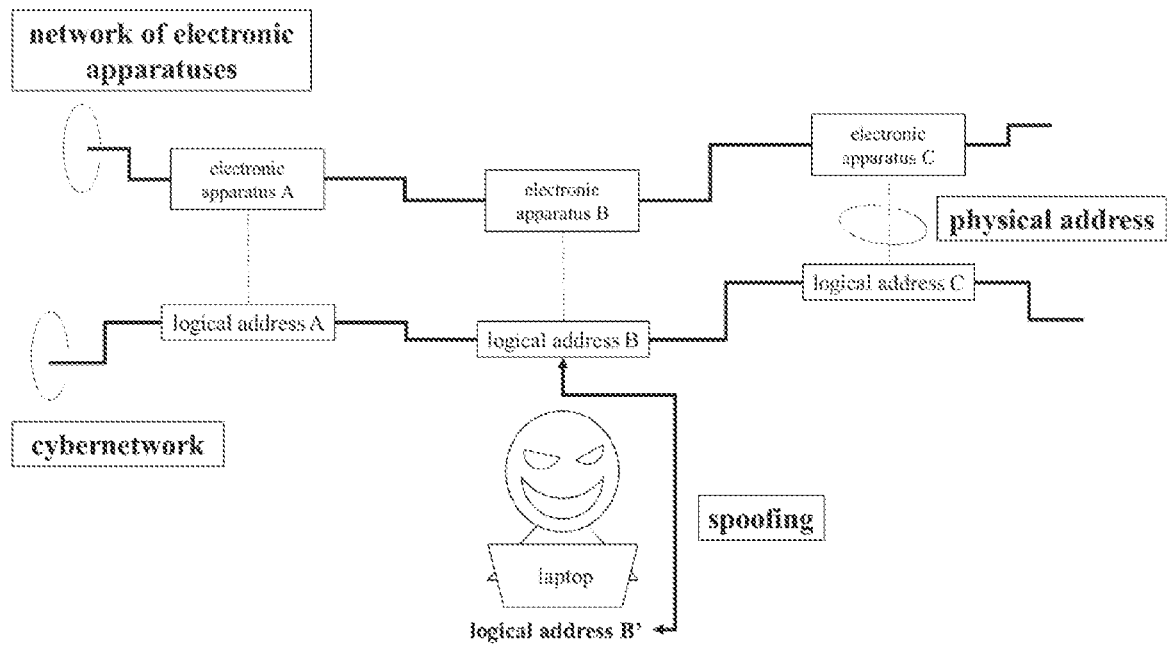
FIG. 4 is a drawing to illustrate an example of the spoofing.
Figure 5:
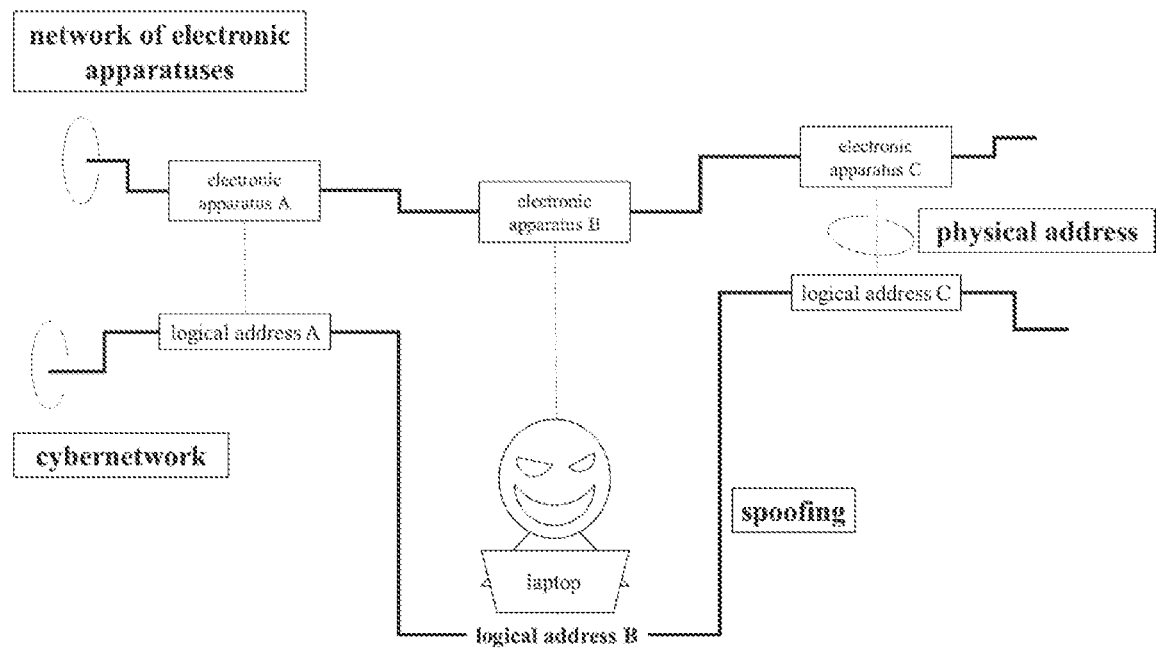
FIG. 5 is a drawing to illustrate an example of the spoofing.
Figure 6:
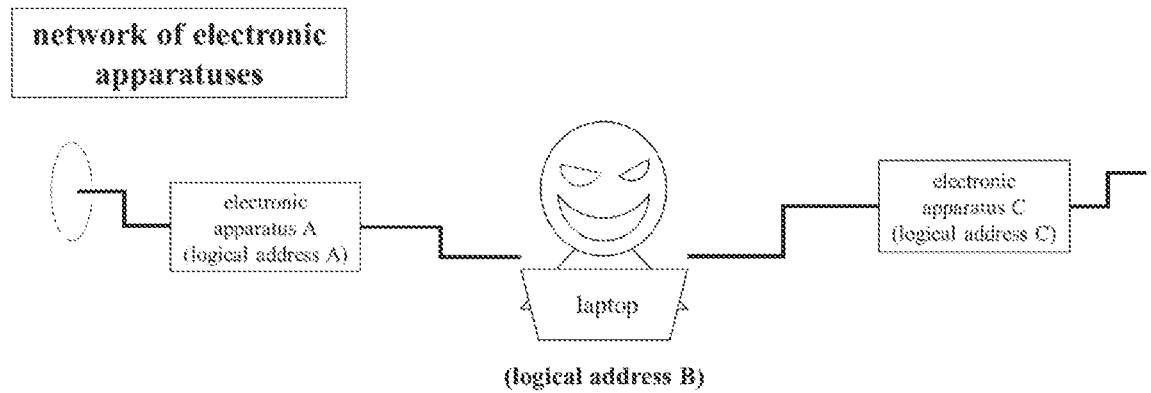
FIG. 6 is a drawing to illustrate an example of a network with a spoofed electronic apparatus.
Figure 7:
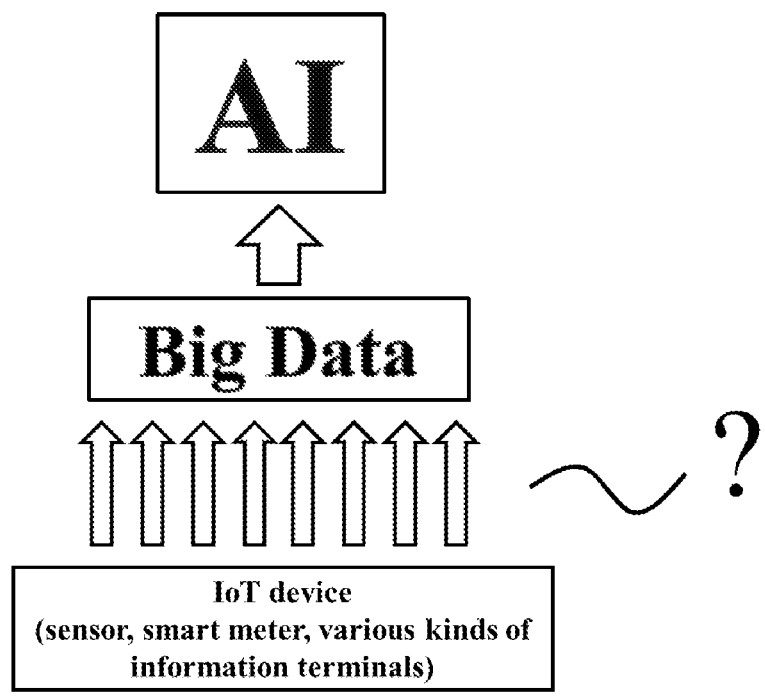
FIG. 7 is a drawing to illustrate a relationship of AI, bigdata, and IoT network in the industrial applications.
Figure 13:
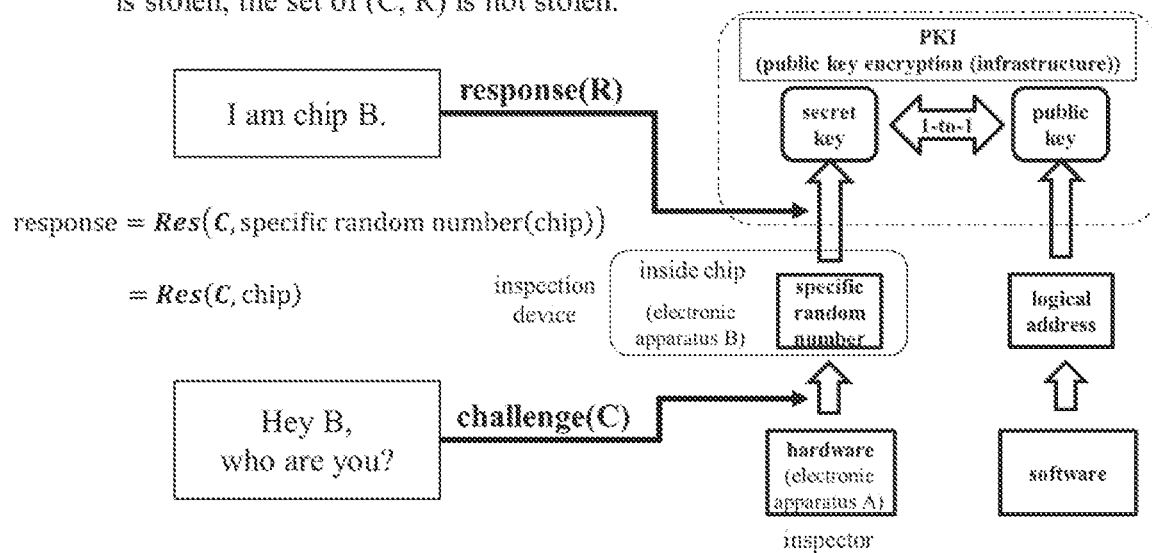
FIG. 13 is a drawing to illustrate a concept of the method to authenticate an electronic apparatus of the present invention.

FIG. 13 is a drawing to conceptually illustrate the method to respectively link the electronic apparatuses A, B, and C in FIG. 1 to the logical addresses A, B, and C in FIG. 1.

The PKI uniquely links the secret and public keys. The public key is identical to a logical address on the cyberspace or corresponds to it. The logical address is identical to an account of software (application or just say "app") operating on the cyberspace or corresponds to it. However, it is practically hard to reproduce the secret key from the public key.

Figure 10:
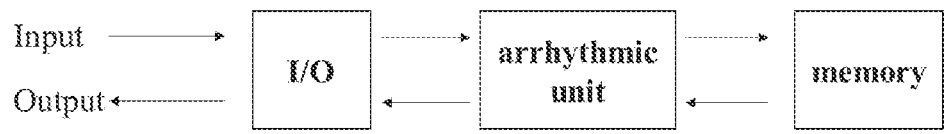
FIG. 10 is a drawing to illustrate an example of the mechanism of data input-output and memory.

The electronic apparatus B is an inspection device to be inspected by the electronic apparatus A that is the inspector. The inspection device can be authenticated if it passes the inspection by the inspector. The electronic apparatus B has a semiconductor chip (TC chip, or just say "chip"). As an example, it has the memory chip in FIGS. 10 and 11 inside.

Figure 8:
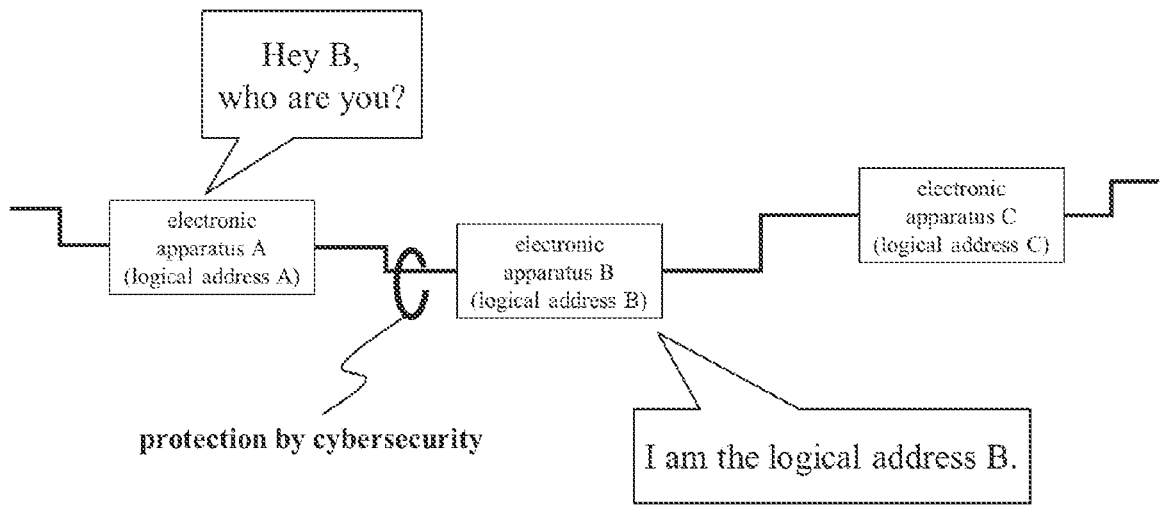
FIG. 8 is a drawing to illustrate an example of the method to authenticate an electronica apparatus.
Figure 9:
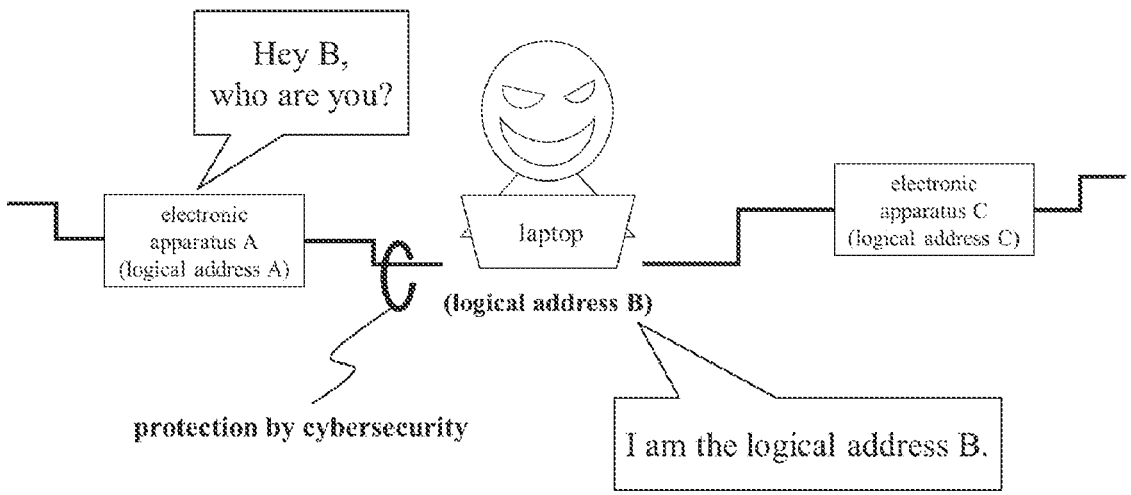
FIG. 9 is a drawing to illustrate an example of the method to authenticate an electronic apparatus in a case with the spoofing.

The electronic apparatus A sends the challenge C to the electronic apparatus B. As an example, it may be "Hey B, who are you?" in FIGS. 8 and 9.

The chip mounted inside the electronic apparatus B has a random number (specific random number) which is specific to that chip. The response R can be generated from the said challenge C and this specific random number. While the said specific random number is specific to the chip, this response R can be regarded as the specific response to the said chip and the challenge C. As an example, it may be "I am chip B" in FIGS. 13 and 28.

However, the relationship of the response, the challenge C to be input to the chip to be inspected, the specific random number that is specific to the chip to be inspected can be described using the function Res.

$$\text{Response}(R) = \text{Res}(C, \text{specific random number}(\text{chip})) \quad \text{Eq. 1}$$

A hacker can read and copy this specific random number if he can access the inspection device (e.g., the electronic apparatus B). However, if the hacker doesn't know which challenge C the inspector (electronic apparatus A) will input, then the hacker can hardly predict the response R. The inspector (the electronic apparatus A) stores the pair of the challenge C and the response R and can always use the pair for the authentication of the inspection devices. Important here is that the specific random number is not practically used for the authenticate inspection.

While the specific random number is specific to the chip, that is, the specific random number can be regarded as holding the one-to-one relationship with the chip, the relation in Eq. 1 can be rewritten as follows.

$$\text{Response}(R) = \text{Res}(C, \text{chip}) \quad \text{Eq. 2}$$

Any relationship of specific random number and chip may be allowable while this relationship in Eq. 2 is satisfied. As an example, the randomness occurring in the manufacturing of the chip can be used to generate the specific random number. However, any data that is rewritable from the external using some kind of method cannot be regarded as specific to the chip.

Figure 14:
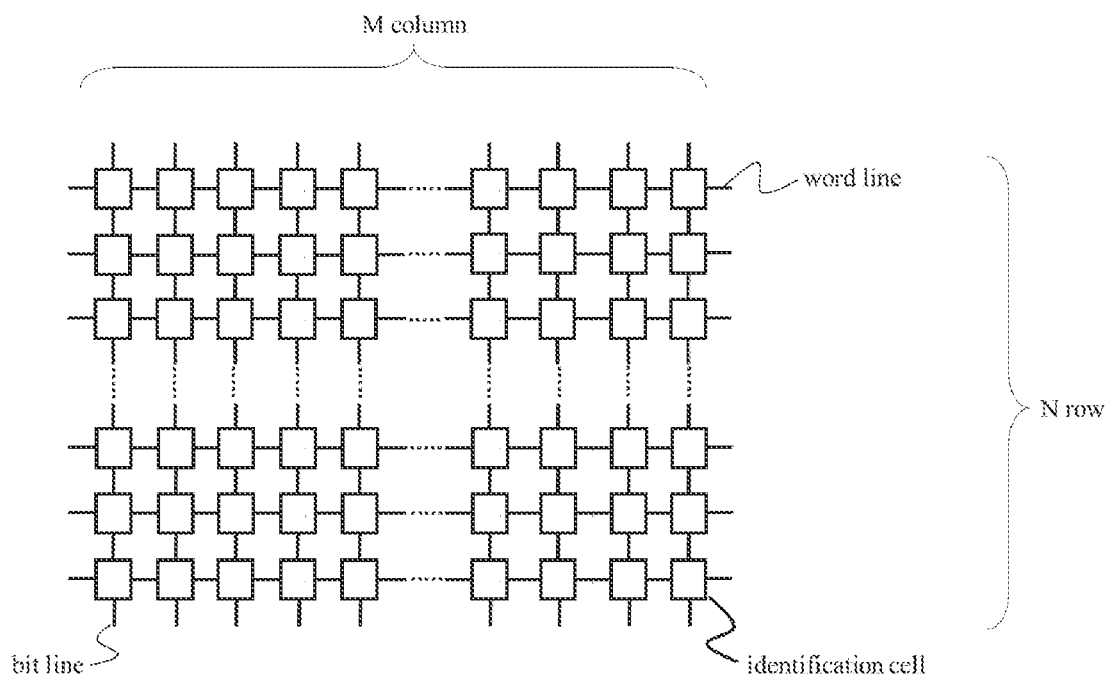
FIG. 14 is a drawing to illustrate an example of the cell array of identification cells.

For example, let us consider the N times M electron cells, which are arrayed on the N rows and M columns on the chip, as illustrated in FIG. 14. However, N is a natural number no smaller than 1 and M is a natural number no smaller than 1. In the present invention, those electron cells are called identification cells. The characteristics of identification cells vary due to the production tolerance of chip manufacturing. It is impossible to perfectly exclude this variation though it is always required to be excluded as possible in the mass-production. The numeral to which this variation over identification cells is converted can be converted to a physical random number in FIG. 14 by expressing that numeral on the cell array.

For example, let us measure a certain electrical characteristics of identification cells. The measured identification cell may be regarded as holding data-1 (or just say "1") if the measured characteristic result is higher than a predetermined value. Otherwise, the measured identification cell may be regarded as holding data-0 (or just say "0"). That is, the identification cells holding either "1" or "0" are distributed on the cell array in FIG. 14. Converting "0" to white and "1" to black, for example, it may turn out being a pattern like in FIG. 15. If both M and N is enough larger than 1, then this pattern turns out being a two-dimensional checkerboard pattern. If either M or N is one, then this pattern turns out being a one-dimensional pattern. Anyway, if the occurrence of "0" or "1" over identification cells is dependent of the product tolerance of chips, then this pattern of white and black may be physically random and different over the chips. The probability that two chips has a same pattern accidentally gets smaller as either M or N increases. Since M and N are controllable by the cell array design, it is not difficult to suppress the possibility that two chips have a same pattern accidentally to be less than an allowable range by using the cell array design. Like this, the specific random number that is expressed by layout of plural numerals (e.g., "0" and "1") can be called specific random number code (or just say "random code").

Figure 17:
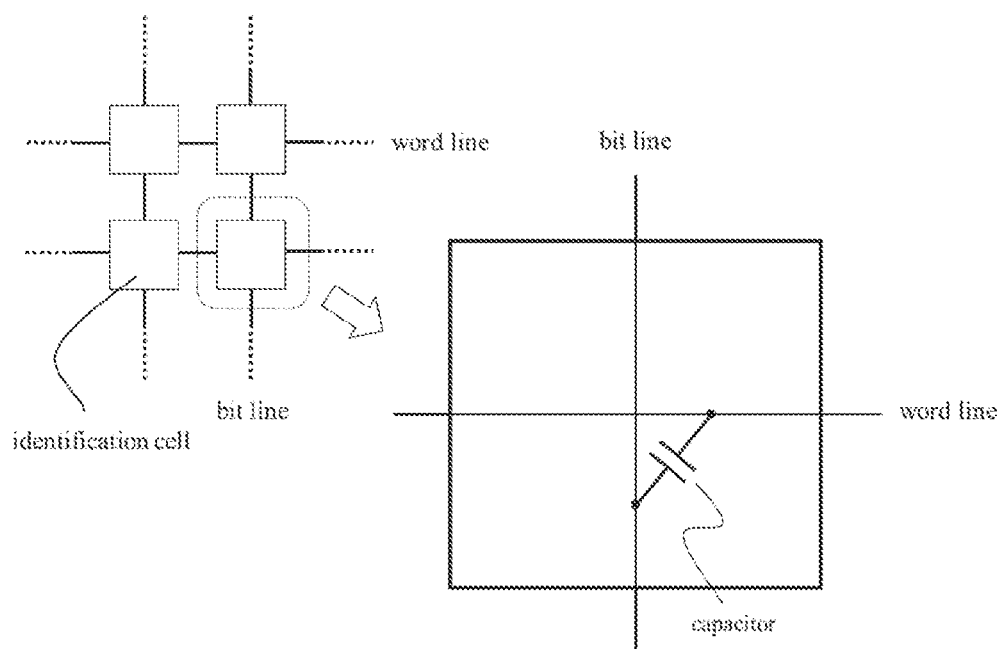
FIG. 17 is a drawing to illustrate an example with an identification cell being a capacitor.
Figure 18:
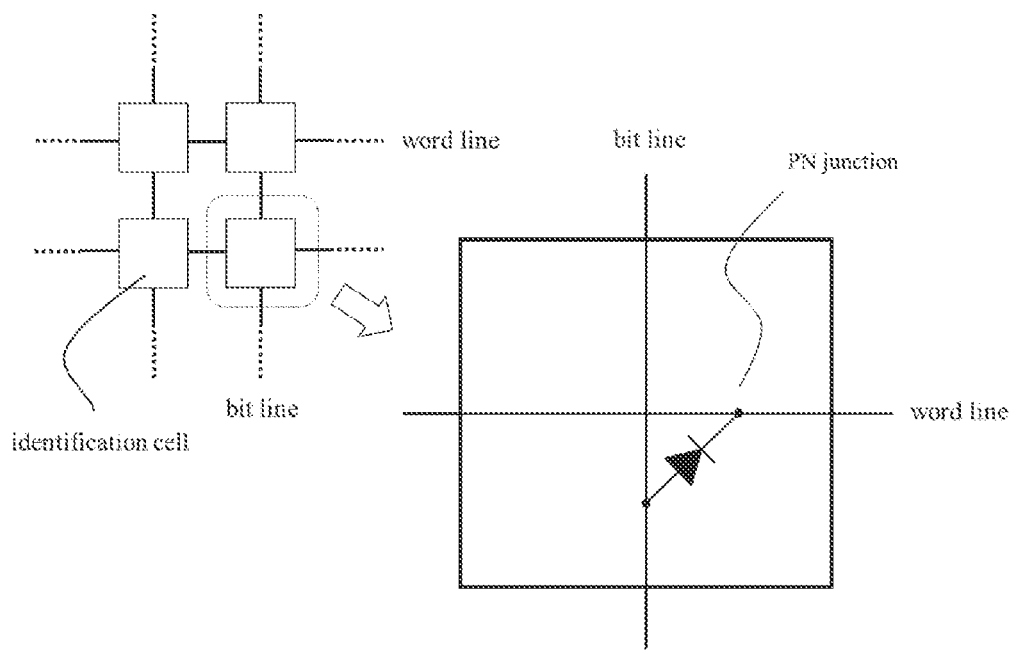
FIG. 18 is a drawing to illustrate an example with an identification cell being a PN junction.
Figure 19:
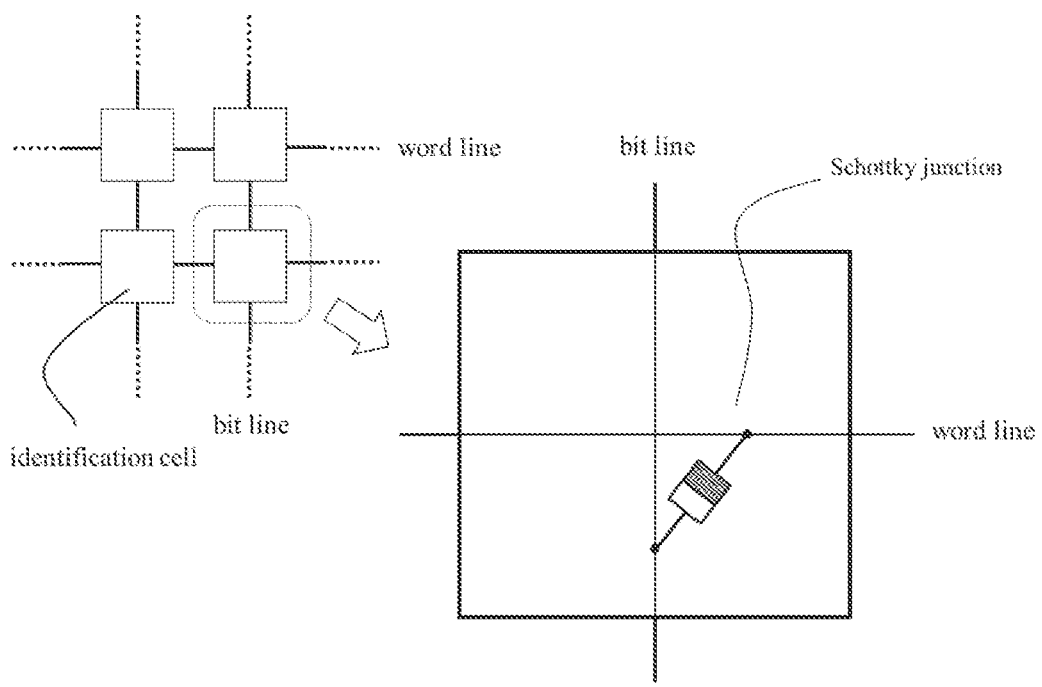
FIG. 19 is a drawing to illustrate an example with an identification cell being a Schottky junction.
Figure 21:
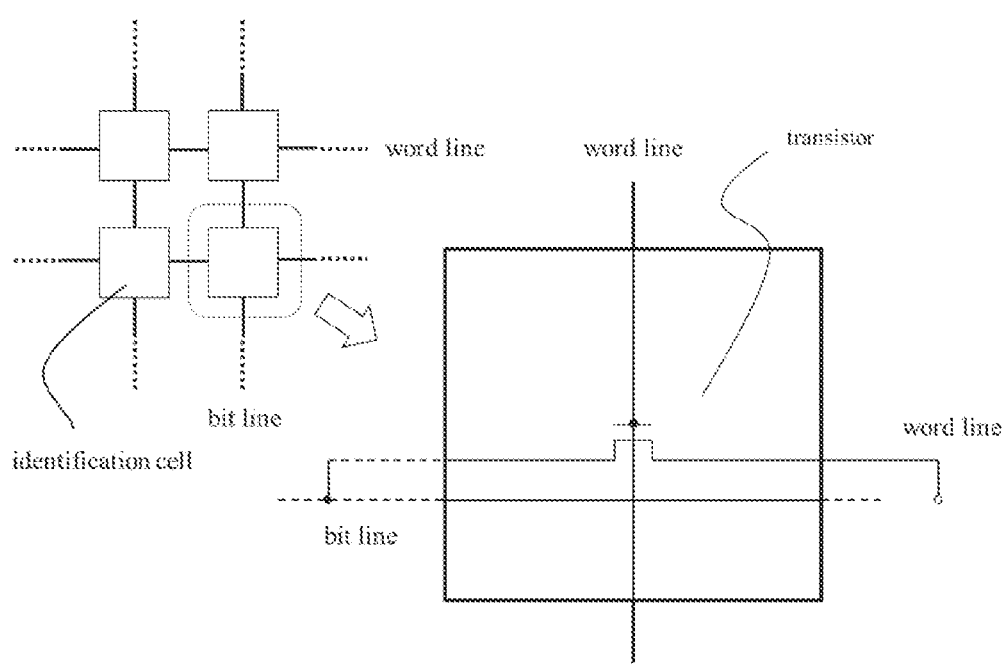
FIG. 21 is a drawing to illustrate an example with an identification cell being a transistor.
Figure 22:
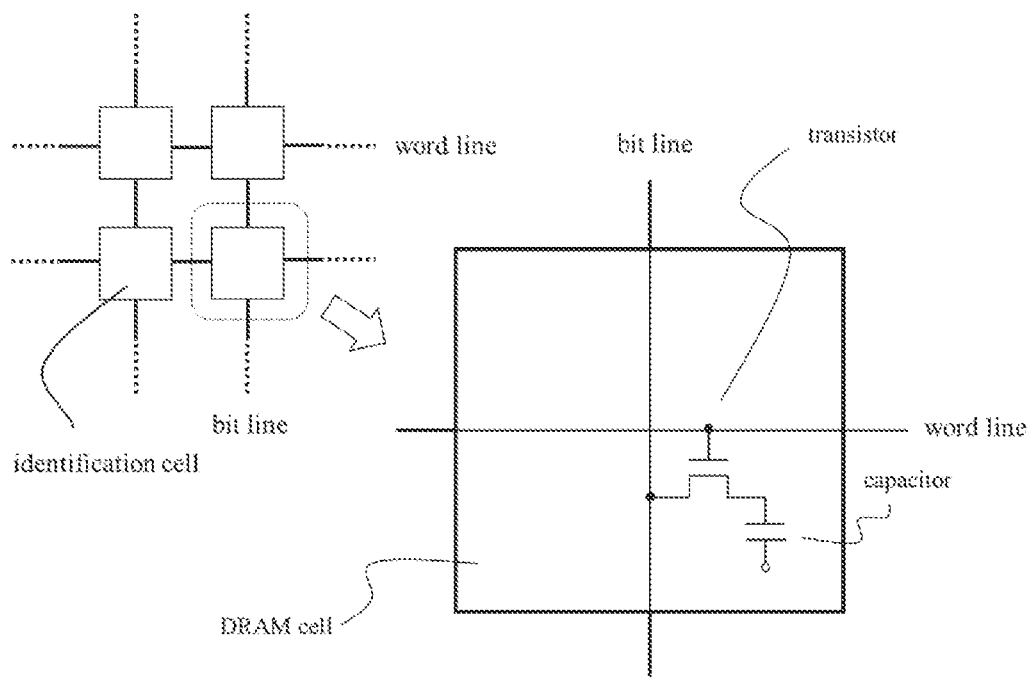
FIG. 22 is a drawing to illustrate an example with an identification cell being a DRAM cell made of a transistor and a capacitor.
Figure 23:
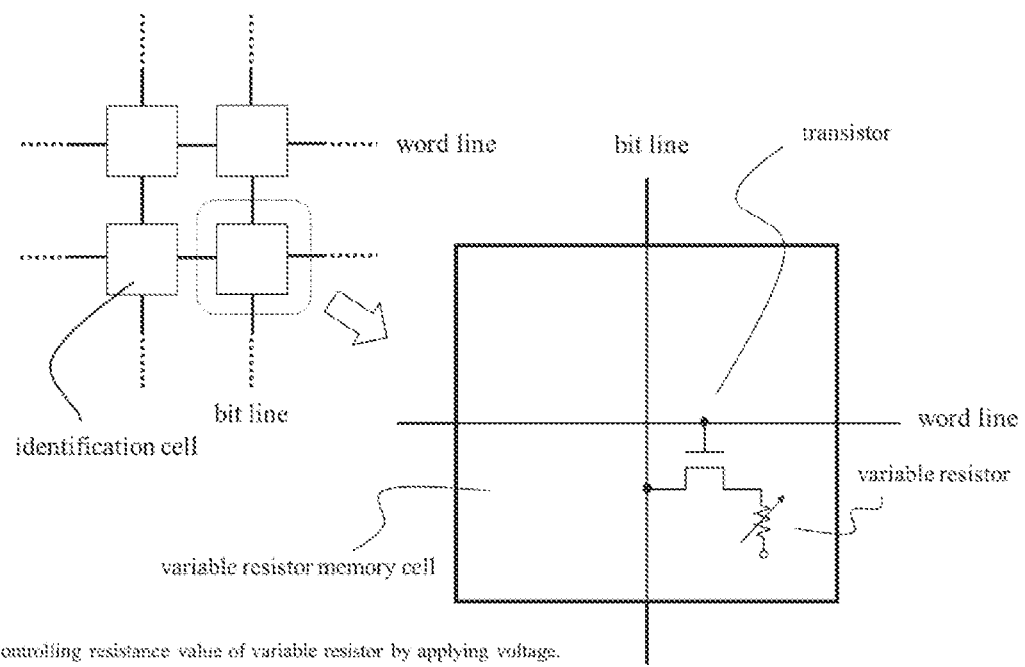
FIG. 23 is a drawing to illustrate an example with an identification cell being a nonvolatile memory cell made of a transistor and a variable resistor.
Figure 24:
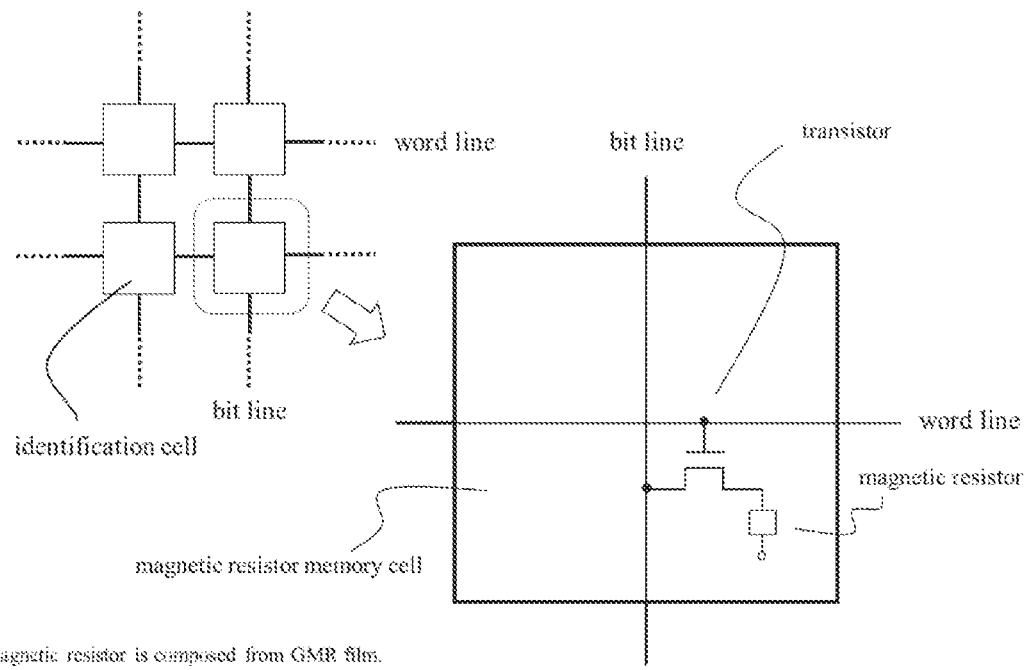
FIG. 24 is a drawing to illustrate an example with an identification cell being a nonvolatile memory cell made of a transistor and a magnetic resistance.
Figure 25:
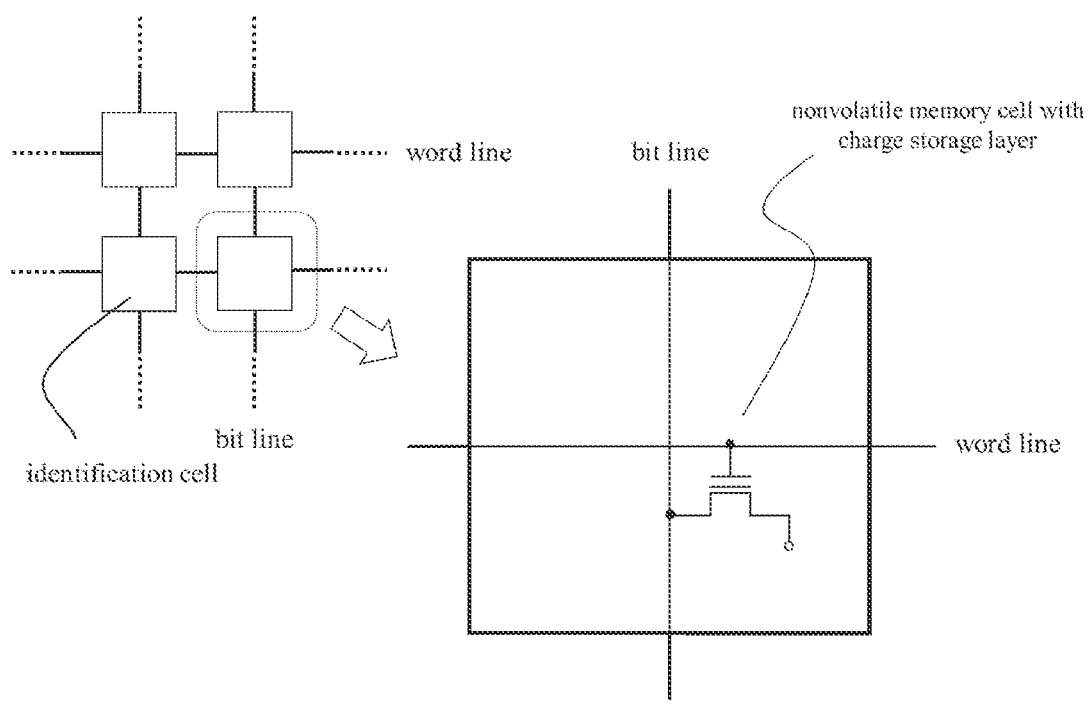
FIG. 25 is a drawing to illustrate an example with an identification cell being a nonvolatile cell with a charge storage layer.
Figure 26:
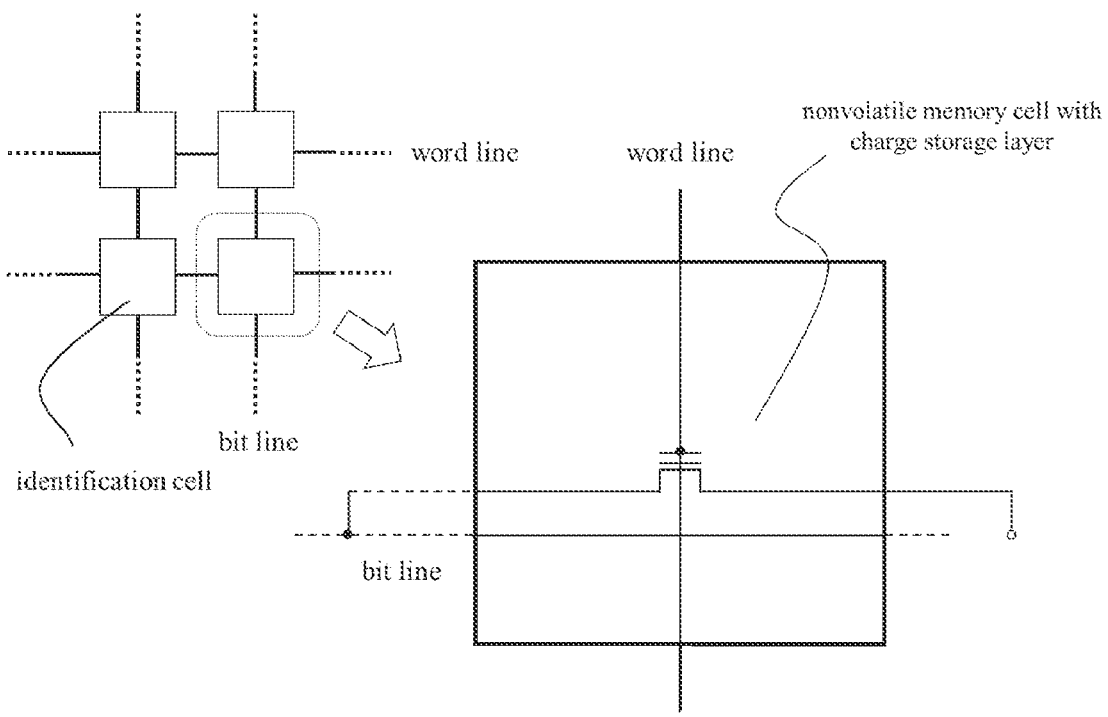
FIG. 26 is a drawing to illustrate an example with an identification cell being a nonvolatile memory cell with a charge storage layer.

For example, the identification cells may be resistors (FIG. 16), capacitors (FIG. 17), PN junctions (FIG. 18), Schottky junctions (FIG. 19), transistors (FIGS. 20 and 21), memory cells (FIGS. 22-26) and so forth. In particular, FIG. 22 is an example wherein the identification cell is a DRAM cell which can be made of the set of transistor and capacitor. FIG. 23 is an example, wherein the identification cell is a non-volatile memory cell with variable resistance. The identification cell may turn out being a resistive change memory (ReRAM etc.) if the variable resistance can be changed by input voltage. The identification cell may turn out being a phase change memory (PCRAM) if the variable resistance can be changed by using the phase change of crystal-amorphous, which can occur by heating. In FIG. 24, the identification cell is a non-volatile memory cell with magnetic resistance. The identification cell turns out being an MRAM cell if the magnetic resistance is changed by using the giant magnetoresistance (GMR). The identification cell turns out being an STT-MRAM cell if the magnetoresistance is changed by using the spin-torque-transfer (STT) effect. In the examples of FIGS. 25 and 26, the identification cell is a non-volatile memory cell with charge storage layer. The identification cell turns out being a charge-trapping non-volatile memory cell if the charge storage layer is a charge trapping. The identification cell turns out being a floating gate (FG) non-volatile memory cell if the charge storage layer is FG. In general, it may be allowable to make an identification cell from any one or more of the above-mentioned cells (resistors, capacitors, PN junctions, Schottky junctions, transistors, memory cells etc.). Accordingly, though not illustrated especially since it is self-evident, it may be allowable to make an identification cell by combining any two or more of the above-mentioned cells (resistors, capacitors, PN junctions, Schottky junctions, transistors, memory cells etc.). It may be self-evident that, if an identification cell is made by combining any two or more of the above-mentioned cells (resistors, capacitors, PN junctions, Schottky junctions, transistors, memory cells etc.), at least two of combined cells are serially connected or parallelly connected.

Or, as another example, it may be allowable that a specific random number having been separately generated using a random number generator etc. is converted to a code of "0" and "1" and then written to the cell array in FIG. 14 after chip fabrication. In this event, it may be preferable that an identification cell composing the cell array in FIG. 14 is a one-time programmable (OTP) memory cell. In OTP, memory cells are intentionally broken or wiring lines are intentionally short (i.e., an intentional breakdown of resistor cells). As a result, any of the identification cells in FIGS. 16-26 can be adopted for an OTP memory cell.

Though plural methods are allowable for the physical random number generator, the method using a quantum bit may be most unpredictable among them. There are both states of "0" and "1" simultaneously in a quantum bit. According to theory of measurement problem in quantum mechanics, read state is decided to be either "0" or "1" stochastically. It is theoretically impossible to predict its readout result in advance. A random number code is a stringed out results of repeated readouts of "0" and "1" from a quantum bit. In the current technologies, it is still not easy to integrate many quantum bits in a semiconductor chip. Accordingly, it may be required to write a random number code to be generated by reading out a quantum bit having been prepared separately from the chip identification device of the present invention to a cell array of the chip identification device of the present invention. Of course, another physical mechanics may be allowable for the random number code generation method, while not depart from the concept of the present invention.

Regardless of methods to generate a random number code in the external of chips, it should be prohibited to store a code which is identical to a random number code to be stored in the cell array of a certain chip into the cell array of another chip. It should be required to restrict the authority of writing a random number code having been generated in the external of a chip into the cell array inside the chip to the entities relating to the chip manufacturing, the chip distribution, the usage of chips, etc. That is, if the random number code is generated in the external of the chip, the method to control the risk of human error within an allowable range is necessary.

To avoid a same random number code to be accidentally written in the cell arrays of two different chips, the bit length of a random number code to be generated is large enough. Depicting this bit length and the number of chips having the cell arrays wherein random number codes are written, Q and U, respectively, it may be allowable that the quotient of two to the power of Q by U, is a large enough number. As an example, let us consider a specification fitting for trillion nodes. While U is ten trillion, the number of cases of random number code can be about one trillion for Q=40. Thus, it turns out that Q is at least much larger than 44. When Q is 50, the probability that two random number codes are accidentally identical among those having been written in globally distributed chips is lower than one-to-one million. That is, it may be preferable that the information quantity of random number code is longer than 50 bits.

In other words, as an example, it may be allowable to read a state of a quantum bit 50-times per one chip. Or it may be allowable to read states of two quantum bits 25-times per one chip. Or it may be allowable to read states of M quantum bits not smaller than 50/M-times per one chip. Thus, the readout results may be written in some area with more than 50 bits in the cell array of the chip.

In order to avoid the falsification of once regularly written random number codes, the cell array to store the said random number code having been separately generated is required to be non-rewritable. It may be preferable that such a cell array is a one-time programmable (OTP) memory.

Figure 15:
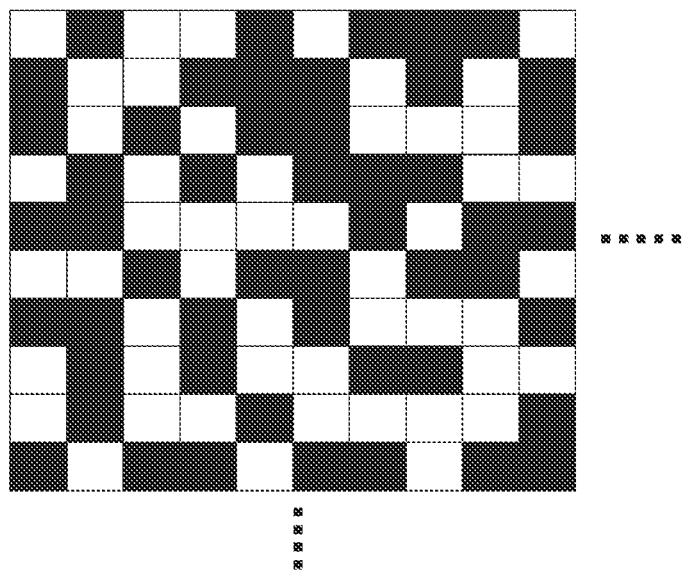
FIG. 15 is a drawing to illustrate the distribution of "0" and "1" using a checkerboard pattern of white and black.
Figure 20:
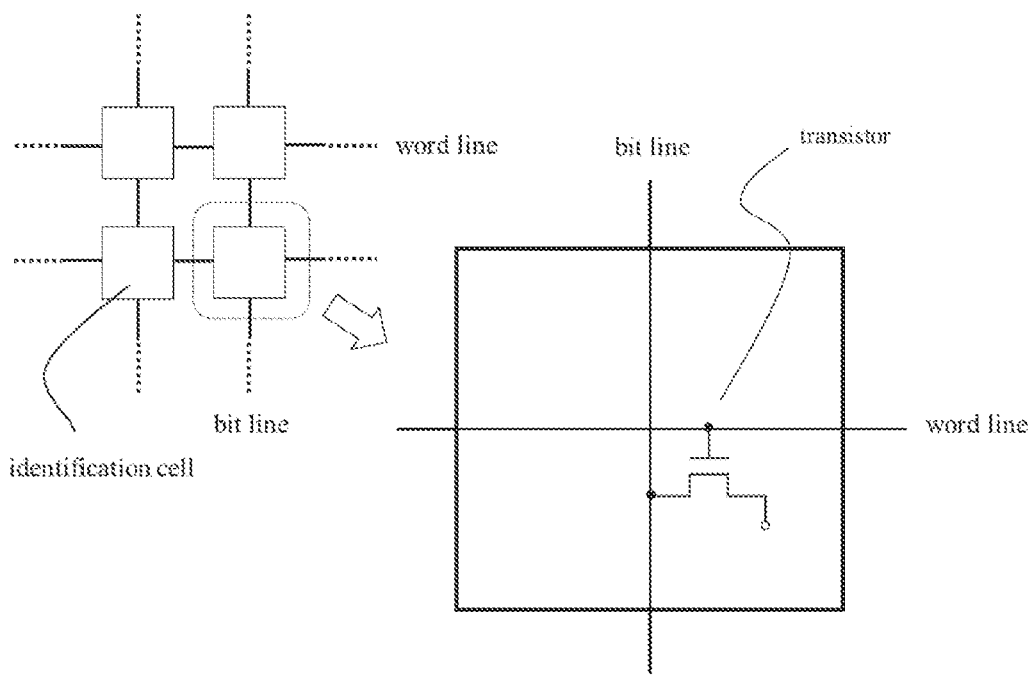
FIG. 20 is a drawing to illustrate an example with an identification cell being a transistor.

What is famous as the most promising example of OTP is a mask ROM. FIG. 20 is a typical example of bit cell structure of mask ROM. That is, a transistor is a bit cell of the mask ROM. First, an address in the cell array is chosen according to the bit representation of the random number code having been separately generated by an external random number generator. Next, a considerable method may be that the PN junction of MOSFET of bit cell located at the chosen address is burn off to be short by laser or by applying a large electric current at a bit line relating to the chosen address for long enough period. In any method, the bit cell having a broken PN junction loses the function of the rectification, so that the electric current can flow even by applying a reverse voltage. For example, the random number code represented in checker-board pattern as illustrated in FIG. 15 can be obtained by making broken and non-broken bit cells correspond to data-1 and data-0, respectively. Anyway, in the case that the random number code having been separately generated is written in a cell array, the PN junctions of MOSFETs at chosen addresses are required to be certainly broken.

Or it may be allowable to adopt all bit cells including a PN junction (FIGS. 18, 20-26 etc.) as an OTP. First, an address in the cell array is chosen according to the bit representation of the random number code having been separately generated by an external random number generator. Next, a considerable method is that the PN junction of transistor of bit cell located at the chosen address is burn off to be short by laser or by applying a large electric current at a bit line relating to the chosen address for long enough period. In any method, the bit cell having a broken PN junction loses the function of the rectification, so that the electric current can flow even by applying a reverse voltage. For example, the random number code represented in the checker-board pattern as illustrated in FIG. 15 can be obtained by making broken and non-broken bit cells correspond to data-1 and data-0, respectively. Anyway, in the case that the random number code having been separately generated is written in a cell array, the PN junctions at chosen addresses are required to be certainly broken.

Or it is allowable to adopt all bit cells including a capacitor (FIGS. 17, 20-26 etc.) as an OTP. First, an address in the cell array is chosen according to the bit representation of the random number code having been separately generated by an external random number generator. Next, a considerable method is that the insulating film of a capacitor of the bit cell located at the chosen address is made hard breakdown by applying a large electric current through the capacitor located at the chosen address for long enough period. The capacitor of bit cell having a broken insulating film loses the function of the electric non-conductance, so that the electric current can flow even by applying a direct voltage. For example, a random number code represented in the checker-board pattern as illustrated in FIG. 15 can be obtained by making broken and non-broken bit cells correspond to data-1 and data-0, respectively. Anyway, in the case that the random number code having been separately generated is written in a cell array, the capacitors at chosen addresses are required to be certainly hard-broken.

Figure 16:
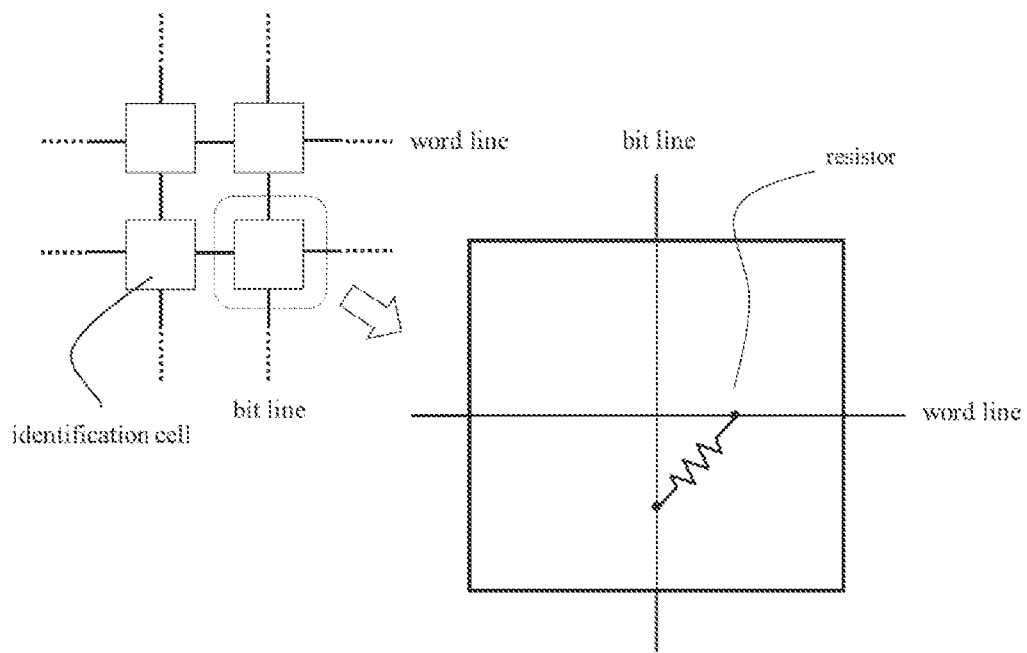
FIG. 16 is a drawing to illustrate an example with an identification cell being a resistive wire.

Or it is allowable to adopt all bit cells including a resistor or resistive wires (FIG. 16, etc.) as an OTP. First, an address in the cell array is chosen according to the bit representation of the random number code having been separately generated by an external random number generator. Next, a considerable method is that the resistor or resistive wire of the bit cell located at the chosen address is burnout by laser or gets short by applying a large electric current for long enough period. This is, in general, called fuse. That is, the example of FIG. 16 is, in general, a fuse memory. The chosen bit cell cannot flow the electric current due to the burnout even though a moderate voltage is applied. For example, the random number code represented in the checker-board pattern as illustrated in FIG. 15 can be obtained by making burnout and non-burnout bit cells correspond to data-0 and data-1, respectively. Anyway, in the case that the random number code having been separately generated is written in a cell array, the resistors or resistive wires at chosen addresses are required to be certainly burnout.

Like this, there are various examples of OTP. It is allowable to regard a random number code having been generated in the external of chip as a specific random number embodying the concept of the present invention by adopting any OTP. However, for the condition of the OTP, it may be preferable to disable the electrical rewriting of the specific random number having been regularly written.

It may be allowable that a random number code, which is a specific random number of the present invention, can be written in the whole of or in a part of the cell array composing the chip of the present invention. Or it may be allowable that a random number code, which is a specific random number of the present invention, can be written in a different area (peripheral area etc.) on the chip.

Nevertheless, if the possibility of decoding can be controlled within an allowable range, then the pseudo-physical random number can be used for the specific random number of the present invention. Thus, the equation of the paragraph 0063 can be pseudo satisfied. Even though the equation is pseudo satisfied, the pseudo physical random number is allowable to be used for the specific random number of the present invention if the possibility of decoding can be controlled within an allowable range.

Nevertheless, if the possibility of decoding can be controlled within an allowable range, then the pseudo-physical random number can be used for the specific random number of the present invention. Thus, the equation of the paragraph 0063 can be pseudo satisfied. Even though the equation is pseudo satisfied, the pseudo physical random number is allowable to be used for the specific random number of the present invention if the possibility of decoding can be controlled within an allowable range.

In the above, there are mainly two methods to generate a specific random number, which is specific to a chip; one is to generate it simultaneously with the chip manufacturing and the other is to generate it separately from the chip manufacturing. In the former, a random number code for the authentication (i.e., specific random number) can be generated from a manufactured chip itself. In the latter, a separately generated specific random number is written into a memory cell array included in a chip (OTP etc.). Another example of the latter is the random breakdown of identification cells on the identification array. After determining area to which the specific random number is to be written, a breaking pulse, the strength of which is on the borderline between occurring the breakdown or not, may be applied on addresses inside that area. Identification cells on which the breaking pulse has been applied are stochastically broken down, so that the addresses of broken cells are distributed physically random. This can be thus a specific random number. In any method to be used, while the response is obtained by combining the specific random number of the chip to be inspected and the input to the chip to be inspected (challenge), it is not departed from the concept of the present invention. Accordingly, in all embodiments of the present invention, both methods of generation of physical randomness can be adopted similarly.

Figure 27:
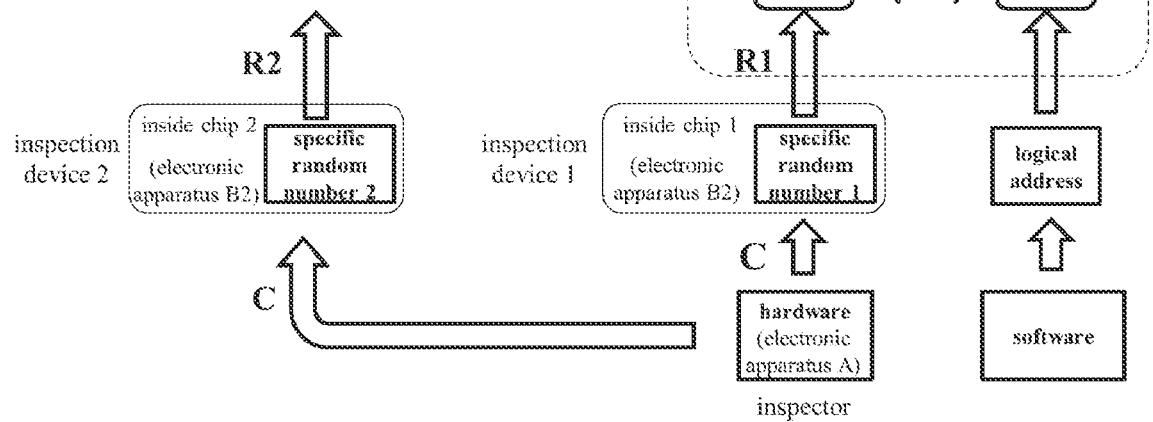
FIG. 27 is a drawing to illustrate an example of the method to distinguish two electronic apparatuses respectively having different chips by using the authentication method of electronic apparatus of the present invention.

FIG. 27 illustrates what will occur if a same challenge C is input to two different inspection devices.

The inspection device 1 has the chip 1 inside, and outputs the response R1 from the challenge C and the specific random number 1 of the chip 1. The inspection device 2 has the chip 2 inside, and outputs the response R2 from the challenge C and the specific random number 2 of the chip 2. Note that two responses R1 and R2 are different each other. It tells us that, if the inspection device 1 is replaced by the inspection device 2, then the response is changed from R1 to R2. That is, the inspector can detect the change of the response if an information device is spoofed (i.e., the inspection device 1 is replaced).

Figure 28:
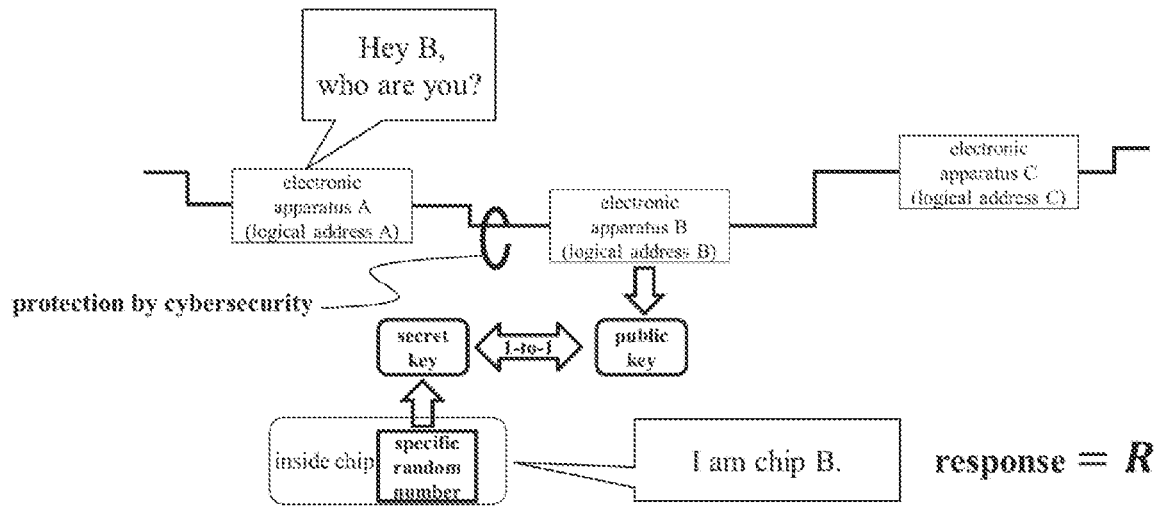
FIG. 28 is a drawing to illustrate an example of the authentication method of electronic apparatus, relating to the present invention.

FIG. 28 illustrates an example of adopting this idea to the authenticate of IoT network (i.e., the network of electronic apparatuses).

The inspector (electronic apparatus A) gives a challenge "Hey B, who are you?" to the inspection device (electronic apparatus B). The electronic device B replies "I am chip B" in response to this challenge using the specific random number of the mounted chip.

Figure 29:
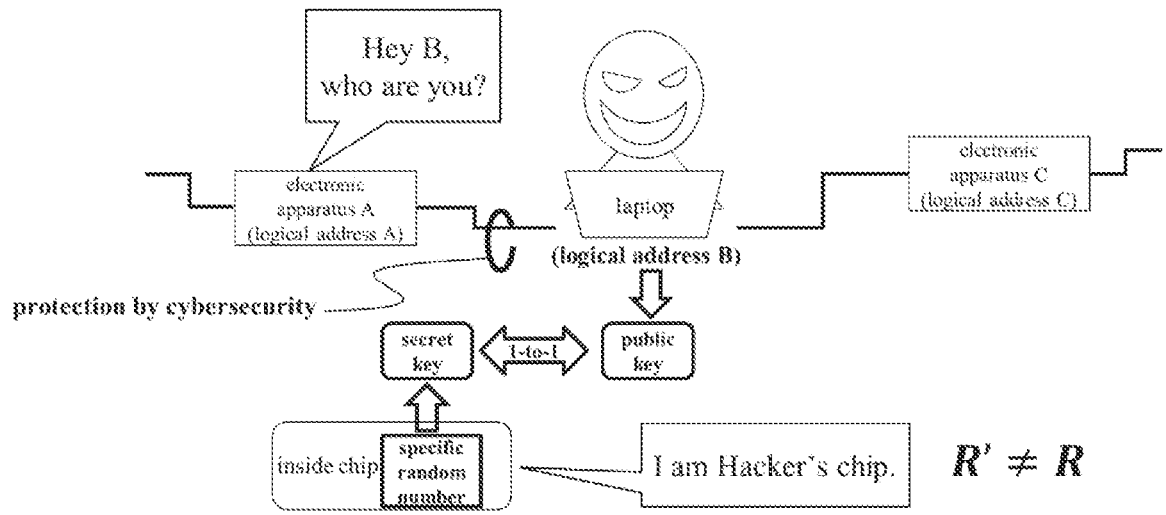
FIG. 29 is a drawing to illustrate an example of the authentication method of electronic apparatus, relating to the present invention.

FIG. 29 illustrates what will occur if the electronic apparatus B is spoofed by a hacker's laptop (however, it has the logical address B).

The inspector (electronic apparatus A) gives a challenge "Hey B, who are you?" to the inspection device (electronic apparatus B). The hacker's laptop having spoofed the electronic apparatus B replies "I am hacker's chip" to this challenge using the specific random number of the mounted chip.

As illustrated in FIG. 27 like this, by using the characteristics of the present invention, wherein the responses from different chips even to a same challenge are different, we can inspect if there is a spoofed electronic apparatus inside the IoT network.

We can make the inspection of an electronic apparatus if the said electronic apparatus is spoofed or not. If a spoofed electronic apparatus is found (a fake electronic apparatus), then we can exclude it from the IoT network. For example, it may be easily performed using the smart contract of blockchain. Though not especially described since it is self-evident, the auto-inspection and the auto-remove of spoofed electronic apparatuses can be performed automatically.

(In a Case Using the Elgamal-Type Key Generator)

FIG. 20 illustrates an example of the method to generate secret key (n) and public key (n) using the response R (n) output from the electronic apparatus B (n) that is the n-th inspection device.

The Elgamal algorithm is one of important algorithms in the public key encryption infrastructure. One of its characteristics is that the public key is generated from the secret key forming the pair with it. In the present application, without regard to the detail of the algorithm, the key generator to generate a public key from a secret key forming a pair with it can be called the Elgamal-type key generator.

First, the challenge C is input from hardware that is the inspector (the electronic apparatus A) to the electronic apparatus B (n). The electronic apparatus B (n) outputs the response R (n) from the specific random number (n) of the mounted chip (n) and this challenge C.

The response R (n) can be used as the secret key (n) after the code-conversion for the format arrangement etc. This secret key (n) may be input to the Elgamal-type key generator to obtain the public key (n) forming a one-to-one pair with the secret key (n). This public key (n) is a logical address corresponding to the logical account (n).

It is preferable to delete the secret key (n) after using it. The secret key can be regenerated using the method in FIG. 30 as necessary. Or it is preferable to confine it inside the electronic apparatus B (n) securely. Securely confining it inside the electronic apparatus B (n) is, if we see it from the external of the electronic apparatus B (n), identical to that the secret key (n) disappeared.

It is preferable that the said key generator has been installed to the electronic apparatus B (n) as software. Or it is preferable that the said key generator has been installed to the chip (n) mounted in the electronic apparatus B (n) as a built-in module. Or it is preferable that the said key generator has been installed to another chip mounted in the electronic apparatus B (n) as a built-in module. Or it is preferable that the said key generator has been installed to another electronic apparatus securely connecting to the electronic apparatus B (n).

Figure 30:
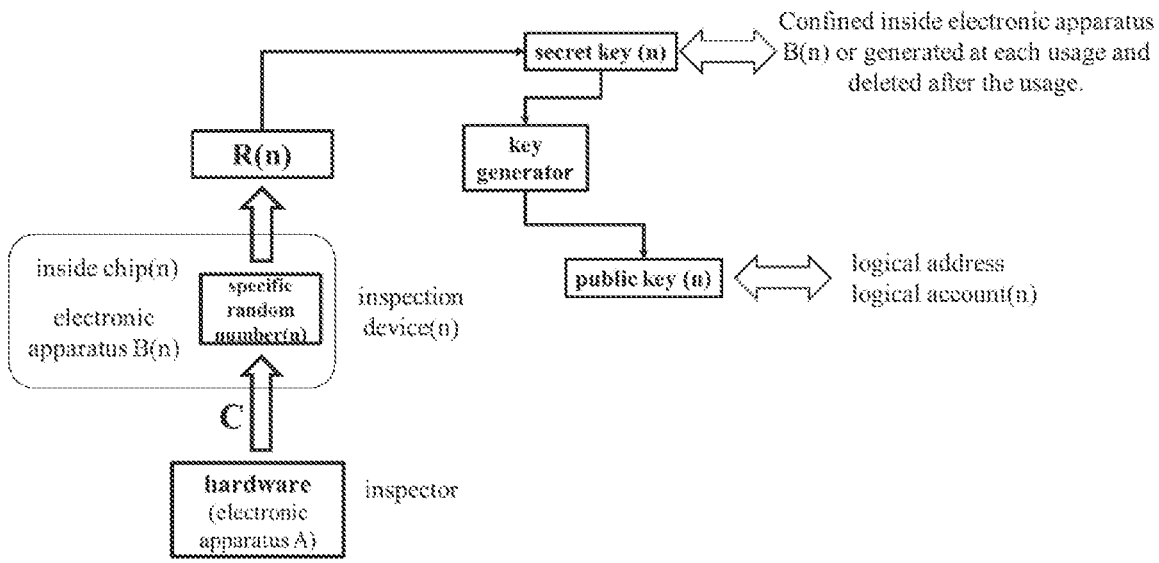
FIG. 30 is a drawing to illustrate an example of the method to generate secret and public keys in the authentication method of electronic apparatus, relating to the present invention.
Figure 31:
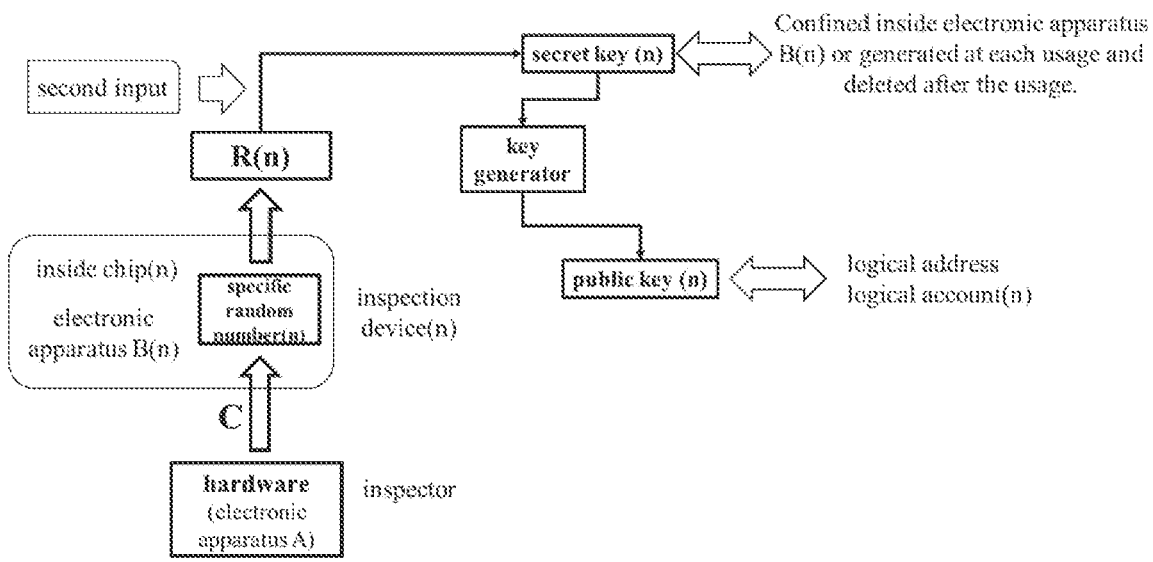
FIG. 31 is a drawing to illustrate an example of the method to generate secret and public keys in the authentication method of electronic apparatus, relating to the present invention.
Figure 32:
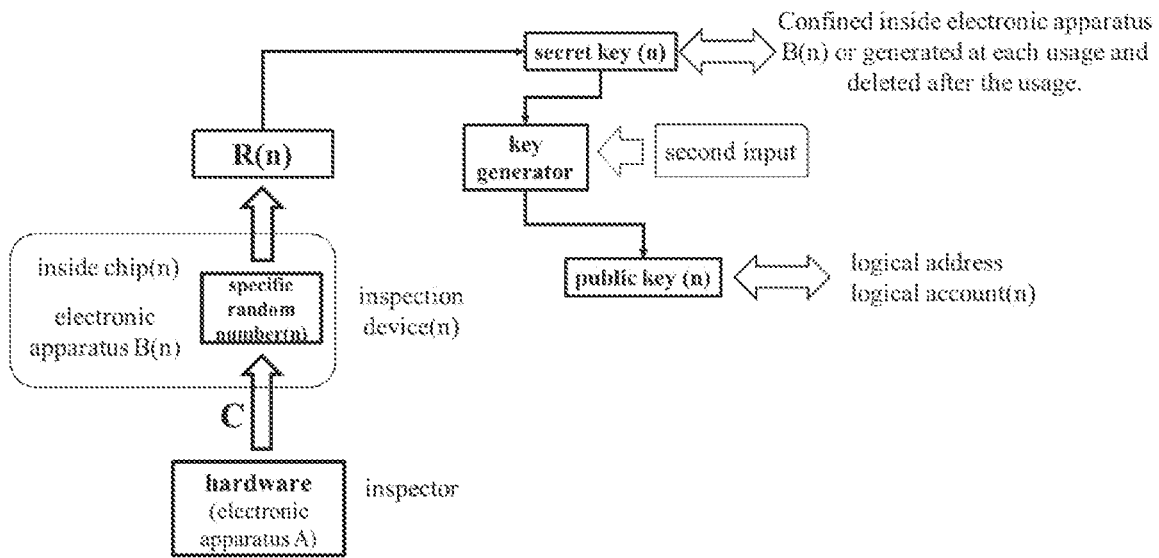
FIG. 32 is a drawing to illustrate an example of the method to generate secret and public keys in the authentication method of electronic apparatus, relating to the present invention.

FIGS. 31 and 32 illustrates an example of the method to adopt the second input additionally in the embodiment of FIG. 30.

In FIG. 31, the second input is input in the process of generating the secret key (n) from the response R (n) by using the code-conversion. That is, this code-conversion can include the said second input. In FIG. 32, the second input is input in the process of generating the public key (n) from the secret key (n). That is, this key generator can include the said second input.

The reason to use the second input is to increase the freedom and the strength of the authentication of inspection devices regarding the present invention.

For example, let us add a security server, which supports the inspector, in order to reinforce the management of the IoT network. This security server can input (distribute) the second input to the inspection device B (n) independently of the said inspector, so as to change the response R (n) in response to the challenge C. It may be helpful to prevent a hacker from predicting an unknown set of challenge and response from plural known sets of challenge and response. However, it is preferable that this security server has been authenticated by the inspector in advance before distributing the second input. Or the said security server can also perform the authentication inspection of the inspection devices in a similar manner with the said inspector. In this sense, the security server is also an inspection device. That is, there can be one or more inspectors. It is preferable that the first inspector manages the pair of CR and further performs the auto-inspection of inspection devices and the auto-remove of fake electronic apparatuses, and the second inspector manages the pair of CR and further distributes the second input to the inspection devices as a security server.

(In a Case Using the RSA-Type Key Generator)

Figure 33:
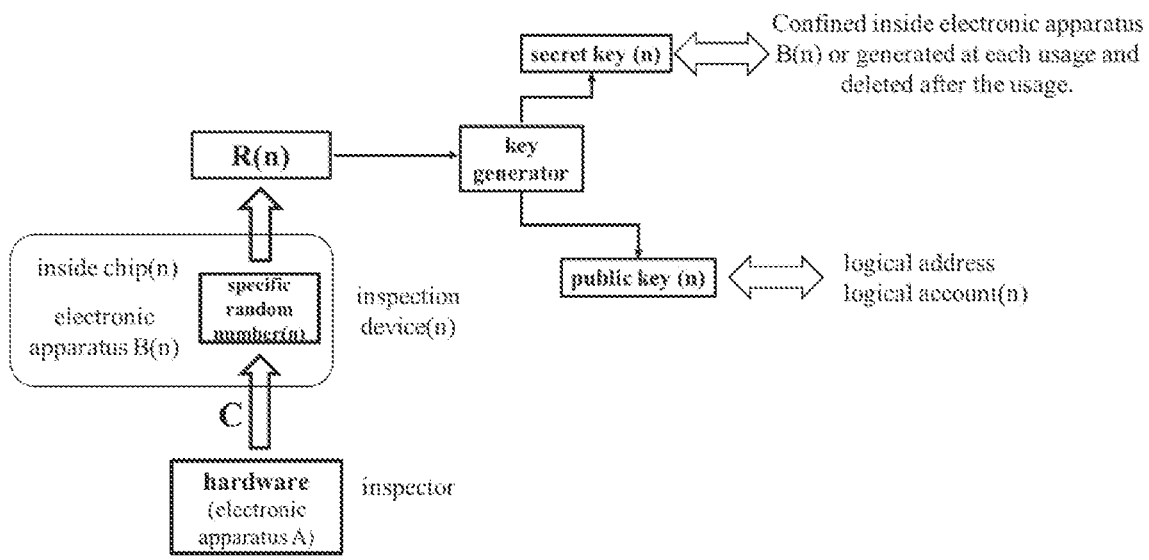
FIG. 33 is a drawing to illustrate an example of the method to generate secret and public keys in the authentication method of electronic apparatus, relating to the present invention.
Figure 34:
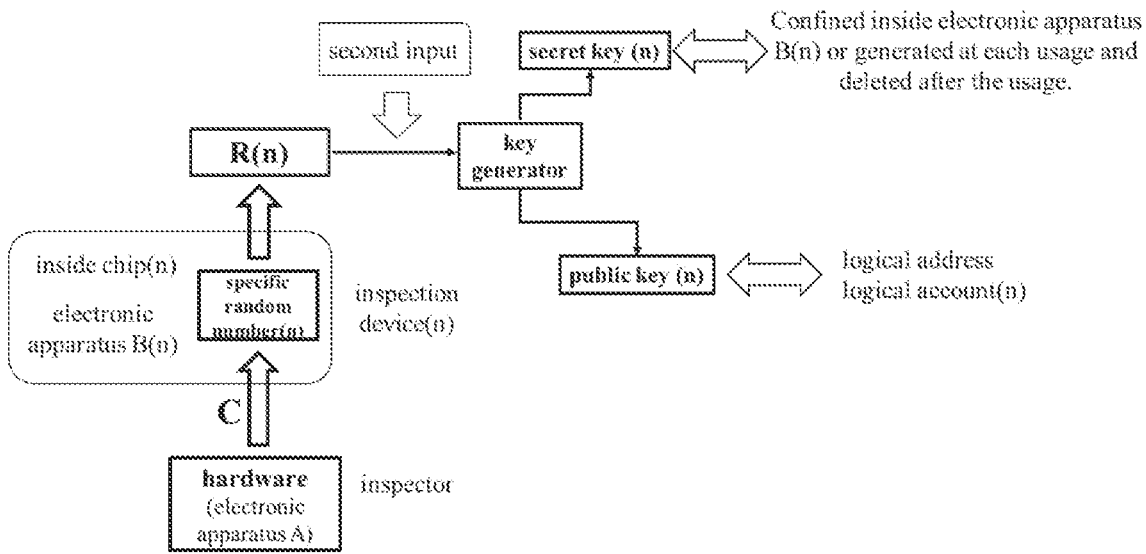
FIG. 34 is a drawing to illustrate an example of the method to generate secret and public keys in the authentication method of electronic apparatus, relating to the present invention.
Figure 35:
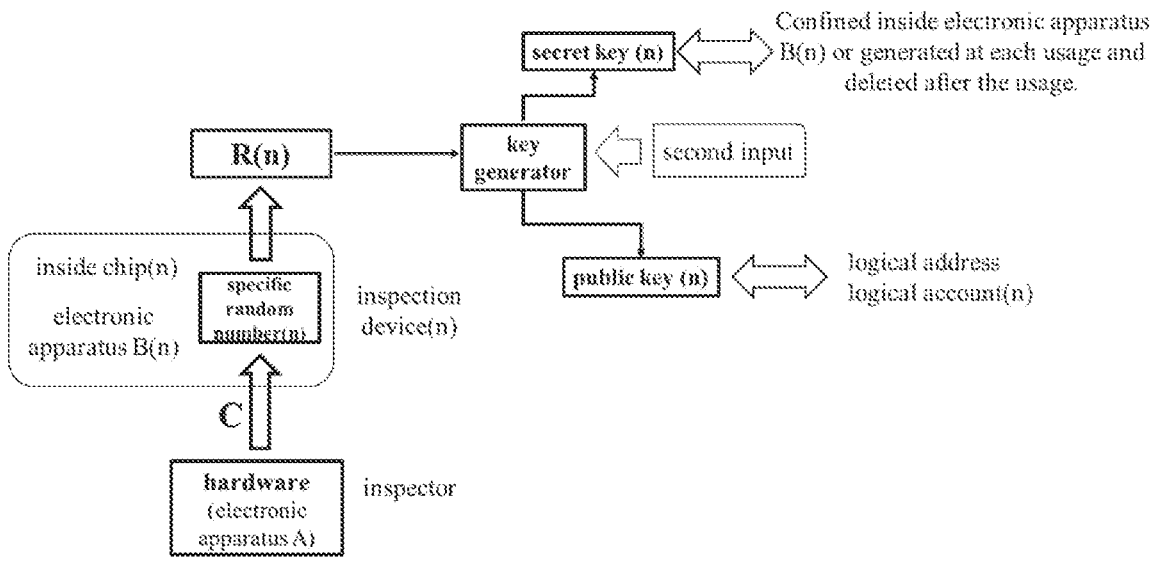
FIG. 35 is a drawing to illustrate an example of the method to generate secret and public keys in the authentication method of electronic apparatus, relating to the present invention.

FIGS. 33-35 illustrates an example of using the RSA-type key generator, which respectively correspond to FIGS. 30-32 with replacing the Elgamal-type key generator with the RSA-type key generator.

The name of RSA is from the inventors' names - - - the initials of Rivest, Shamir, and Adelman. The RSA algorithm is one of most important one in the public key encryptions. One of its characteristics is to generate a pair of secret and public keys using an external input. In the present application, without regard to the detail of the algorithm, the key generator to generate a pair of secret and public keys from an external input can be called the RSA-type key generator.

FIG. 33 is an illustration of an example of the method to generate secret key (n) and public key (n) using the response R (n) output from the electronic apparatus B (n) that is the n-th inspection device.

First, the challenge C is input from hardware (electronic apparatus A) that is the inspector to the electronic apparatus B (n). The electronic apparatus B (n) outputs the response R (n) using the specific random number (n) of chip (n) mounted inside and this challenge C.

The response R (n) is directly or after the code-conversion for the format arrangement etc. to the RSA-type key generator to generate the secret key (n) and public key (n), which form a pair. This public key (n) serves as the logical address of the logical account (n).

It is preferable to delete this secret key (n) after using it. Or the secret key can be regenerated using the method in FIG. 33 as necessary. Or it is preferable to confine it inside the electronic apparatus B (n) securely. Securely confining it inside the electronic apparatus B (n) is, if we see it from the external of the electronic apparatus B (n), identical to that the secret key (n) disappeared.

It is preferable that the said key generator has been installed to the electronic apparatus B (n) as software. Or it is preferable that the said key generator has been installed to the chip (n) mounted in the electronic apparatus B (n) as a built-in module. Or it is preferable that the said key generator has been installed to another chip mounted in the electronic apparatus B (n) as a built-in module. Or it is preferable that the said key generator has been installed to another electronic apparatus securely connecting to the electronic apparatus B (n).

FIGS. 34 and 35 illustrate an example of the method to use the second input additionally in the embodiment of FIG. 33.

In FIG. 34, the second input is input in the process of inputting the response R (n) to the key generator. That is, this second input and the response R (n) are compounded in some kind of manner. In FIG. 35, the second input is input in the process that the key generator generates the secret key (n) and the public key (n). That is, this key generator can include the said second input.

The reason to use the second input is essentially to increase the freedom and the strength of the authentication of inspection devices regarding the present invention.

For example, let us add a security server, which supports the inspector, in order to reinforce the management of the IoT network. This security server can input (distribute) the second input to the inspection device B (n) independently of the inspector, so as to change the response R (n) in response to the challenge C. It may be helpful to prevent a hacker from predicting an unknown set of challenge and response using plural known sets of challenge and response. However, it is preferable that this security server has been authenticated by the inspector in advance before distributing the second input.

As mentioned above, the embodiments with using the Elgamal-type and the RSA-type key generators, which have been specified in the present application, are explained. Next, there is a comment on a key generator which do not belong to neither, that is, the key generator that generates a secret key from a public key. One might think that such a key generator could be realized by replacing the input to the Elgamal-type by a public key. However, note that a public key is public on the network so that an adversary can also obtain it freely. He can thus obtain the same secret key by inputting the obtained public key to this key generator with a same algorithm. In other words, it is impossible to make the secret key secret.

In the utilization method of the present invention, with the Elgamal-type key generator, as illustrated in FIGS. 30-32, a secret key can be generated using a responses R output from the electronic apparatuses, respectively. It may be also allowable to input a response R to Elgamal-type key generator as a secret key with no code-conversion. After the code-conversion for data format arrangement, it may be allowable to input the converted response to Elgamal-type key generator as a secret key. Or, after the code-conversion with some kind of intention, it may be allowable to input the converted response to the Elgamal-type key generator as a secret key. Anyway, the Elgamal-type key generator generates a pair of secret and public keys using a response R. On the other hand, in the RSA-type key generator, as illustrated in FIGS. 33-35, a pair of secret and public keys is generated by inputting a response R. In the key generator utilization methods of the present invention, like this, anyone of Elgamal-type and RSA-type key generators can "generate a pair of secret and public keys, which are specific to an electronic apparatus, by using a response R having been obtained by inputting a challenge C to the electronic apparatus". Furthermore, the pair of secret and public keys can be updated by changing the challenge C. And it may be allowable that a key generator can be usable whenever it is necessary. There is not a specific area in which a key generator is established (or installed). That is, it may be allowable that a key generator can be established inside an IC chip composing an electronic apparatus or outside. Or it is allowable that a key generator can be installed to an electronic apparatus as software.

(Blockchain of Things)

Figure 36:
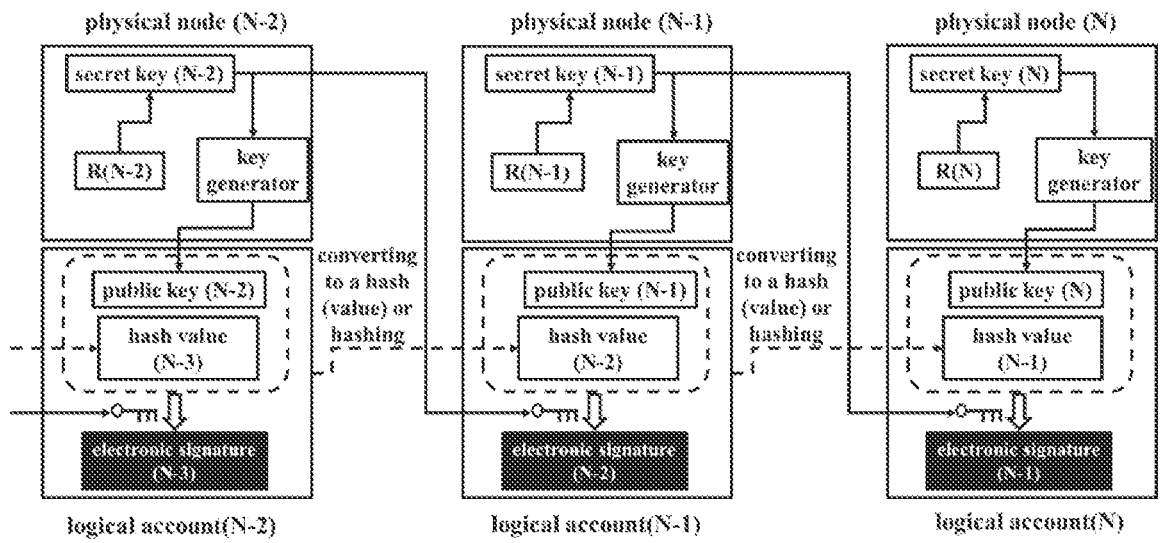
FIG. 36 is a drawing to illustrate an example of the method to link data transmission between logical accounts to data transmission between physical nodes by using the authentication method of electronic apparatus, relating to the present invention.
Figure 37:
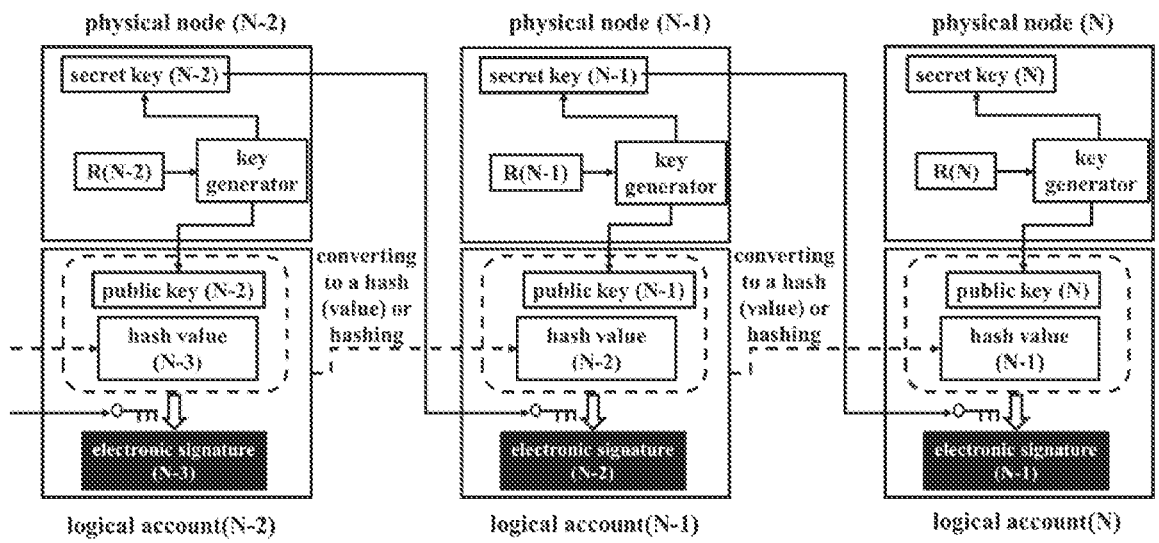
FIG. 37 is a drawing to illustrate an example of the method to link data transmission between logical accounts to data transmission between physical nodes by using the authentication method of electronic apparatus, relating to the present invention.

FIGS. 36 and 37 conceptually illustrate the methods to constitute blockchain of things using the Elgamal-type and the RSA-type key generators, respectively.

The physical nodes (N−2), (N−1), and (N) are electronic apparatuses B respectively corresponding to the logical accounts (N−2), (N−1), and (N). In particular, in FIGS. 30-35, they are the electronic apparatuses B (n), wherein they correspond to n=N−2, N−1, and N, respectively. Note that, since the secret key (n) and public key (n) are a pair thanks to the public key encryption infrastructure (PKI) in FIG. 13, the logical account (n) and the physical node (n) form a pair.

According to the idea of FIG. 13, the responses that the electronic apparatus B (N−2), the electronic apparatus B (N−1), and the electronic apparatus B (N) output in response to the challenge C are R (N−2), R (N−1), and R (N), respectively.

Figure 12:
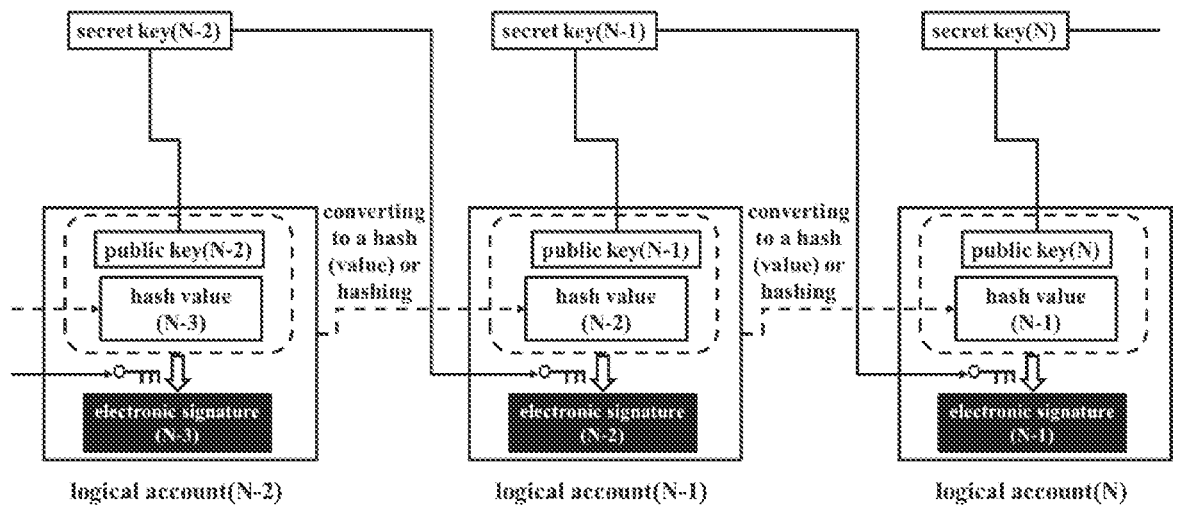
FIG. 12 is a drawing to illustrate an example of data transmission between logical accounts.

If the key generator and the responses R (N−2), R (N−1) and R (N) are excluded from each physical node (electronic apparatus), respectively, in FIGS. 36 and 37, then those figures turn out being perfectly identical to the FIG. 12. It tells us that the method to form a pair of a physical node and a logical node using the idea of FIG. 13 is fully compatible to the existing blockchain.

In the examples of FIGS. 36 and 37, the memory of physical node (N) stores the latest data. It is the chip (i.e., the memory chip) in FIG. 13. In FIGS. 30-35, it is the chip (n).

Figure 11:
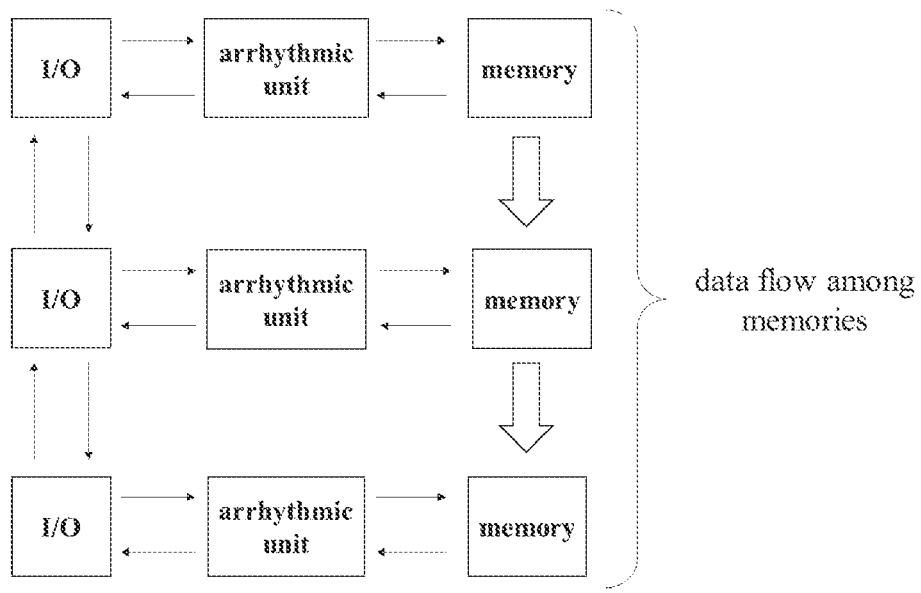
FIG. 11 is a drawing to illustrate an example of data transmission and data flow among memories.

As illustrated in FIG. 11, data is transmitted from a memory chip to another memory chip in the IoT network.

Figure 38:
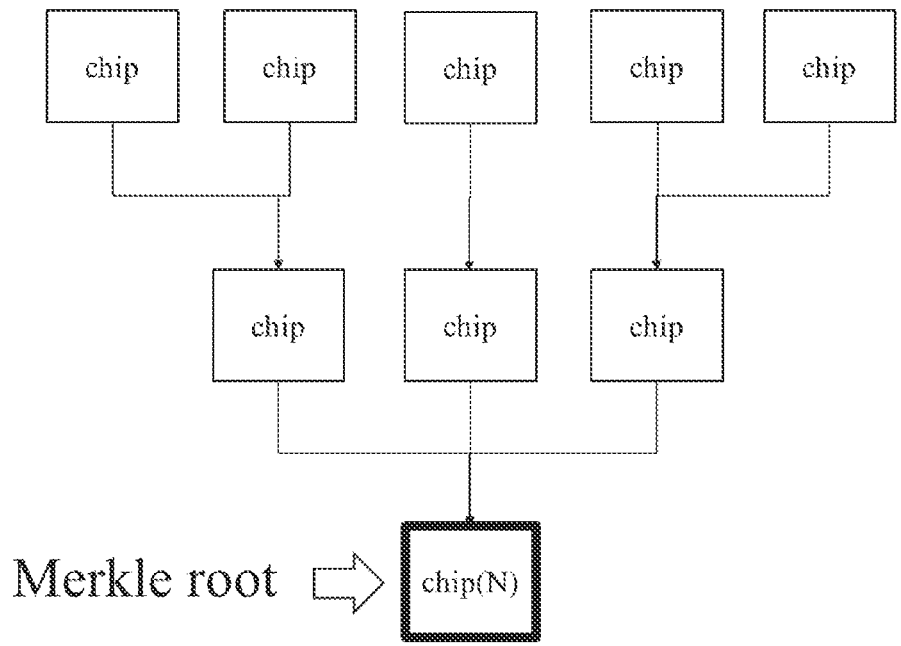
FIG. 38 is a drawing to illustrate an example of the Merkle tree of chips.

Besides, there can be not only one chip but also more chips, which can transfer data to the chip (i.e., chip (N)) having a memory to store this latest data. In the example of FIG. 38, three chips have transferred data to the chip (N) having the latest data. Any of these three chips has data having been transferred from plural chips. Nevertheless, the history of this transmission arrives at the final chip (N) having the latest data.

Thus, the Merkle tree can be formed like in FIG. 38. The final chip (N) turns out being the Merkle root of the Merkle tree of the present invention.

In general, the Merkle root is a candidate of a new block in the blockchain. If the Merkle root satisfies the condition called the Proof-of-Consensus (PoC), then this Merkle root is registered in the distributed ledger and then certified and appended to the end of the blockchain as a new block. Thus, the blockchain is expanded.

There are plural methods for the PoC. An example is a method of converting a certain code relating to the Merkle root and an appended nonce value to a hash value. If the hash value (named, block hash) satisfies a predetermined condition (i.e., PoC), then this Merkle root can be blocked (i.e, can be registered as a new block) and then appended to the blockchain as a new block.

As an example, the condition that the block hash is required to satisfy is that the first 16 digits are all zero in the block hash to be generated by adding a nonce value. It is called the mining to find a Merkle root having not been blocked but already been exposed on the network and then to find a nonce value to let the block hash satisfy the said predetermined condition. A miner having been succeeded in the mining will be awarded. An example of the award is the bitcoin.

Figure 39:
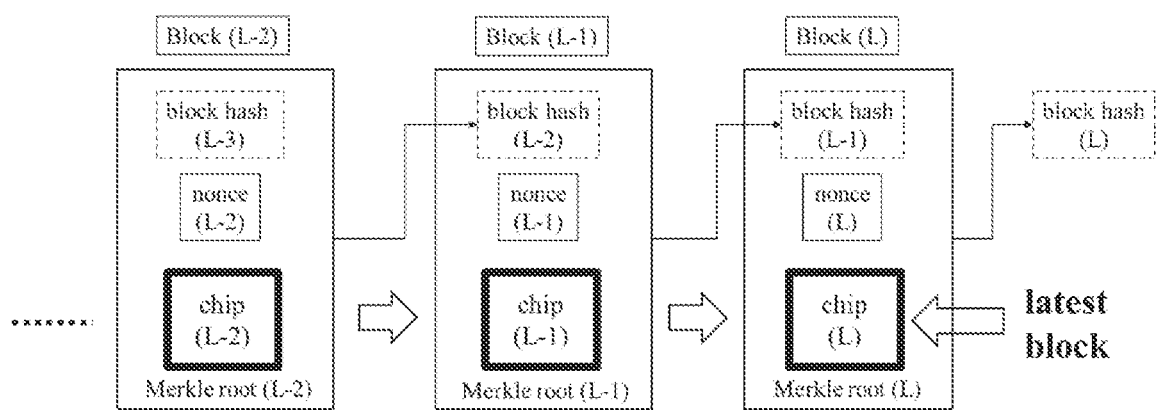
FIG. 39 is a drawing to illustrate an example of blockchain with chips being Merkle roots (Blockchain of IC chips).

FIG. 39 illustrates an idea of the process of generating a block by this mining.

Suppose that the block hash (L−2) has been generated by converting the Merkle root (L−3) to a block. That is, the Merkle root (L−3) is the newest block (L−3) having been attached to the end of the blockchain at present. Furthermore, from the left, there are the Merkle root (L−2), the Merkle root (L−1), and the Merkle root (L) in the figure. We should however note that, as mentioned above, these Merkle roots are all chips (or IC chips including a cell array of FIG. 14) in the present invention.

First, the nonce (L−2) is required to be found such that the predetermined condition for PoC will be satisfied. Then, the nonce (L−2), the block hash (L−3) and the Merkle root (L−2) are converted to block hash (L−2). Thus, the block (L−2) can be deemed as the latest block to be attached to the end of the blockchain.

Subsequently, the nonce (L−1) is required to be found such that the predetermined condition for PoC will be satisfied. Then, the nonce (L−1), the block hash (L−2) and the Merkle root (L−1) are converted to block hash (L−1). Thus, the block (L−1) can be deemed as the latest block to be attached to the end of the blockchain.

Subsequently, the nonce (L) is required to be found such that the predetermined condition for PoC will be satisfied. Then, the nonce (L), the block hash (L−1) and the Merkle root (L) are converted to block hash (L). Thus, the block (L) can be deemed as the latest block to be attached to the end of the blockchain.

The Merkle root (n), which will be converted together with the nonce (n) and the block hash (n−1) to the block hash (n), is the specific data (n) stored in the chip (n) in the network of the present invention, where n is an arbitral integer which can be the above L−3, L−2, L−1, or L.

The chip (n) is an IC chip having a cell array in FIG. 14 or a memory chip. The said specific data (n) is also specific to the Merkle root (n), and then can be regarded as expressing the Merkle root (n). Accordingly, the Merkle root (n) of the present invention is, as an example, able to be regarded as relating to the specific random number (n).

(Physical Firewall)

Figure 41:
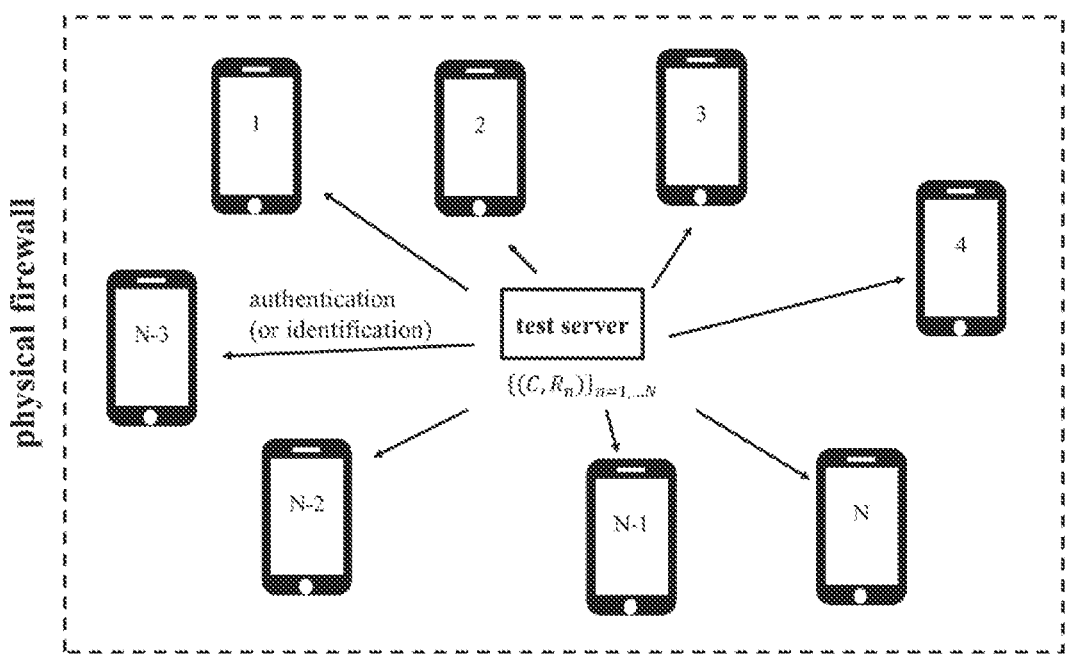
FIG. 41 is a drawing to illustrate an example of a physical firewall configured using the concept of the authentication method of electronic apparatus of the present invention.
Figure 85:
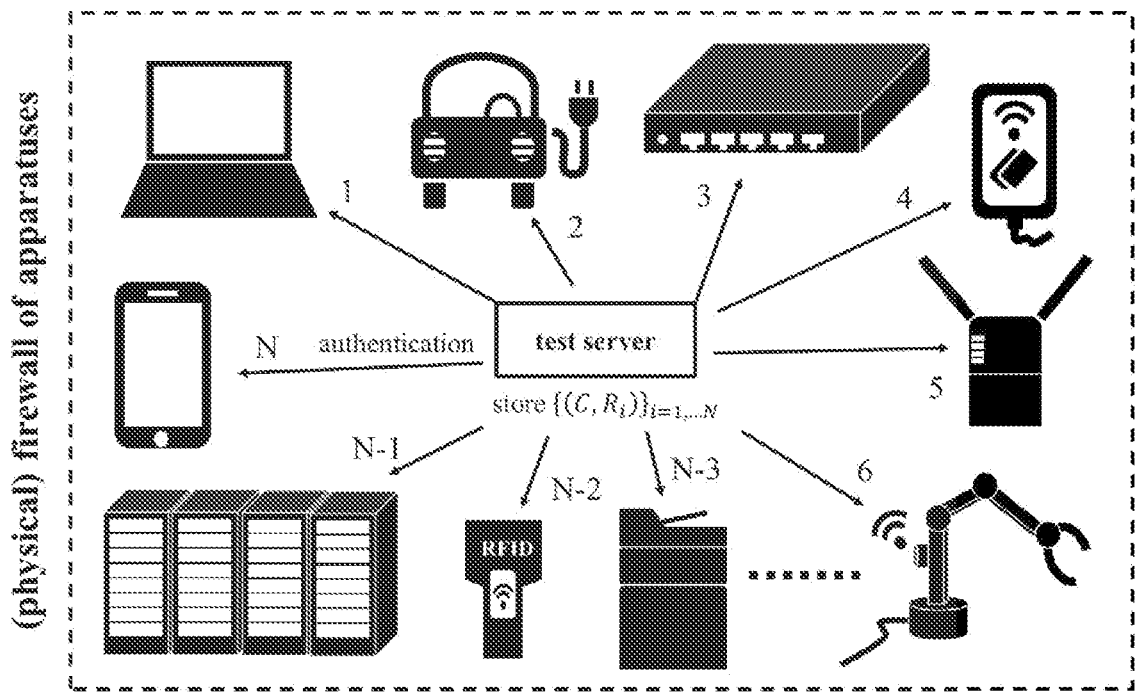
FIG. 85 is a drawing to illustrate an example of physical firewall constructed using the concept of the authentication method of electronic apparatus of the present invention.

The number of inspection devices is not only one. Regarding the inspector as a test server, the idea of FIG. 13 can be expanded to the network composed of plural inspection devices and a test server. FIG. 41 illustrates that a test server makes an authentication test of N inspection devices. In general, the inspection devices are not always a homogenous electronic apparatus as illustrated in FIG. 41. They are any kind of devices having an IC chip and connecting to the IoT network. For example, they are personal computers, routers, vehicles, smartphones, servers, tag reader/writer, printers, industrial tools, tablets and so forth. An example is illustrated in FIG. 85. However, FIG. 85 is identical to FIG. 41 to explain the essence of the present invention. After completing the authentication of those N electronic apparatuses (i.e., the N inspection devices), they can construct a physical firewall with this test server playing a central role. However, the method that the test server inspects the authentication of each inspection device is similar to that the electronic apparatus A inspects the authentication of the electronic apparatus B in FIG. 13. If n is a natural number ranging from 1 to N, then the test server inputs the challenge C to the electronic apparatus (n) and then the electronic apparatus (n) generates the response R (n) using the specific random number (n) of chip (n) mounted inside and this C. The electronic apparatus (n), as illustrated in FIGS. 30-35, generates a pair of secret key (n) and public key (n) using the R (n). Furthermore, the public key serves as the logical address (n), or the logical address (n) can be generated from the public key (n). In FIG. 41, there is one test server, but the number of test servers is not only one. Though not specially illustrated since it is self-evident, similar to that there can be plural inspection devices, there can be plural test servers on one unified network of electronic apparatuses. "One unified network" means a network including any electronic apparatus that is directly or indirectly connected to an electronic apparatus which is a component of the said network. However, the number (N) of peripheral devices must be logically 1 or larger than 1.

Figure 42:
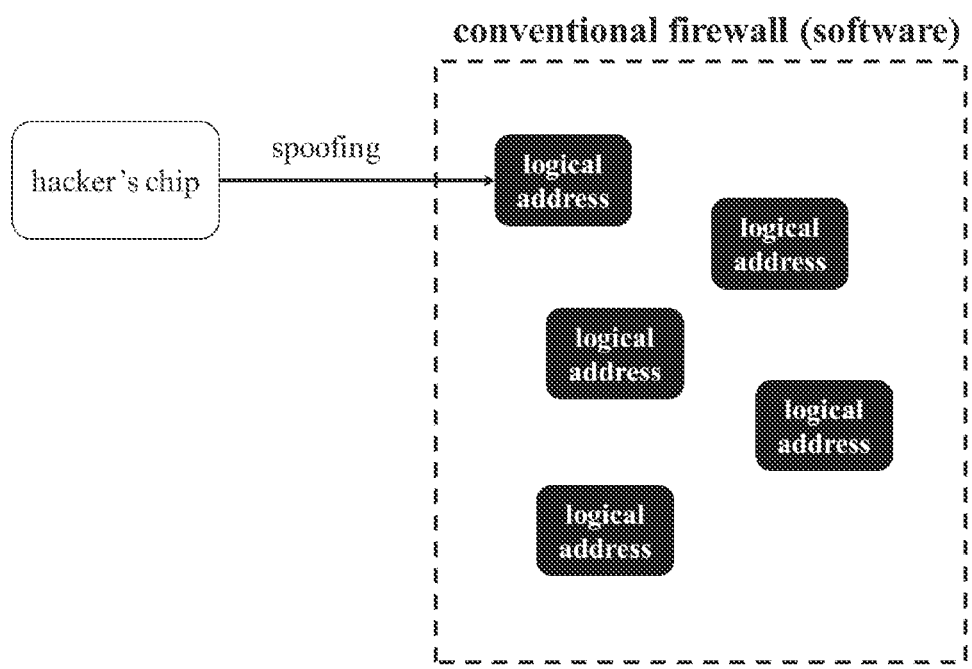
FIG. 42 is a drawing to illustrate an example of a conventional firewall.
Figure 43:
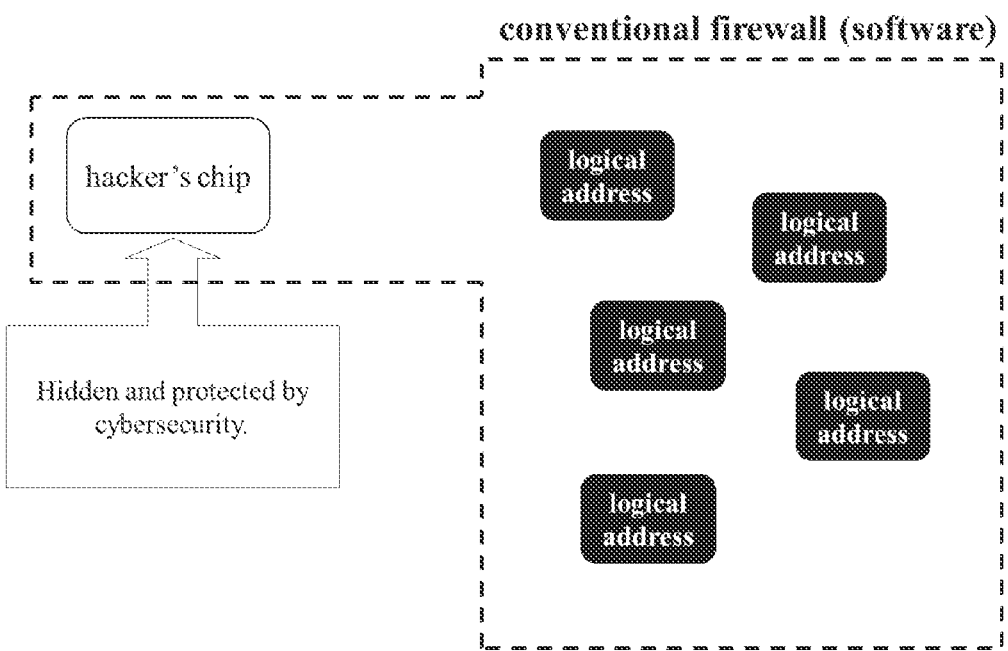
FIG. 43 is a drawing to illustrate an example wherein a conventional firewall can be broken by the spoofing.
Figure 44:
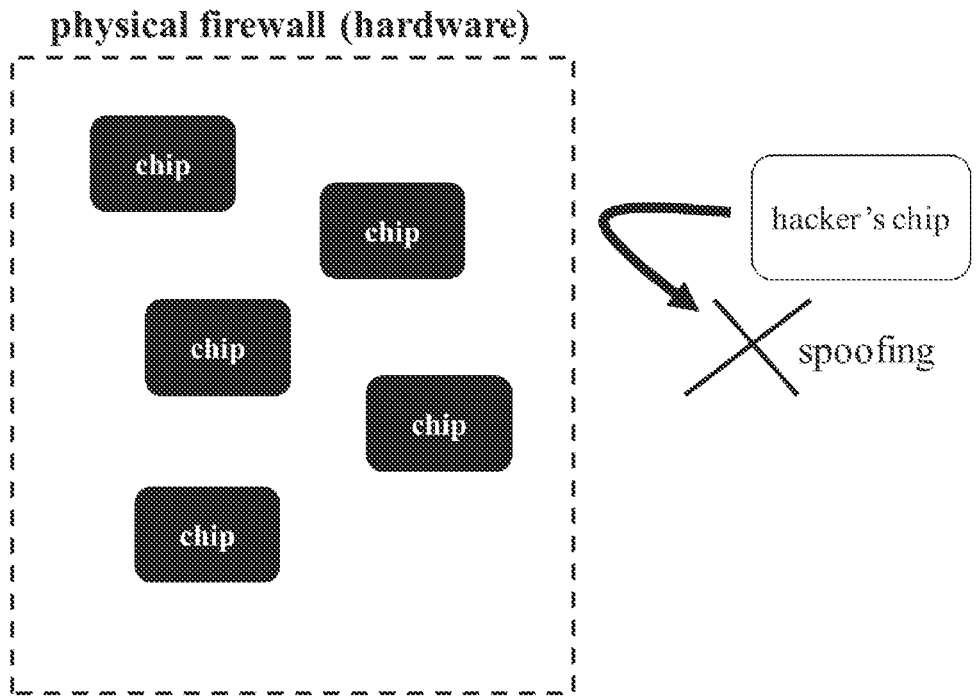
FIG. 44 is a drawing to illustrate an example wherein the physical firewall of the present invention can prevent the spoofing.

On the contrary, the conventional firewall that is composed of logical addresses can be regarded as a logical firewall. If a logical firewall is applied to the IoT network, it would be an attacking target of the spoofing, as illustrated in FIG. 42. The methods of the spoofing have been illustrated in FIGS. 4-6 and 9. In FIG. 43, an electronic apparatus (with a chip inside) of a hacker who has copied a logical address can enter into the inside of a logical firewall. FIG. 44 illustrates the situation that the same spoofing attack has been tried to a physical firewall. As has been explained in FIG. 29, the present invention can shut out the spoofing attack like this.

Figure 45:
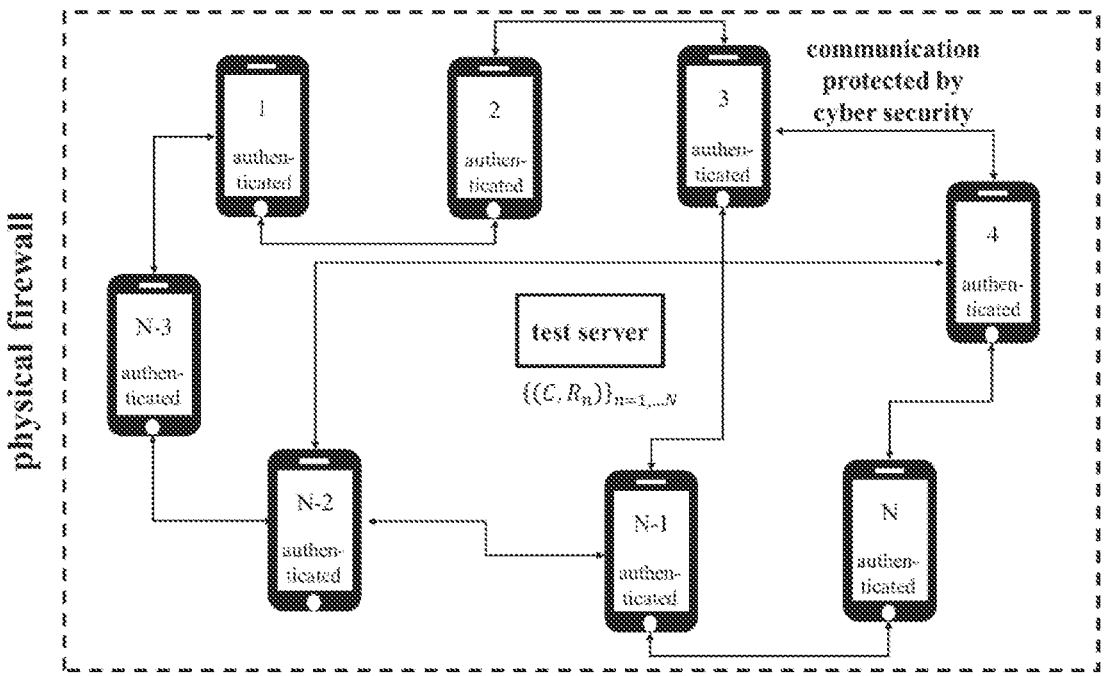
FIG. 45 is a drawing to illustrate an example wherein electronic apparatuses inside the physical firewall of the present invention can perform data transmissions which are protected by cybersecurity.
Figure 86:
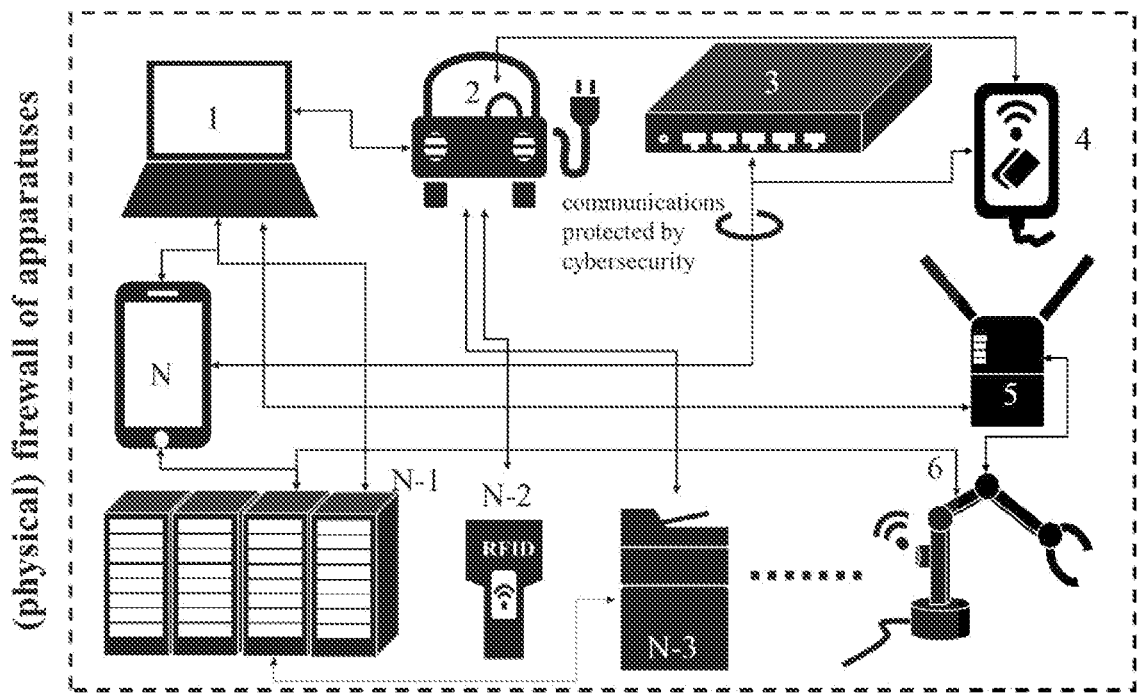
FIG. 86 is a drawing to illustrate an example wherein electronic apparatuses inside the physical firewall relating to the present invention perform data transitions that are protected by cybersecurity.

If we protect communications inside a physical firewall comprising only the electronic apparatuses having passed the authentication inspection of the present invention by using the method of the most advanced cybersecurity, as illustrated in FIG. 45, then the trustiness of the data flow on the network of electronic apparatuses (IoT network) can be substantially improved. There are plural methods of cybersecurity at present, and a new method would be developed from now on. The most advanced one at present may be blockchain. As has been illustrated using FIGS. 36-40, the authentication method of electronic apparatuses of the present invention can configure a Merkle tree of memory chips. Therefore, we can secure the full compatibility of the physical firewall and the existing blockchain by linking the authentication of a memory chip to a logical address, as illustrated in FIGS. 30-35. As has been illustrated using FIGS. 36-40, the authentication method of electronic apparatuses of the present invention can configure a Merkle tree of memory chips. Therefore, we can secure the full compatibility of the physical firewall and the existing blockchain by linking the authentication of a memory chip to a logical address, as illustrated in FIGS. 30-35. In general, the inspection devices are not always a homogenous electronic apparatus. They are any kind of devices having an IC chip and connecting to the IoT network. For example, they are personal computers, routers, vehicles, smartphones, servers, tag reader/writer, printers, industrial tools/robots, tablets and so forth. An example is illustrated in FIG. 86. However, FIG. 86 is identical to FIG. 45 to explain the essence of the present invention.

What is significant in FIGS. 45 and 86 is that the authentication method of the present invention enables for configuring a decentralized system, by using blockchain, among the authenticated electronic apparatuses composing a physical firewall while configuring the said physical firewall under a central management by a test server. Furthermore, a test server can change the challenge C voluntarily such that the pairs of public keys and secret keys of the authenticated electronic apparatuses can be updated anytime. In the case that a hacker has successfully broken the security of a part of authenticated electronic apparatuses, the security of the other authenticated electronic apparatuses may be broken by using the same method. However, since the public and secret keys of the authenticated electronic apparatuses can be automatically updated by the central management, the present invention is helpful to recover the network security to be in fine condition at once. Such a recovery can get possible since a secret key or a pair of secret and public keys is generated using a response (from an existing chip), like in the present invention.

If a physical firewall of the present invention is configured inside a network of electronic apparatuses, then those electronic apparatuses are divided into those included into the physical firewall and those not included. The physical firewall of the present invention does not always prohibit an electronic apparatus composing it to communicate to the external of it. It is preferable that, if an electronic apparatus inside the physical firewall communicates to the external, a test server notices to the electronic apparatus that the partner of this communication has not been authenticated. Or it is preferable that a test server does not permit the communication.

If the test server noticed that the communication partner had not been authenticated or that he did not permit the communication, then it may be found that the communication partner is out of the physical firewall. In such a case, how to treat with it may be entrusted to the user of the electronic apparatus or the system administrator. For example, when a test server having authenticated the first electronic apparatus (the first inspector) and another test server having authenticated the second electronic apparatus (the second inspector) can communicate each other, the said first and second electronic apparatuses can indirectly communicate each other via the said first and second inspectors. In this event, the communication content may be managed by the said first or second inspectors.

(Row Line Redundancy)

Figure 46:
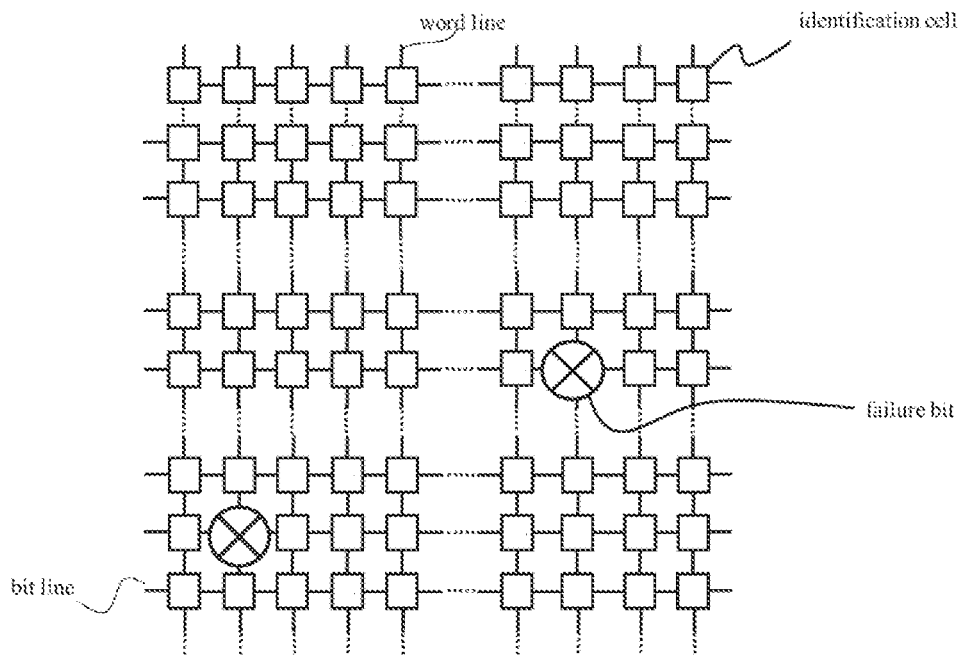
FIG. 46 is a drawing to illustrate an example wherein plural failure bits are distributed on the cell array of identification cells.

FIG. 46 conceptually illustrates a cell array included in a chip (or memory chip) mounted in an electronic apparatus to be inspected. In the horizontal direction, one of bit lines and word lines is extended. In the vertical direction, the other of bit lines and word lines is expanded. At a cross point of a row line and a column line (cross point of a word line and a bit line), there is a bit cell (memory cell) depicted by a square. The cross point that the n-th row line (e.g., bit line) and the m-th column line (e.g., word line) can be expressed by a set of two integers (n, m), which is called an address on the cell array. However, n is an integer ranging from 1 to N in FIG. 14, and m is an integer ranging from 1 to M in FIG. 14.

In the present application, we call this bit cell an identification cell a-purpose. That is, the specification of a chip can be determined by adopting which kind of electronic cell for an identification cell.

Since chip (or memory chip) is a mass-product, it is not easy to exclude an accidental entry of defective to the products, no matter how optimizing the fabrication processes. On the cell array of FIG. 46, it may occur as a failure bit (depicted by a circle with x). The number and distribution of failure bits on the cell array are random. As information quantity of its distribution pattern increases, this randomness can vary over chips, that is, it can be regarded as specific to a chip.

Figure 47:
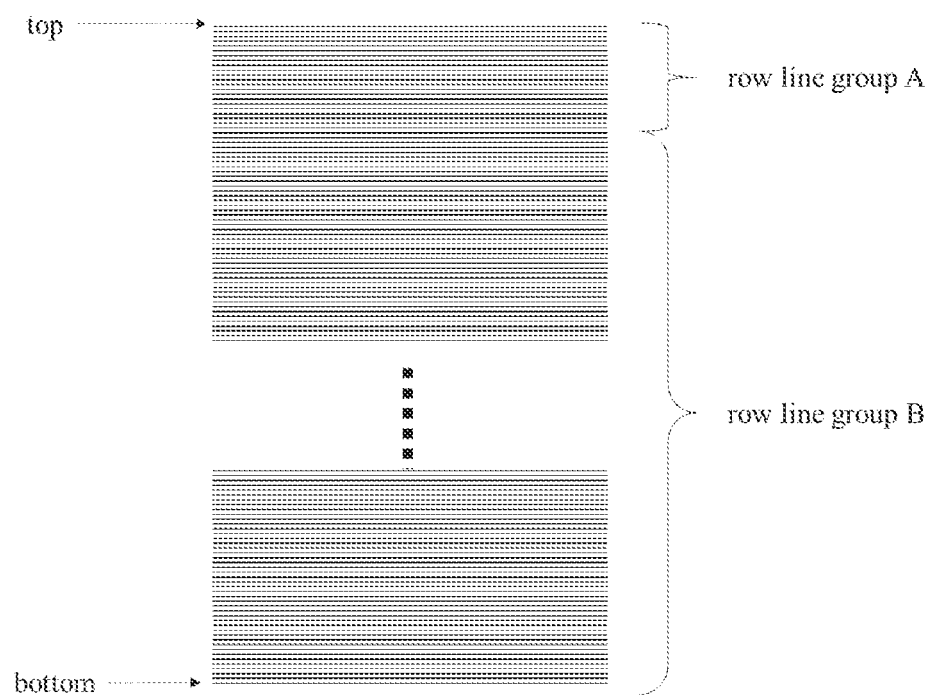
FIG. 47 is a drawing to illustrate an example wherein the cell array of identification cells is divided by row line groups.

FIG. 46 illustrates the method to divide the cell array by the row line groups. FIG. 47 illustrates an example wherein this row line groups are divided into upper and bottom two ones—the row line group A and the row line group B. The top end is named "top" and the bottom end is named "bottom". As an example, the row lines are bit lines and the column lines are word lines. As another example, the row lines are word lines and the column lines are bit lines.

Figure 48:
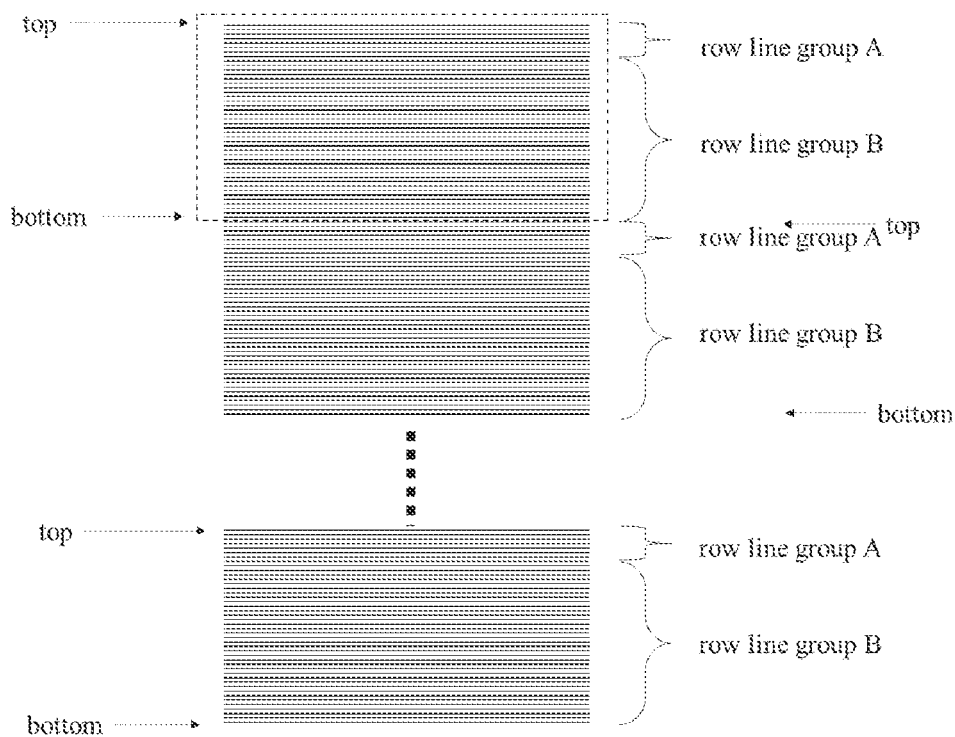
FIG. 48 is a drawing to illustrate an example wherein the cell array of identification cells is divided by row line groups.

FIG. 48 illustrates another example wherein this row line group is divided into the row line groups A and B. In the column direction, the row line groups A and B are layout alternatively. Tops of row line group A and bottoms of row line group B are alternatively repeated. The bottoms of row line group B and the tops of row line group A are adjoint each other in the vertical direction.

Figure 49:
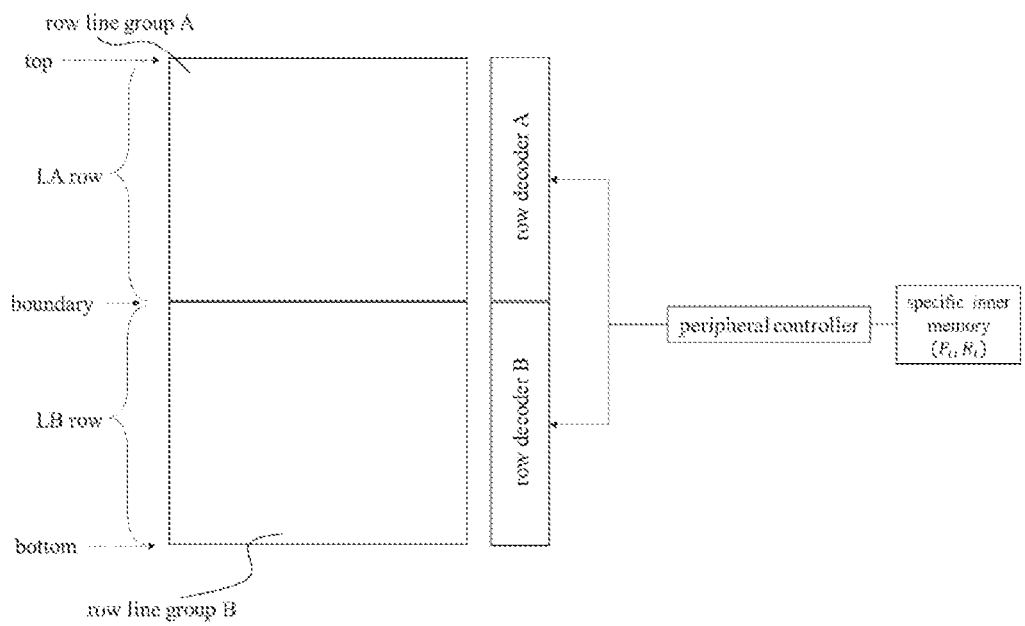
FIG. 49 is a drawing to illustrate an example of peripheral controller to control access identification cells on cell array which has been divided by row line groups.

Anyway, a row line group A and a row line group B are layout between a top and a bottom. As illustrated in FIG. 49, a row decoder A and a row decoder B are necessary, respectively. The number of row lines in the row line group A is LA and the number of row lines in the row line group B is LB. There is a boundary line between the row line group A and its adjoining row line group B. However, the boundary line is between the bottom of the row line group A (the bottom row line of it) and the top of the row line group B (the top row line of it) and does not correspond to neither any of word lines nor any of bit lines. Both row decoders A and B can be controlled by a peripheral controller. The peripheral controller can access a specific inner memory and use data (Fi, Ri) stored in the specific inner memory so as to control the operation of the row decoders A and B.

The row line group A is used as a redundancy row line group for the row line group B that is a regular cell array. If the row lines are bit lines, then the row line group A is a bit line redundancy area. If the bit lines are word lines then the row line group A is a word line redundancy area.

Figure 50:
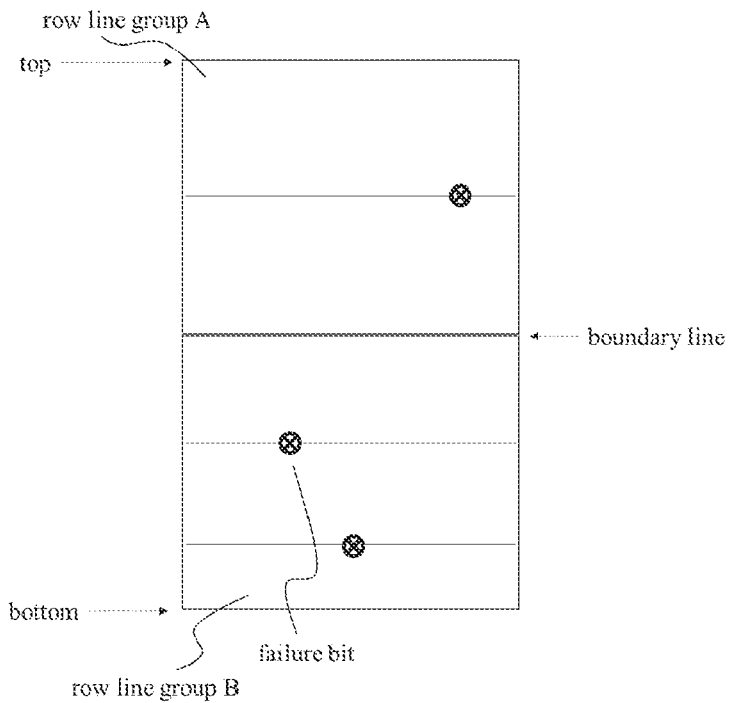
FIG. 50 is a drawing to illustrate an example of the method to use row line redundancy.

While chips are a mass-product, as illustrated in FIG. 46, it is unable to avoid an accidental entry of a failure bit. In FIG. 50, for example, there are failure bits on the cell array. The number of row lines with a failure bit having occurred (i.e., failure row lines) in the row line group A is mA. The number of row lines with a failure bit having occurred (i.e., failure row lines) in the row line group B is mB. A row line with no failure bit is a regular row line. The number of cases due to the distribution of failure bits can be given by the product of C (LA, mA) and C (LB, mB). However, C (S, T) is the combination to choose T components among S components. It can be converted to information quantity, log(C (LA, mA))+log(C (LB, mB)). In general, as the row line number of the cell array increases, the number of failure bits may increase. The information quantity of failure bit distributions is expected to increase as the bit capacity increases. In the example of this figure, mA=1 and mB=2. Furthermore, in the case that the division by the row line groups is adopted like in this embodiment, information quantity increases as the row line number (N in FIG. 14), or LA or LB increases.

Figure 51:
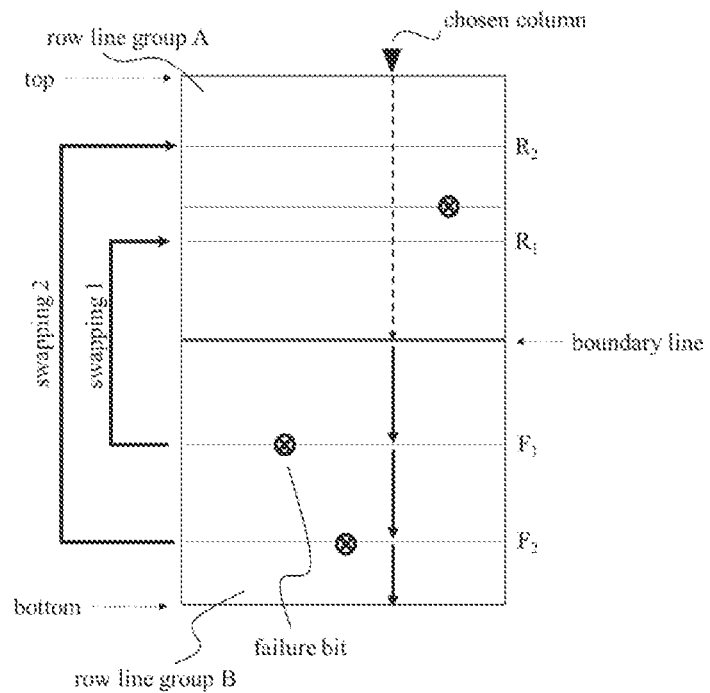
FIG. 51 is a drawing to illustrate an example of the method to use row line redundancy.

To access the row line group B (the regular cell array), as illustrated in FIG. 51, first, one of columns is chosen, and next, "normal access" is chosen in the access mode of the peripheral controller (see FIG. 49). Subsequently, the addresses below the boundary line are accessed in order along the chosen column. Though not specially illustrated since it is self-evident, a column decoder is necessary to choose one of columns like this.

If the access arrives at a row line with a failure bit, then the row number of it (F1) may be read and then stored in the specific inner memory (see FIG. 49). While, instead, the bit cell at the F1 row is not accessed, a bit cell at R1 row with no failure bit in the row line group A (i.e., the redundancy row line group) is accessed. R1 is also stored in the specific inner memory (see FIG. 49). This is called "swapping". After completing the swap 1, the access is to return back to the row line group B (i.e., the regular cell array) and then restarts from the row next to F1 row. If the access arrives at a row line with a failure bit again, then its row number (F2) is read and stored in the specific inner memory. While, instead, the bit cell at the F2 row is not accessed, a bit cell at R2 row with no failure bit in the row line group A (i.e, the redundancy row line group) is accessed. R2 is also stored in the specific inner memory (See FIG. 49).

As a result, the sets of {Fi, Ri} are stored as data in the specific inner memory, where i is an integer ranging from 1 to mB. The number of cases that swapping is done mB-times can be given by the product of C (LB, mB) and P (LA−mA, mB). However, P (S, T) is the permutation to line up T components among S components. It can be converted to information quantity, log(C (LB, mB))+log(P (LA−mA, mB)).

LA is required to be larger than the sum of mA and mB such that the swapping is always possible. Furthermore, LB is required to be much larger than mB such that the regular cell array is allowable as a mass-product. In this event as well, information quantity log(C (LB, mB))+log(P (LA−mA, mB)) can be large enough, as the bit capacity is large enough. Thus, the possibility that data stored in specific inner memory of a manufactured chip is accidentally identical to data stored in specific inner memory of another manufactured chip can be negligibly small. Additionally, since the occurring mechanism of failure bits is not dependent on any algorithm, it is physically random. Thus, the code of combination {Fi, Ri} stored in the specific inner memory can be regarded as a random number code specific to chip (i.e., an example of specific random number).

Figure 52:
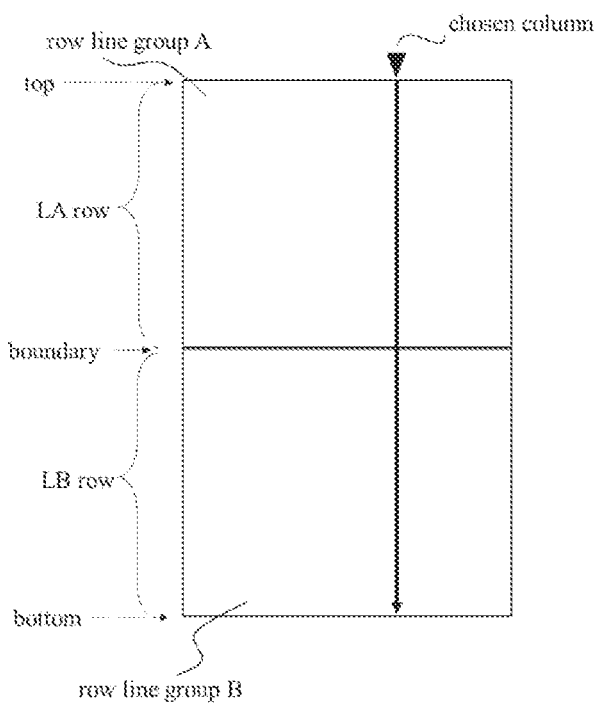
FIG. 52 is a drawing to illustrate an example of the method to use row line redundancy.

FIG. 52 is a drawing to illustrate test mode 1. First, one of column may be chosen. Next, "test mode 1" may be chosen in the access mode of the peripheral controller (see FIG. 49). The addresses are accessed in order along the chosen column from top to bottom across the boundary line. This is a mode to access all row lines over the row line groups A and B along the chosen column.

Figure 53:
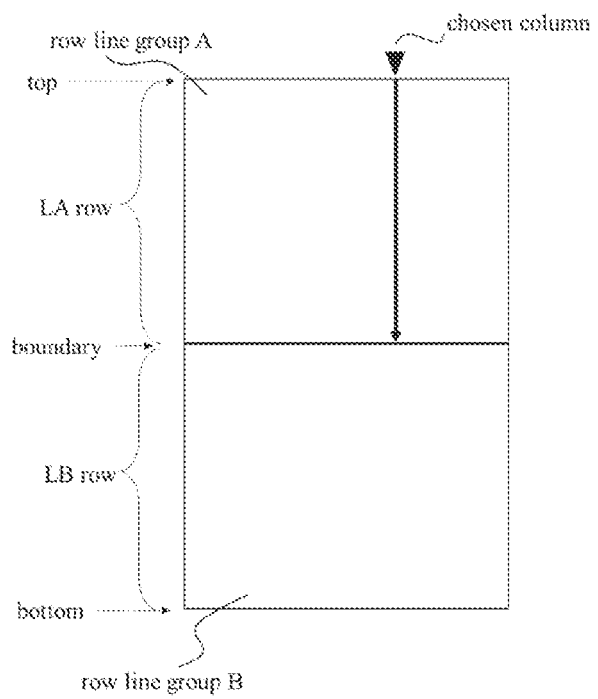
FIG. 53 is a drawing to illustrate an example of the method to use row line redundancy.

FIG. 53 is a drawing to illustrate test mode 2. First, one of column may be chosen. Next, "test mode 2" may be chosen in the access mode of the peripheral controller (see FIG. 49). The addresses are accessed in order along the chosen column from top before running over the boundary line. This is a mode to access the row lines belonging to the row line group A.

Figure 54:
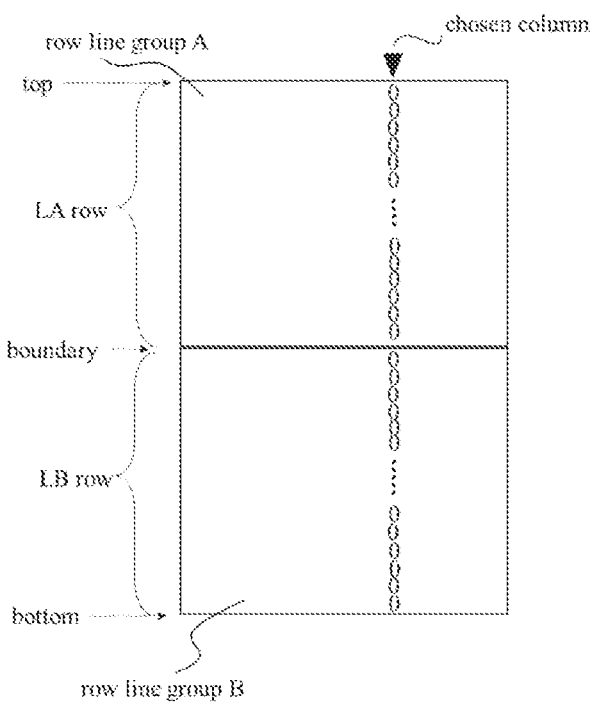
FIG. 54 is a drawing to illustrate an example of the method to use row line redundancy.

In FIG. 54, "test mode 1" has been chosen and zero "0" is written in all accessed addresses. First, one of column may be chosen. Next, "test mode 1" may be chosen in the access mode of the peripheral controller (see FIG. 49). The addresses are accessed in order along the chosen column from top to bottom across the boundary line. Thus, "0" is written in all addresses over the row line groups A and B along the chosen column.

Figure 55:
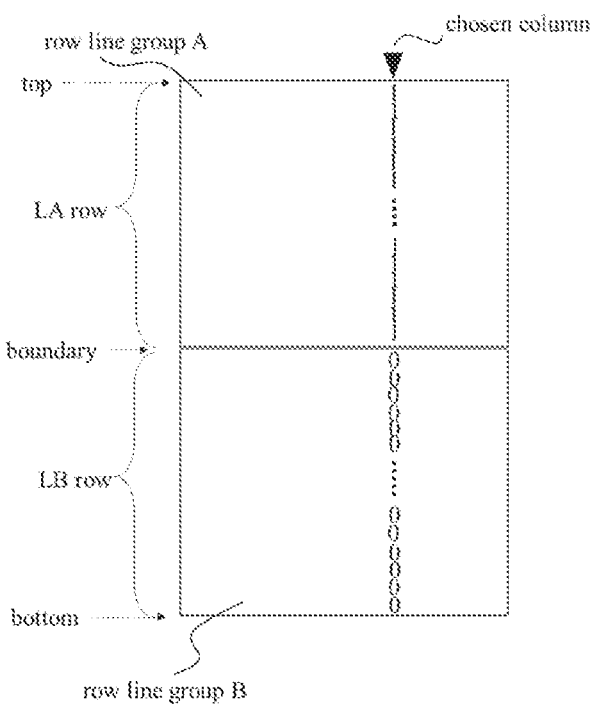
FIG. 55 is a drawing to illustrate an example of the method to use row line redundancy.

In FIG. 55, while the same column is chosen, the test mode 2 is chosen and then "1" is written. First, "test mode 2" may be chosen in the access mode of the peripheral controller (see FIG. 49). The addresses are accessed and then written "1" in order along the said chosen column from top before running over the boundary line. Thus, the addresses only in the row line group A along the chosen column are written "1", while those in the row line group B is kept "0".

Subsequently, in FIG. 56, "normal mode" was chosen in the access mode of the peripheral controller (see FIG. 49). Subsequently, the addresses have been accessed and then read out in order along the said chosen column from the boundary line to bottom. The mB rows having been swapped are turned over from "0" to "1" among the LB rows. Thus, we can obtain a random pattern of "0" and "1". Since the number of cases can be given by C (LB, mB), information quantity turns out being log(C (LB, mB)).

Since "0" and "1" are distributed along the said chosen column, we can obtain a random code like a barcode. This random code can be written by {d(i)}, which can be regarded as specific to chip while the bit capacity of chip is large enough, as mentioned above. That is, {d(i)} is a random number specific to chip and can relate to the Merkle root in FIGS. 38 and 39.

However, compared with the potential information quantity log(P (LA−mA, mB))+log(P (LB, mB)), the information quantity of this {d(i)} has reduced to log(C (LB, mB)).

Using an argument (n) to identify plural chips, an example of specific random number (n) of chip (n) can be written {dn(i)}.

It may be also allowable to replace "write 0" and "write 1" in the explanation of the present embodiment. Essentially, it may be good enough that at least two values can be treated with.

Some amount of power consumption may be necessary to obtain a specific random number by using test mode 1, test mode 2, and normal access mode. In a case that an electric power saving is required even a little bit, though not illustrated since it is self-evident, wiring lines to access the specific inner memory is necessary. The power saving mode wherein the specific inner memory is directly accessed using the wiring lines like this may be possible. In this event, {Fi, Ri}, which is an example of specific random number, can be read and then obtained while the power saving mode is chosen as an access mode. It can avoid missing information quantity due to the code conversion.

If the row number of the row line group A (i.e., the redundancy row number), LA, is too small, then it may sometime be unable to swap. To avoid this kind of situation, LA is required to be larger than the sum of mA and mB. It is able to check if this condition is satisfied.

Subsequently, we explain the check mode of address space. First, plural sets of arbitral addresses are chosen. The identification cells at chosen addresses are written and then read. Then, we may check if the read data and written data is consistent or not. If sufficient number of cells are consistent, then this chip can be deemed (named, passing exam) as holding sufficient address space for an identification chip. Otherwise, the examined chip is disqualified.

Figure 57:
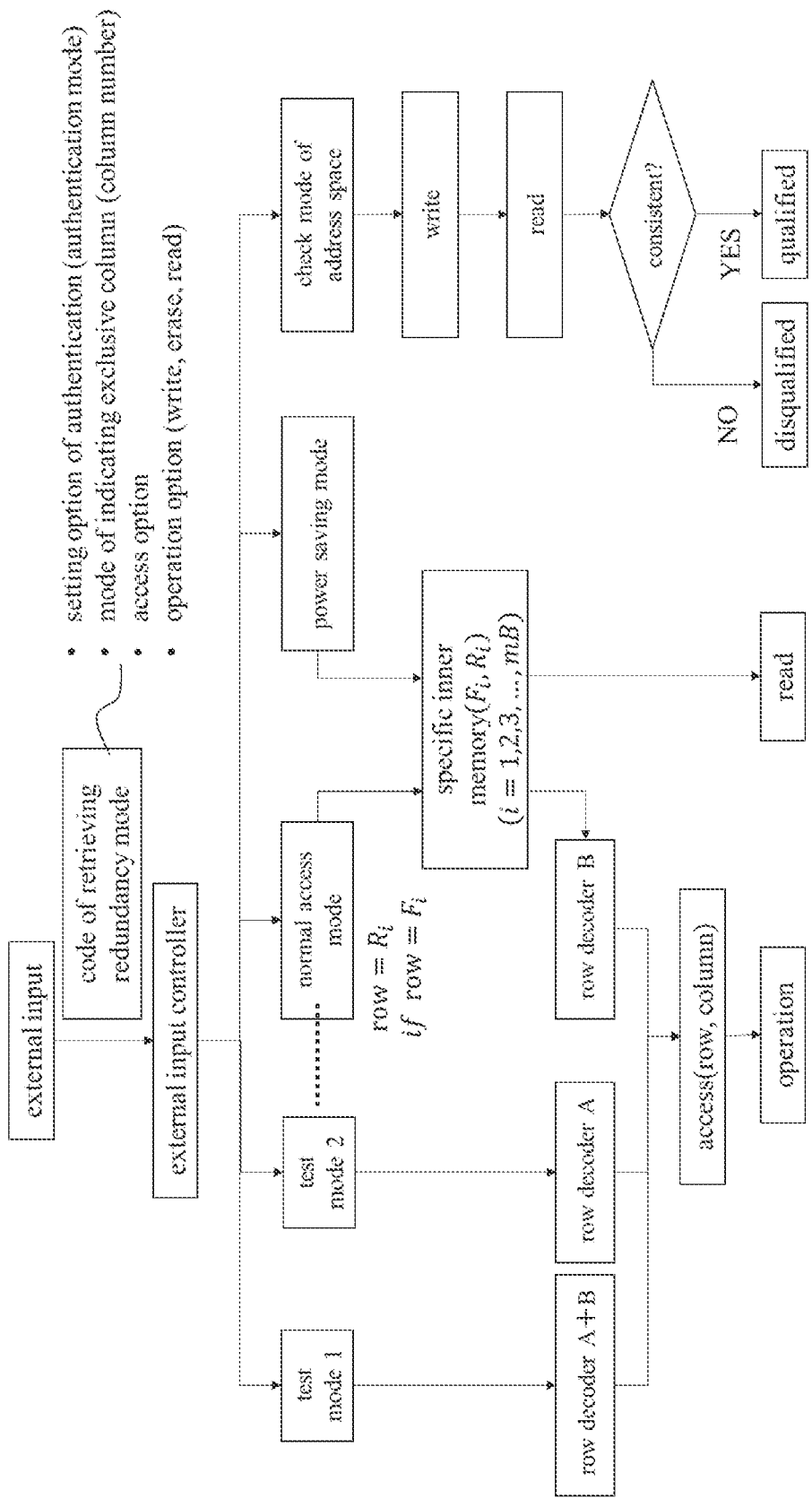
FIG. 57 is a drawing to illustrate an example of the utilization method of the code of retrieving redundancy mode.

FIG. 57 is a summary of the above-mentioned access modes and operation modes. A code of retrieving redundancy mode can be given to an inspection device using an external input-output. This can be included into the challenge C and also given separately. The code of retrieving redundancy mode holds access option to choose access mode, operation option to set operation mode (write, erase, read), and so forth as arguments.

As mentioned above, the access mode is from test mode 1, test mode 2, normal access mode, power saving mode, check mode of address space and so forth.

In the normal access mode, only the addresses belonging to the row line group B (i.e., the regular cell array) are accessed along a chosen column. Then, if the row number is identical to Fi, then its row number is swapped with Ri. However, Fi and Ri have been stored as the redundancy data {Fi, Ri} in the specific inner memory (see FIG. 49). The suffix "i" is an integer ranging from 1 to mB. It is preferable that the redundancy data is retrieved and then stored in the specific inner memory at the test before the shipment.

In this embodiment, test mode 1 is an access mode to access a cell array using both row decoders A and B. Test mode 2 is an access mode to access a cell array using only the row decoder A.

Figure 58:
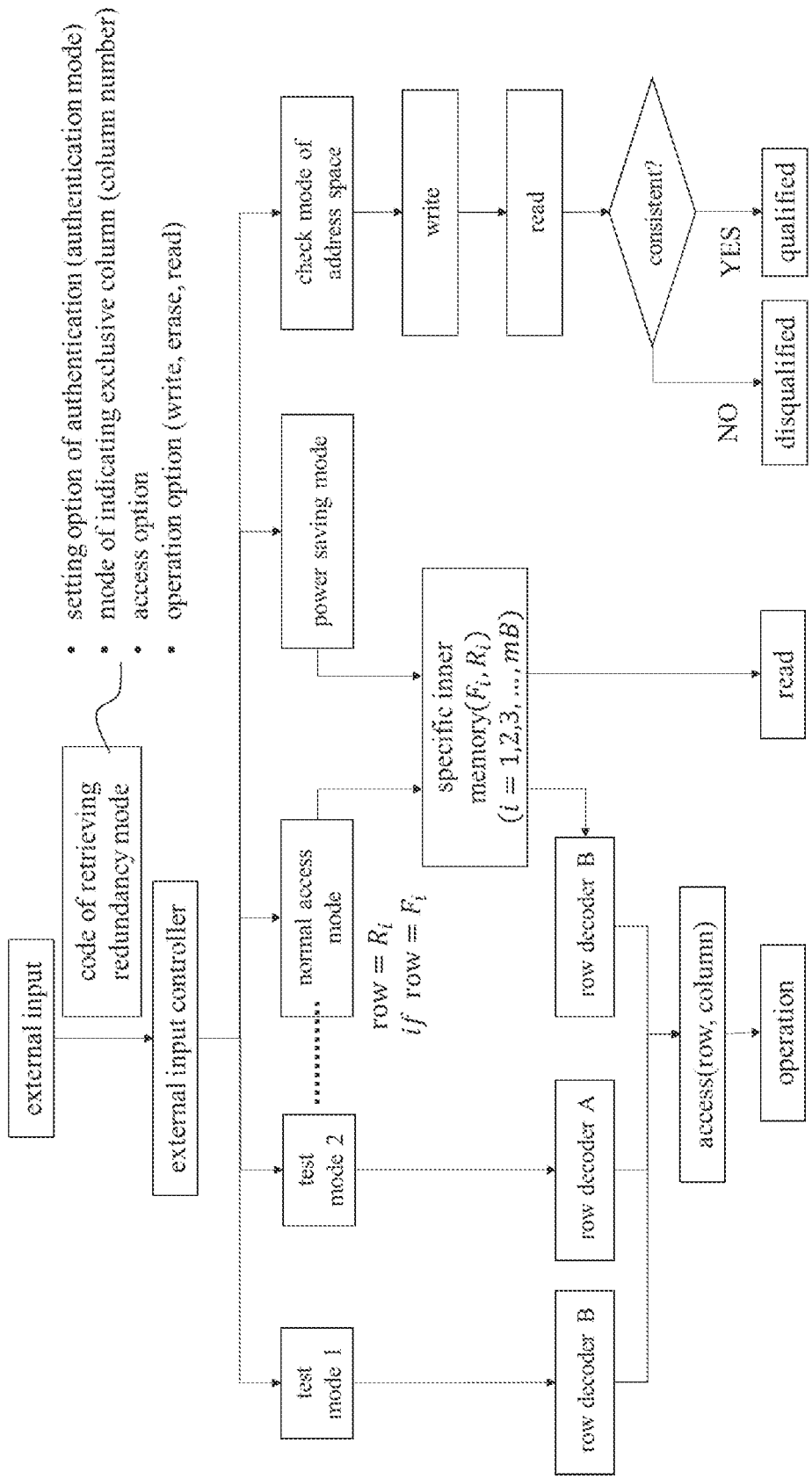
FIG. 58 is a drawing to illustrate an example of the utilization method of the code of retrieving redundancy mode.

The specific random number {d(i)}, specific to a chip, can be obtained even by replacing test mode 1 to an access mode to use only the row decoder B, as illustrated in FIG. 58. As an example, FIG. 55 can be also obtained by performing "write 0" in test mode 1 and then "write 1" in test mode 2. Subsequently, the read may be performed in the normal access mode. Of course, it is allowable to exchange "0" and "1".

Figure 59:
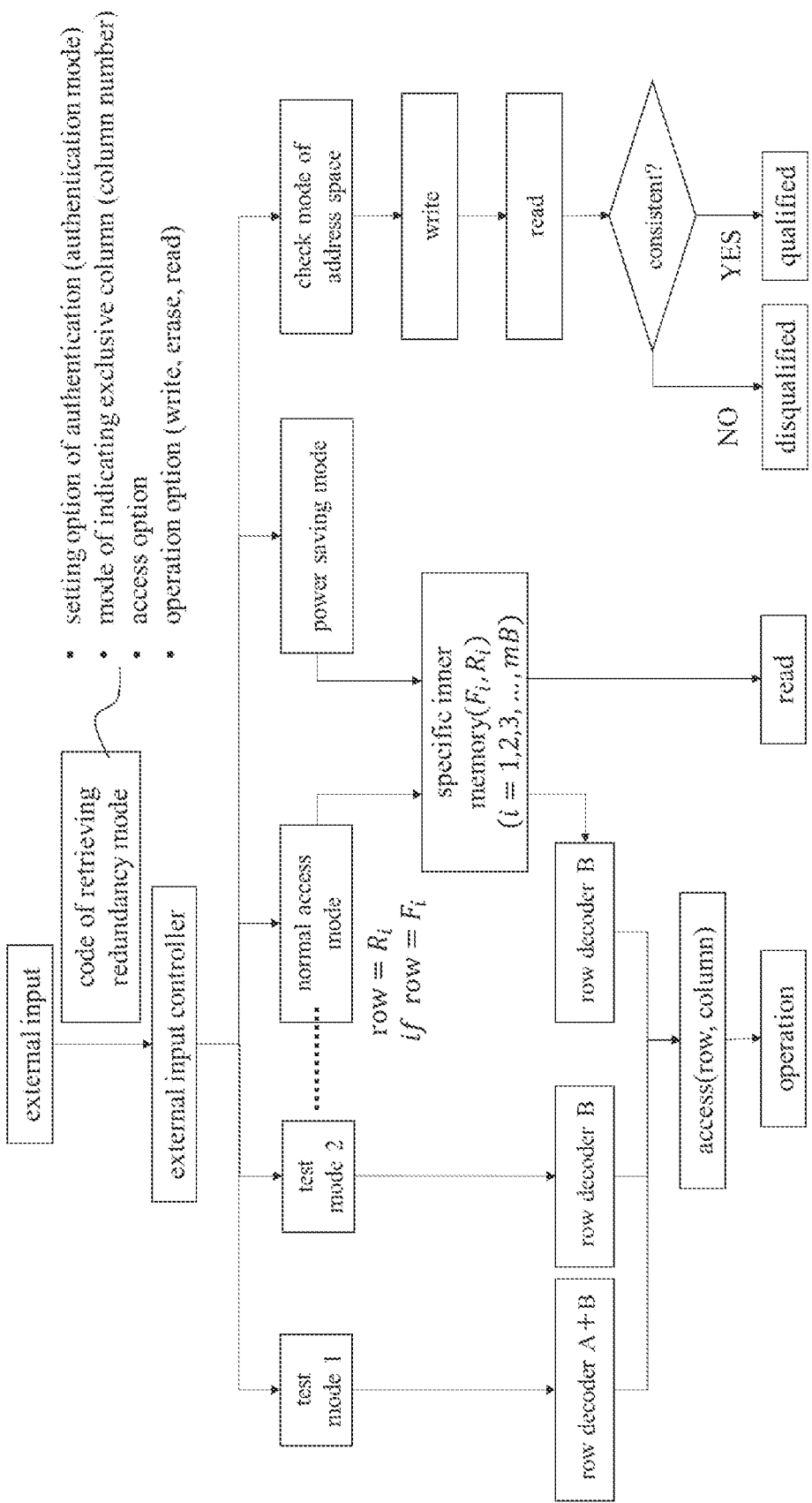
FIG. 59 is a drawing to illustrate an example of the utilization method of the code of retrieving redundancy mode.

The specific random number {d(i)}, specific to a chip, can be obtained even by replacing test mode 2 to an access mode to use only the row decoder B, as illustrated in FIG. 59. As an example, FIG. 55 can be also obtained by performing "write 0" in test mode 1 and then "write 1" in test mode 2. Subsequently, the read may be performed in the normal access mode. Of course, it is allowable to exchange "0" and "1".

The access option is an option to switch the choice of the row decoders A and B. In FIGS. 57-59, we demonstrated that different binary data ("0" or "1") can be written in the row line groups A and B, respectively, by choosing test modes 1 and 2 in order.

Figure 60:
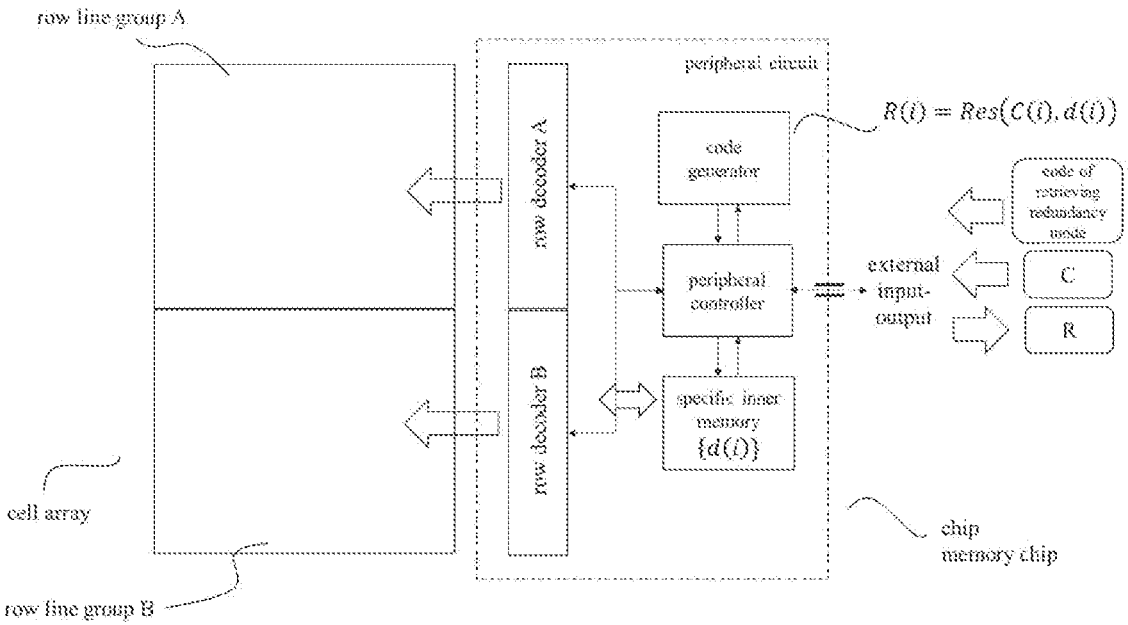
FIG. 60 is a drawing to illustrate an example of peripheral circuit to control access identification cells on cell array which has been divided by the row line groups.

In general, the area other than the cell array in chip is called a peripheral area. In FIG. 60, the module configuration in the peripheral area to handle the row decoders A and B is illustrated. As mentioned above, the cell array is divided into the row line groups A and B, which can be controlled by the row decoder A and B, respectively. The peripheral controller can co-work with an external input-output to receive the above-mentioned challenge C and the code of retrieving redundancy mode as external inputs. The code of retrieving redundancy mode can be distributed to the row decoders A and B and then used for controlling the row decoders A and B, as illustrated in FIGS. 57-59.

Figure 56:
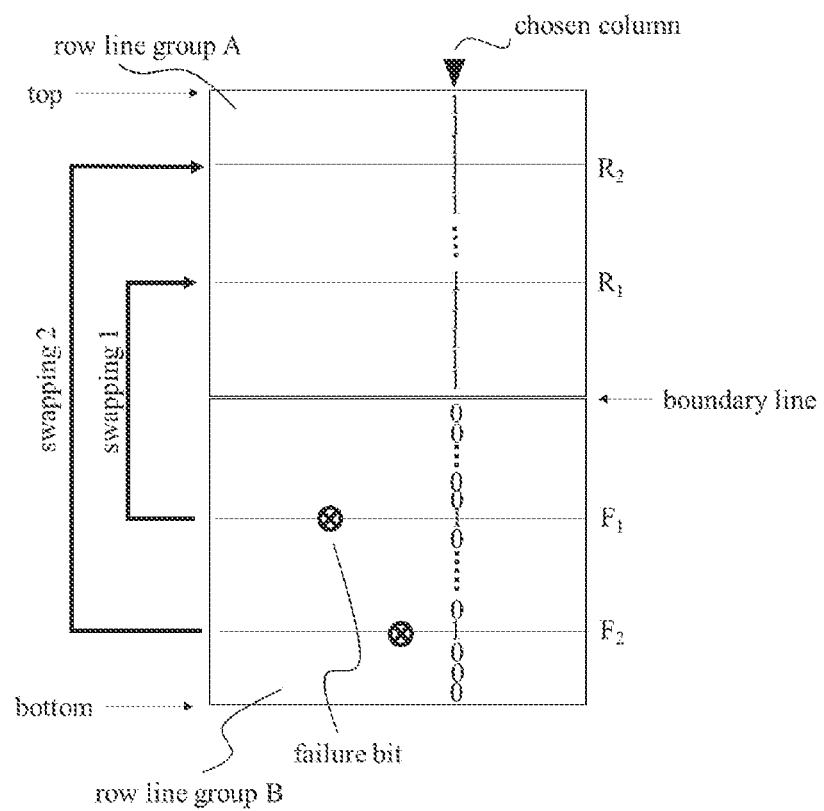
FIG. 56 is a drawing to illustrate an example of the method to access identification cells on the cell array which has been divided by row line groups.
Figure 61:
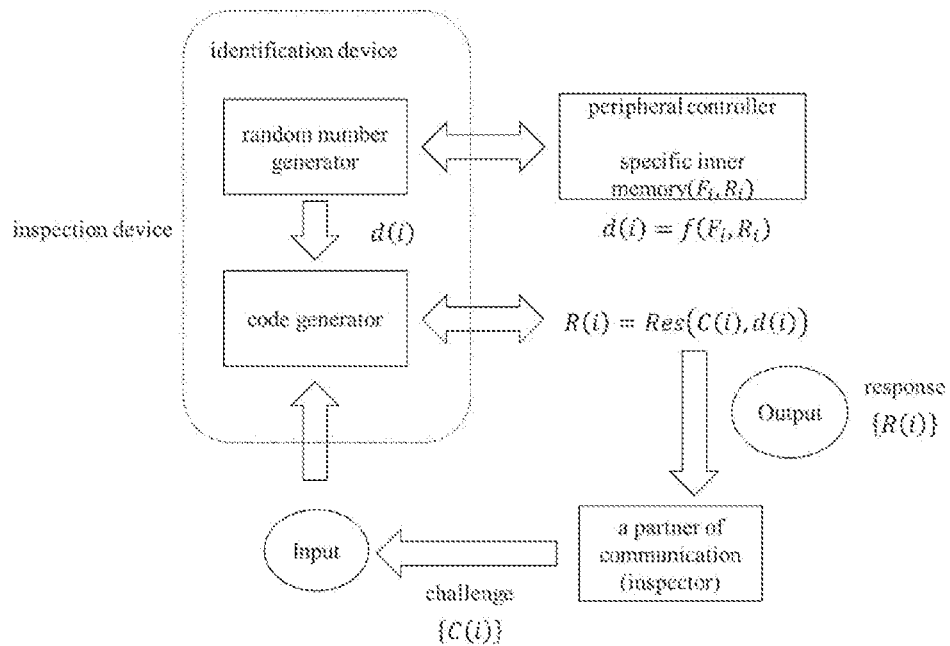
FIG. 61 is a drawing to illustrate an example of the concept of the authentication method of electronic apparatus of the present invention.

As an example, we can obtain the specific random number {d(i)} using the redundancy data {Fi, Ri} stored in the specific inner memory as a result of the above-mentioned FIG. 56. That is, as illustrated in FIG. 61, d(i) can be obtained by converting {Fi, Ri} with a function f. In a case that f is a dummy function which does nothing, the redundancy data itself is a specific random number. This specific random number {d(i)} is an ensemble of d(i) and is distributed to the code generator together with the challenge C having been received as an external input. The code generator can response an ensemble of R(i), that is, {R(i)}, as a response according to an appropriate response function Res (see below). However, the challenge is an ensemble of C(i), that is, {C(i)}.

$$R(i)=Res(C(i),d(i)) \quad \text{Eq. 3}$$

While the ensemble {d(i)} is specific to a chip, the function Res can satisfy the equation in Eq. 1 and Eq. 2.

Finally, {R(i)} is output as the response R from an external input-output.

Figure 40:
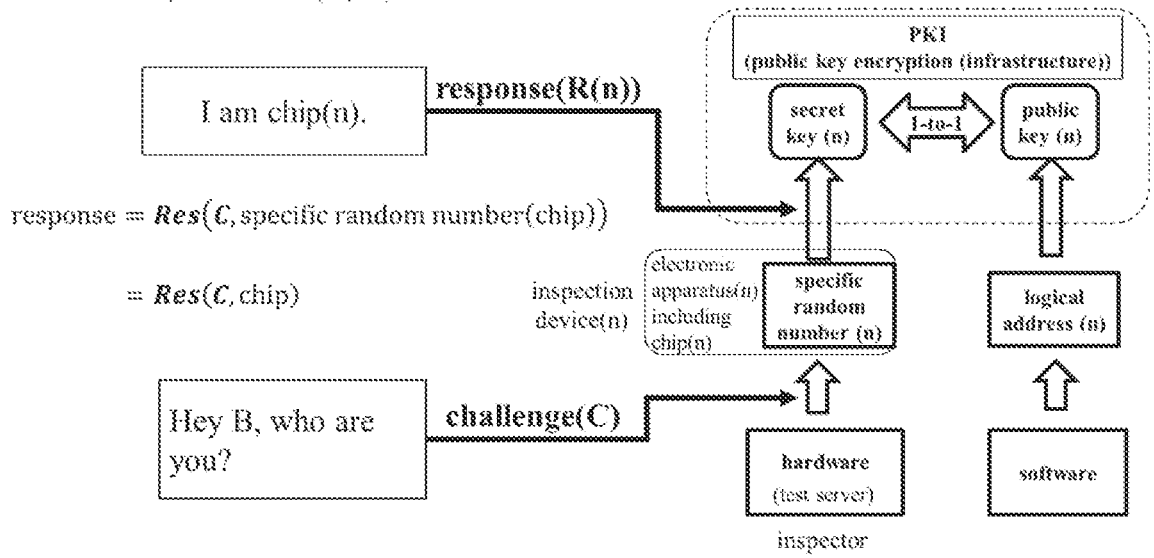
FIG. 40 is a drawing to illustrate an example of the concept of the authentication method of electronic apparatus of the present invention.

Like this, it is able to realize the idea (or concept) of FIGS. 13 and 40 using a specific random number having been retrieved from the specific inner memory. Adopting the present embodiment, it is able to retrieve the specific random number of FIGS. 13, 30-35, and 40 using the redundancy data {(Fi, Ri)}. However, the redundancy data {(Fi, Ri)} relating to the specific random number is to be stored in the specific inner memory inside the electronic apparatus B. It may be allowable that this redundancy data {(Fi, Ri)} is used as a specific random number with no code conversion. Or it is allowable that the redundancy data {(Fi, Ri)} is used as a specific random number with a code conversion. It is allowable that a specific inner memory is located inside the electronic apparatus B together with a chip relating to the specific random number or inside this chip. Anyway, it is preferable that this specific inner memory is specific to the electronic apparatus B.

(Exclusive Authentication Column)

Figure 62:
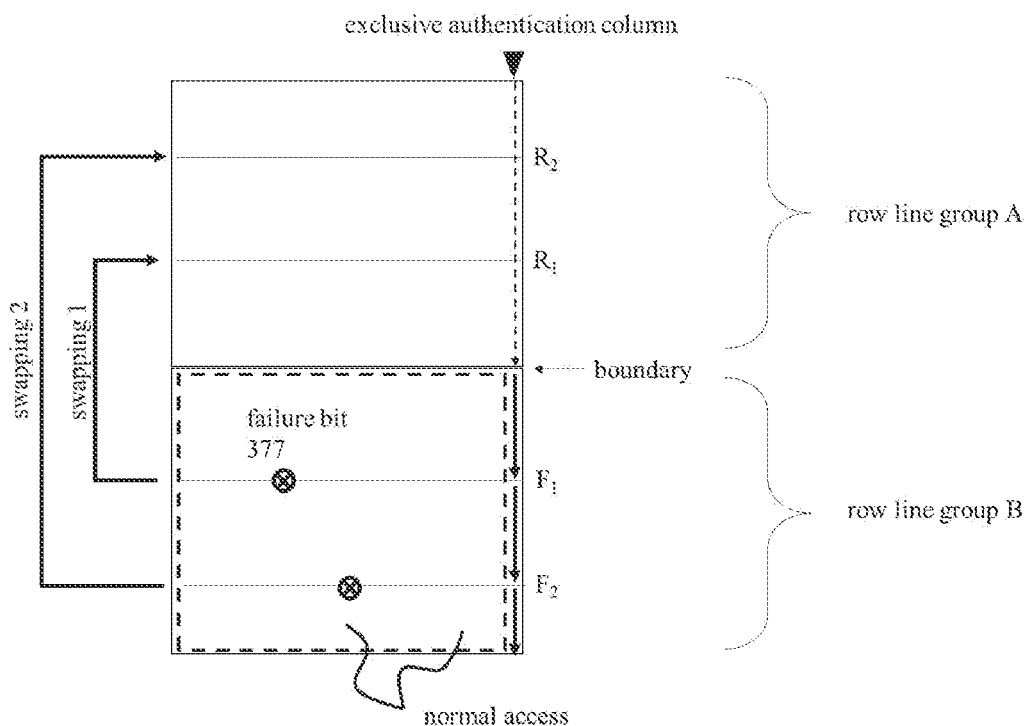
FIG. 62 is a drawing to illustrate an example of the method to access an indication cell on the cell array with an exclusive authentication column.
Figure 63:
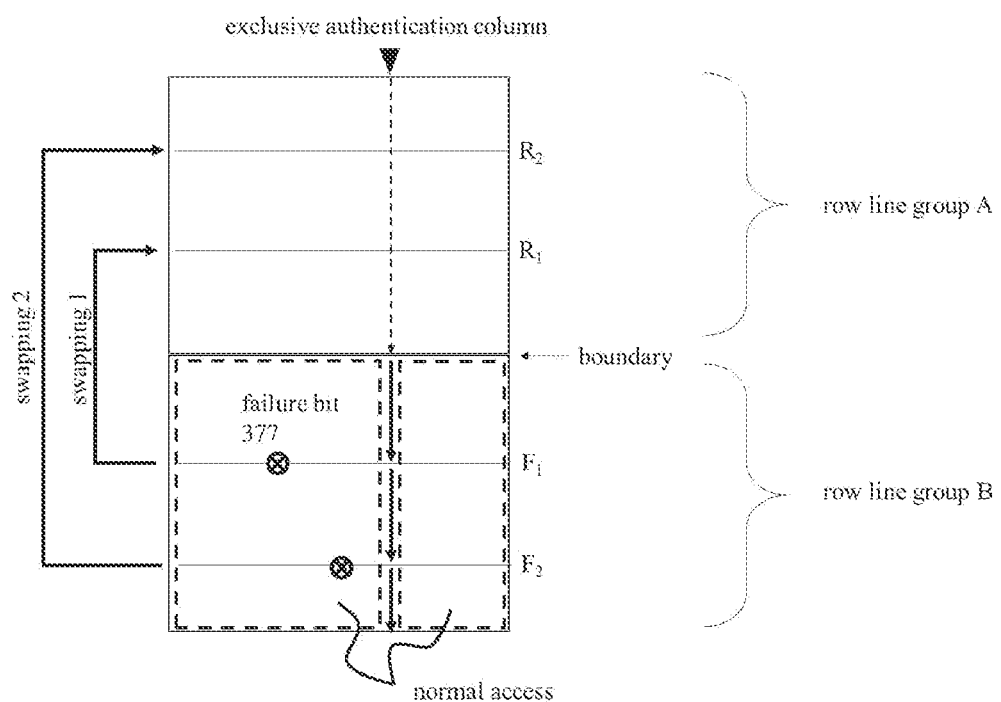
FIG. 63 is a drawing to illustrate an example of the method to access an indication cell on the cell array with an exclusive authentication column.

The cell array of chip may be accessed randomly for the usage other than the authentication during chip operation. In such a case, it may be necessary to avoid an inconsistency between the cell array accesses for the authentication process of the present invention and for the other operation process of chip. In the present embodiment, there is a measure by preparing an exclusive authentication column. FIG. 62 illustrates an example wherein the said exclusive authentication column is located at the right end. FIG. 63 illustrates another example wherein the said exclusive authentication column is located in the right-hand side near to the center.

It is required to prohibit the access to this exclusive authentication column in a case that the chip operates a process other than the authentication. For this, it is required to newly add a setting option of authentication to choose either the authentication mode or non-authentication mode as an argument of the code of retrieving redundancy mode. FIGS. 57-59 are an example wherein the authentication mode has been chosen.

Furthermore, it may be allowable to add a mode to choose an exclusive authentication column (i.e., the mode of choosing exclusive authentication column) as an argument of the code of retrieving redundancy mode. In this event, the row number of the exclusive authentication column may be an argument of the mode of choosing exclusive authentication mode. For example, it may be expressed as "mode of choosing exclusive authentication (column number)". FIG. 62 illustrates an example wherein the said exclusive authentication column is located at the right end. FIG. 63 illustrates another example wherein the said exclusive authentication column is located in the right-hand side near to the center.

In a case wherein the authentication mode has been chosen as an argument of the setting option of authentication, the column number having been chosen by the mode of choosing exclusive authentication column may be chosen as the exclusive authentication column. Subsequently, one of test mode 1, test mode 2, and normal access mode in the access mode. And then, it is preferable that the authentication is processed according to the recipe of FIGS. 57-59.

In a case wherein non-authentication mode has been chosen as an argument of the setting option of authentication, a column number having not been chosen by the mode of choosing exclusive authentication column may be chosen. Subsequently, the normal access mode may be chosen.

102661 (Block redundancy) As mentioned above, information quantity of specific random number reduces from log(P (LA−mA, mB))+log(P (LB, mB)) to log(C (LB, mB)) if dividing the cell array by the row line groups. To suppress reduction of information quantity, we can expect the method to divide the cell array of FIG. 14 not by the row line groups and by subblocks.

Figure 64:
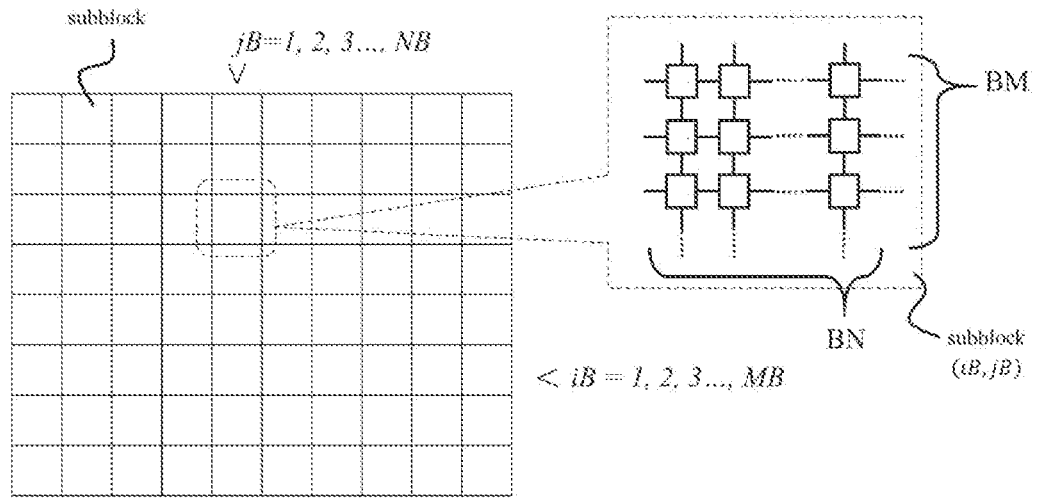
FIG. 64 is a drawing to illustrate an example of the utilization method of block redundancy.

FIG. 64 illustrates an example wherein the cell array of FIG. 14 is divided into subblocks. The number of subblocks along the row direction is MB. The number of subblocks along the column direction is NB. A subblock address (iB, jB) is allocated to each subblock, where iB is a natural number ranging from 1 to MB and jB is a natural number ranging from 1 to NB. This can be named block array.

Figure 65:
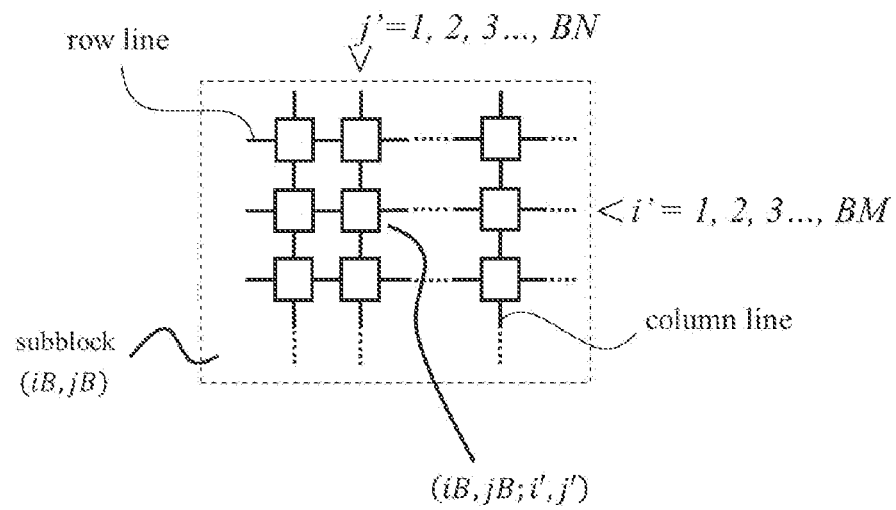
FIG. 65 is a drawing to illustrate an example of the utilization method of block redundancy.

FIG. 65 illustrates an example of a cell array inside a subblock. The numbers of row and column lines inside each subblock are BM and BN, respectively. An address (i', j') inside the subblock is allocated to each bit cell, where i' is a natural number ranging from 1 to BM and j' is a natural number ranging from 1 to BN. A row line is either a bit line or a word line. A column line is either a word line or a bit line. For example, the present embodiment turns out being identical to the division by row lines if BN is 1. Accordingly, the division by subblocks (block division) can be regarded as a generalized version of the division by row lines (row lines division).

Figure 66:
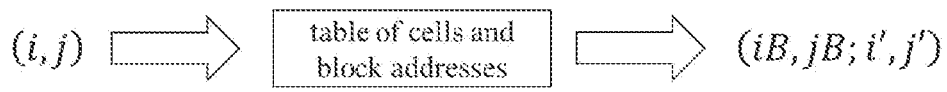
FIG. 66 is a drawing to illustrate an example of a correspondence table of cells and block addresses, which is used for block redundancy.

The address of bit cell (identification cell), that is, the bit address, can be expressed by giving the subblock address and the address inside the subblock. FIG. 66 illustrates an example of the method to convert a bit address (i, j) to that of the present embodiment. That is, a cell and block address table is necessary. It is a correspondence table between an arbitral address on the cell array and its corresponding set of subblock address and address inside the subblock.

First, according to FIGS. 64 and 65, the table of cells and block addresses will be generated. A bit address (i, j) can be converted to (iB, jB; i', j') using this table of cell and block address, where the first half (iB, jB) is a subblock address and the second half (i', j') is an address inside the subblock.

Figure 67:
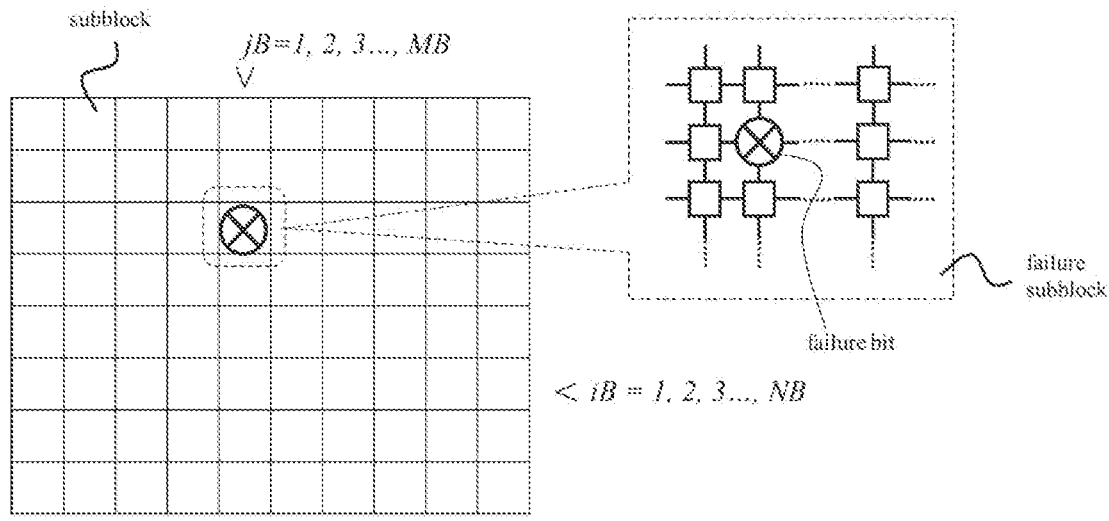
FIG. 67 is a drawing to illustrate an example of the utilization method of block redundancy.

FIG. 67 illustrates an example with a failure bit inside a subblock. A subblock with a failure bit like this can be called a failure-subblock. Thus, the failure-subblocks may be distributed on the block array.

Figure 68:
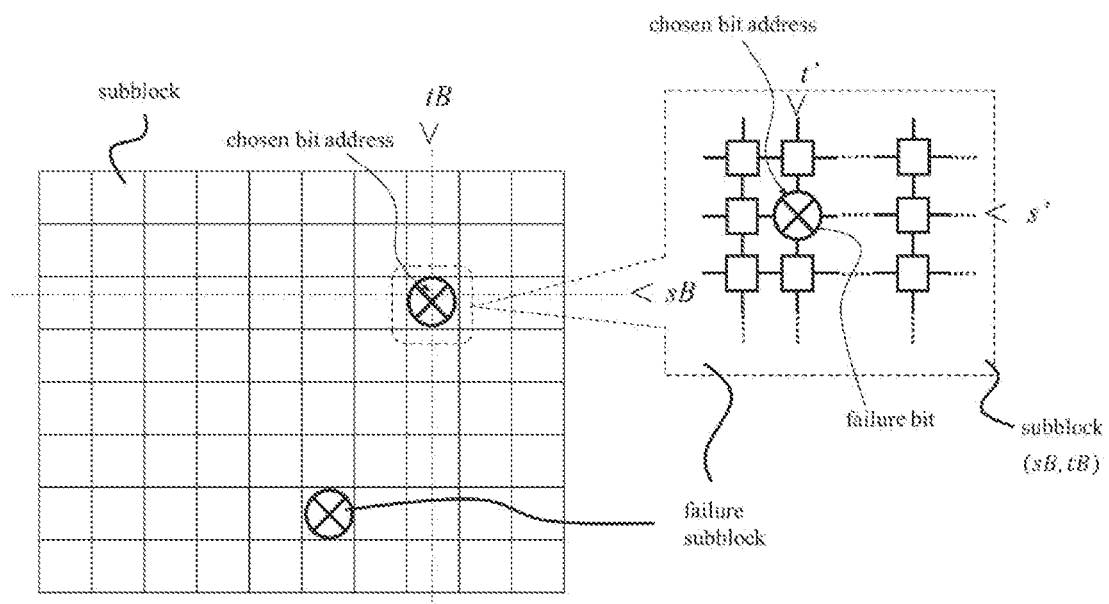
FIG. 68 is a drawing to illustrate an example of the utilization method of block redundancy.
Figure 69:
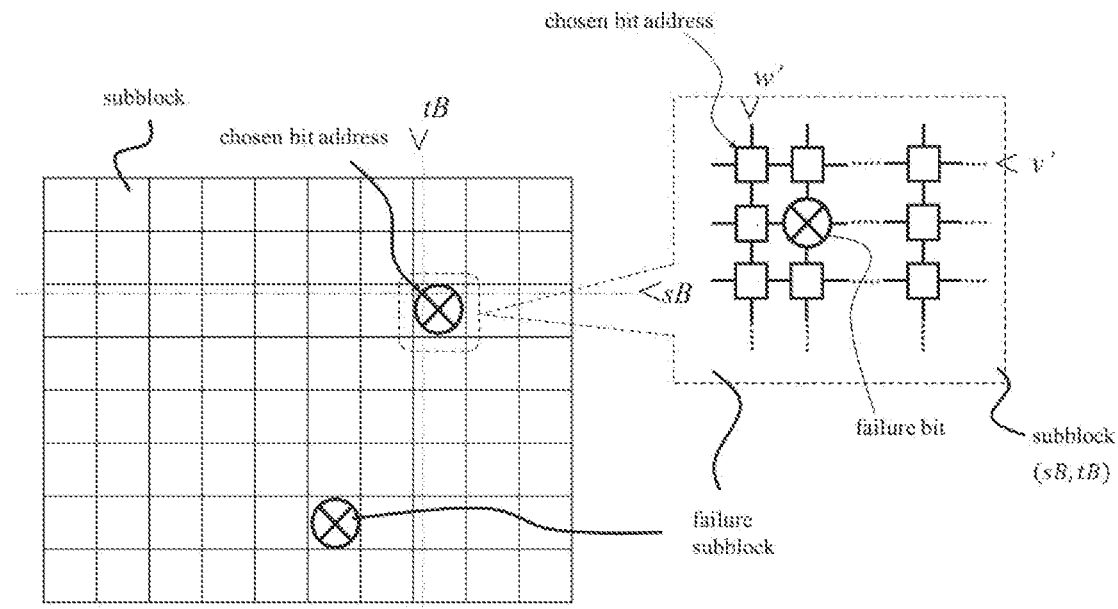
FIG. 69 is a drawing to illustrate an example of the utilization method of block redundancy.
Figure 70:
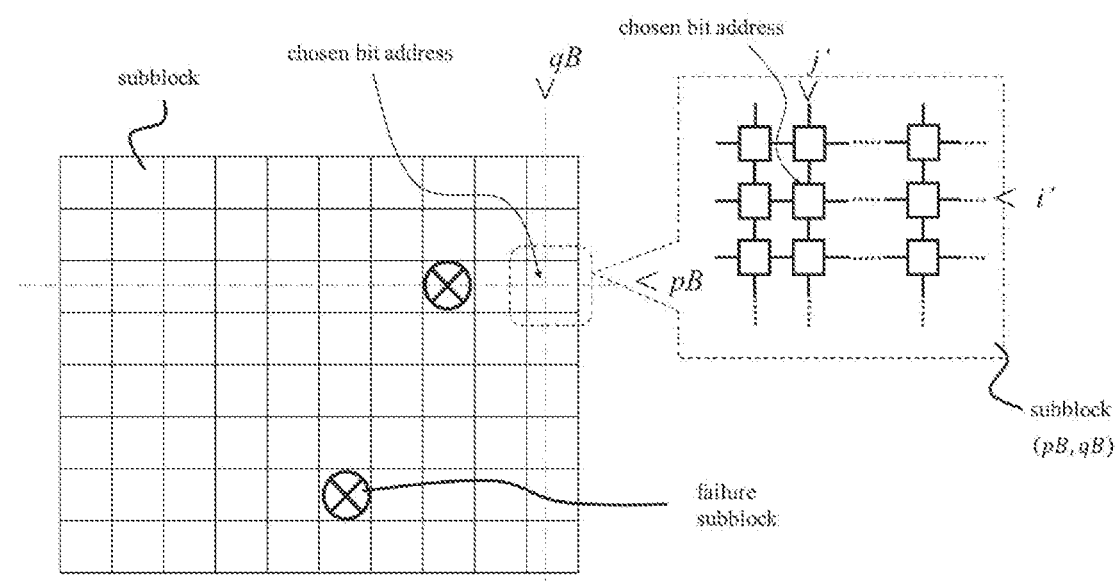
FIG. 70 is a drawing to illustrate an example of the utilization method of block redundancy.

FIGS. 68-70 illustrate an example wherein two failure-subblocks are distributed on a block array. In FIG. 68, a subblock address (sB, tB) is allocated to one of failure-subblocks. There is a failure bit at an address inside the subblock (s', t'), and then the bit address of this failure bit can be expressed by (sB, tB; s', t').

On the other hand, FIG. 69 illustrates a case with no failure bit at an address (v', w') inside a failure-subblock to which a subblock address (sB, tB) is allocated.

On the hand, FIG. 70 illustrates a case with no failure bit inside a subblock to which a subblock address (pB, qB) is allocated. In a bit address (pB, qB; i', j'), for any (i', j'), that is an address inside the subblock, there is no failure bit. Subblock like this can be called a regular subblock.

Figure 71:
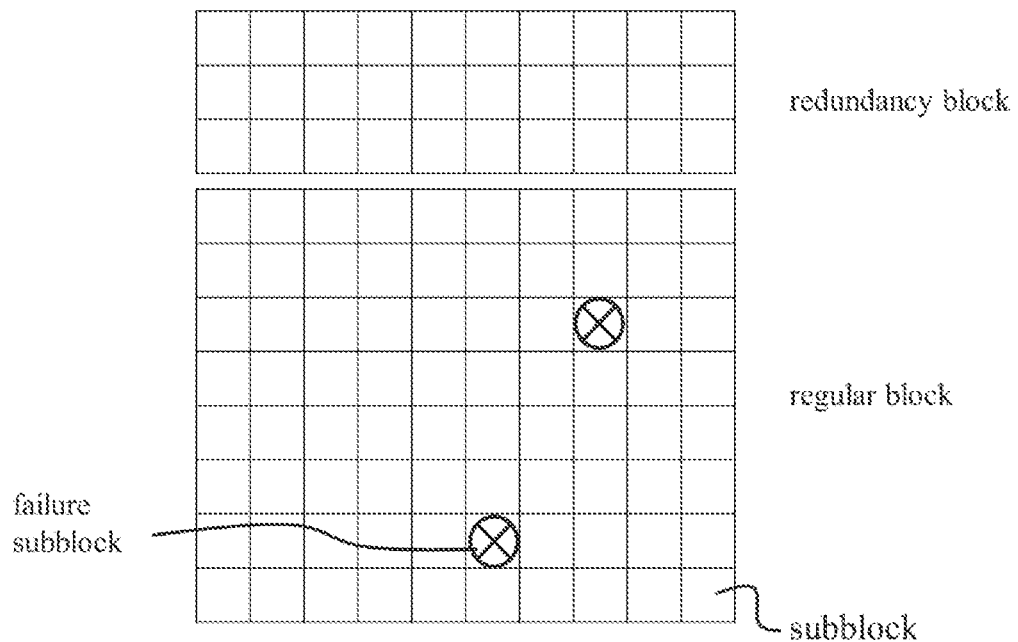
FIG. 71 is a drawing to illustrate an example of the utilization method of block redundancy.

No defective is impossible for any mass-produced goods. Thus, it is important to control and suppress the impact of defectives though defectives are involved. Since it is impossible to perfectly exclude all failure bits from the cell array of FIG. 14, the group of subblocks of FIG. 64 may be divided to redundancy block and regular block. FIG. 71 illustrates a case wherein two failure-subblocks are distributed in the regular block.

Figure 72:
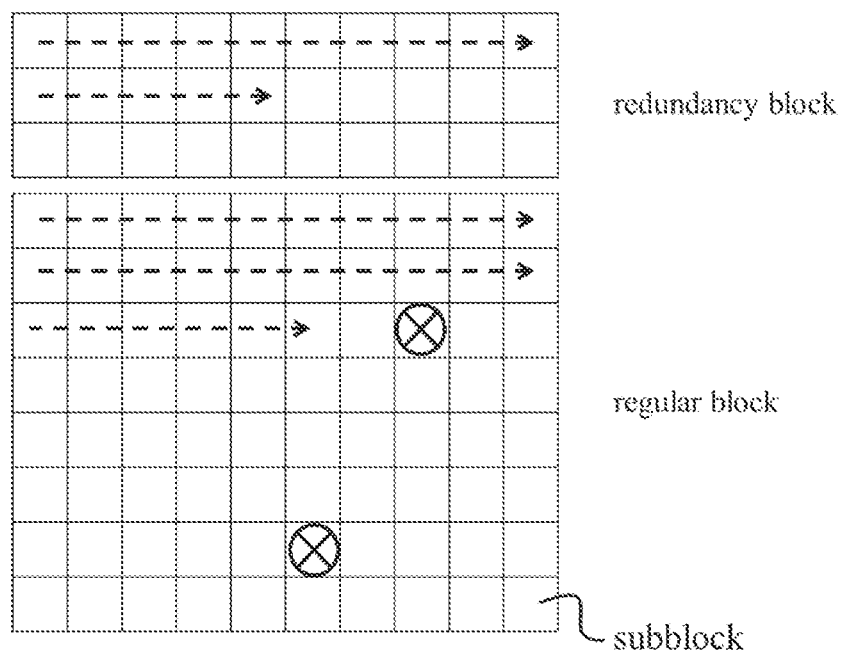
FIG. 72 is a drawing to illustrate an example of the utilization method of block redundancy.

FIG. 72 illustrates an example of the method to search (or access) a failure-subblock on a block array having been divided into a redundancy block and a regular block.

First, a subblock is one by one chosen in the regular block and then it is checked if there is a failure bit inside. However, to the ease of explanation, the subblock address having been allocated to the left-top subblock that is to be firstly checked is (1, 1). o check if there is a failure bit, it is to check if there is a failure bit at an address (i', j') inside the subblock. That is, (1.1; i', j') is to be inspected, where i' ranges from 1 to BM and j' ranges from 1 to BN. If no failure bit has not been found even after searching from (1, 1; 1,1) to (1, 1; BM, BN), then this subblock can be deemed as a regular subblock. Otherwise, this subblock can be deemed as a failure-subblock. Next, by updating subblock address, e.g., (1, 2; i', j'), a similar procedure may be repeated until all subblocks are searched in the regular block.

In the example of FIG. 72, the subblock address of the top-left in the regular block was set (1,1), from which the search (or access) of subblocks can start and then move along the row direction. If the search arrived at the right end of the row line, then the next row line may be chosen to continue the search from (2,1). A similar method is applicable to the search (or access) of subblocks in the redundancy block.

By this way, we can obtain the group of subblock addresses of failure-subblocks {failure-subblock (iB, jB)} and that of addresses of failure bits {(iB, jB; i', j')}. Both can be deemed as specific random numbers, which are specific to a chip. Though the group of subblock addresses of failure-subblocks has less quantity of information than the group of {(iB, jB; i', j')} does, it is possible to reduce the loss of information quantity by reducing the bit number inside subblock.

Figures 73, 74:
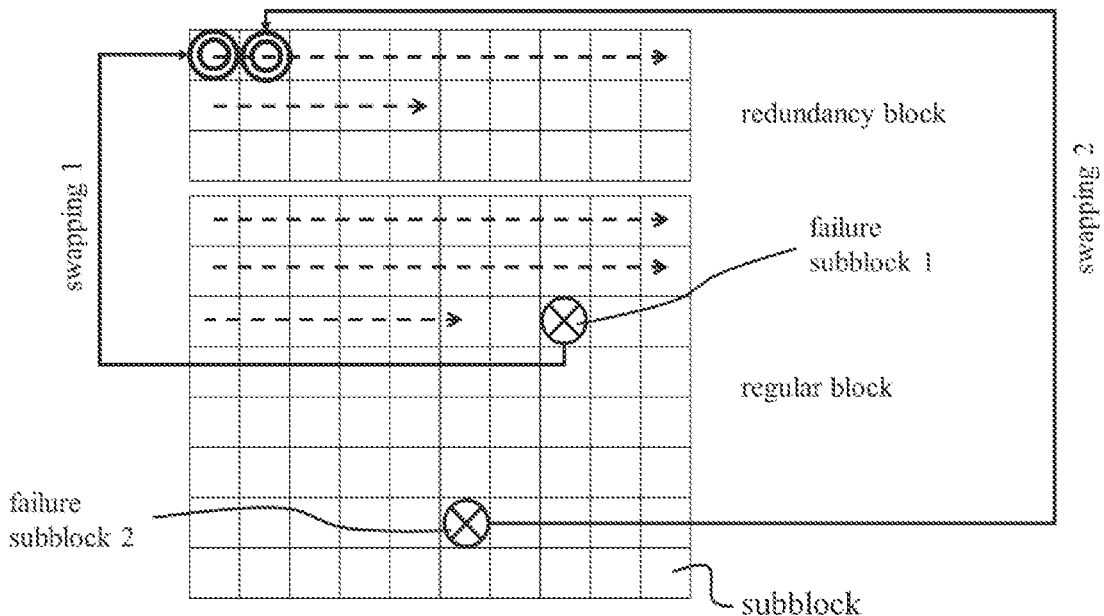
FIG. 73 is a drawing to illustrate an example wherein a distribution of failure subblock addresses is expressed by binary code.
FIG. 74 is a drawing to illustrate an example of the utilization method of block redundancy.

In this embodiment, the group of subblock addresses of failure-subblocks {failure-subblock (iB, jB)} can be deemed as a redundancy data. In general, since the redundancy data relates to a specific random number, we can regard the group {failure-subblock (iB, jB)} as a specific random number. In FIG. 73, for example, the group of subblock addresses of failure-subblocks is lined up in binary representation. Like this, the group {failure-subblock (iB, jB)} can be obtained as a random code expressed in the binary representation of "0" and "1", which is specific to a chip. This redundancy data may be obtained and then stored in an specific inner memory at test before shipment of chips.

FIG. 74 illustrates an example of the method of swapping subblocks. Though the search (access) is carried out in the row direction in this example, the search along the column direction is also allowable, as illustrated in FIG. 52. In particular, if the power saving is not a problem, then it is preferable to generate a specific random number from the group {failure-subblocks (iB, jB)} by using this method. Though not especially illustrated since it is self-evident, various searching methods are applicable in the present invention.

First, subblocks inside the regular block are one by one searched (or accessed) using the above-mentioned method or another applicable method. If the first failure bit is found, then the searching (or accessing) moves to the redundancy block to start searching subblocks therein. Then, a regular subblock to be firstly found in the redundancy block may swap the failure-subblock having been firstly found in the regular subblock. This is the swap 1 in FIG. 74. After the swap 1, the subblock address in the redundancy block is updated and then the searching moves back to the regular block and then updates the subblock address. Then, we may restart the searching in the regular block. If the next failure bit is found, then the searching moves to the redundancy block to start searching the remaining subblocks therein. Then, a regular subblock to be firstly found in the redundancy block may swap the failure-subblock having been found in the regular subblock. This is the swap 2 in FIG. 74.

After the swap 2, the subblock address in the redundancy block is updated and then the searching moves back to the regular block and then update the subblock address therein. Then, we may restart the searching in the regular block.

This procedure may be repeated until all subblocks will be searched (or accessed) in the regular block.

However, the subblock array is required to be divided into a redundancy block and a regular block so that the number of regular subblocks in the redundancy block is larger than the number of failure-subblocks to be found in the regular block. This can be determined by the specification of chip design. If only chips which satisfy this condition in the adopted chip design specification are shipped as confirming articles, then all the shipped chips as confirming can satisfy the condition "the number of regular subblocks in the redundancy block is larger than the number of failure-subblocks to be found in the regular block".

This division by subblocks, as mentioned above, can be deemed as a generalized version of the division by row line groups. That is, there may be a similar summary corresponding to methods to choose options of access and operation in FIGS. 57-59 in the present embodiment. They are illustrated in FIGS. 75-77, which correspond to FIGS. 57-59, respectively.

First, a code of retrieving redundancy mode can be given to an inspection device using an external input-output. This can be included into the challenge C and also given separately. The code of retrieving redundancy mode holds access option to choose access mode, operation option to set operation mode (write, erase, read), and so forth as arguments.

As mentioned above, the access mode is from test mode 1, test mode 2, normal access mode, power saving mode, check mode of address space and so forth. These, mentioned above, are similar to FIG. 57.

Figure 75:
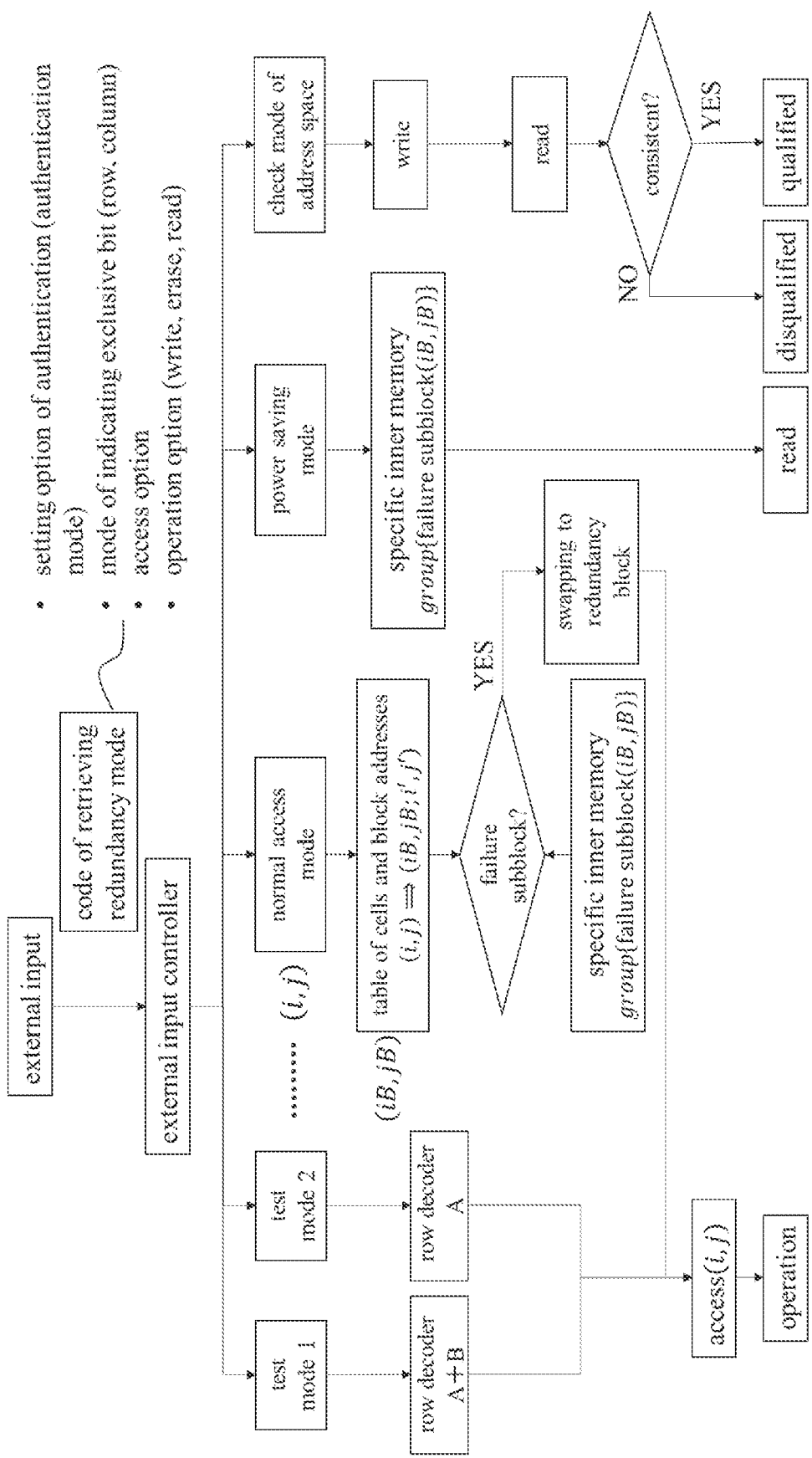
FIG. 75 is a drawing to illustrate an example of the utilization method of the code of retrieving redundancy mode.
Figure 76:
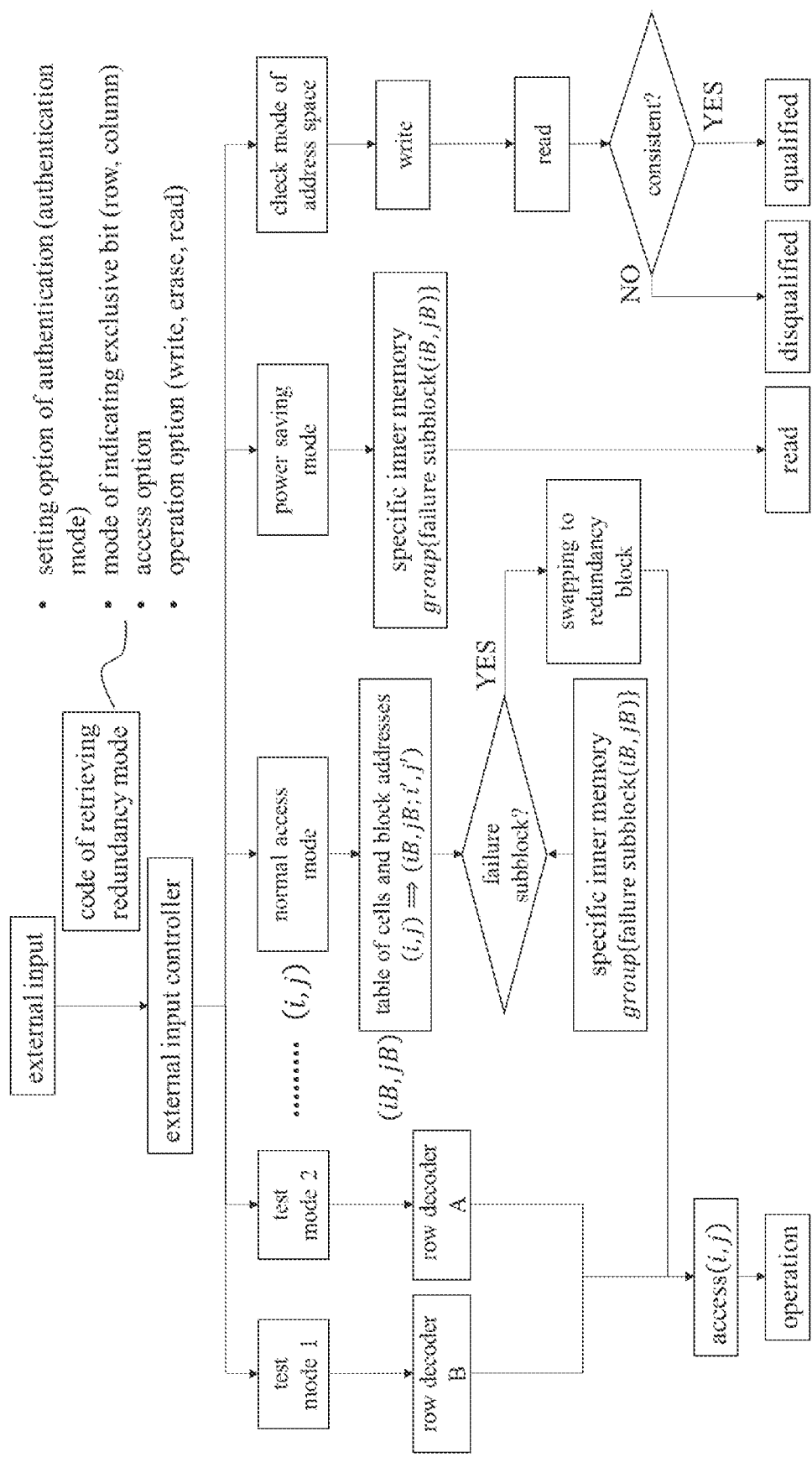
FIG. 76 is a drawing to illustrate an example of the utilization method of the code of retrieving redundancy mode.
Figure 77:
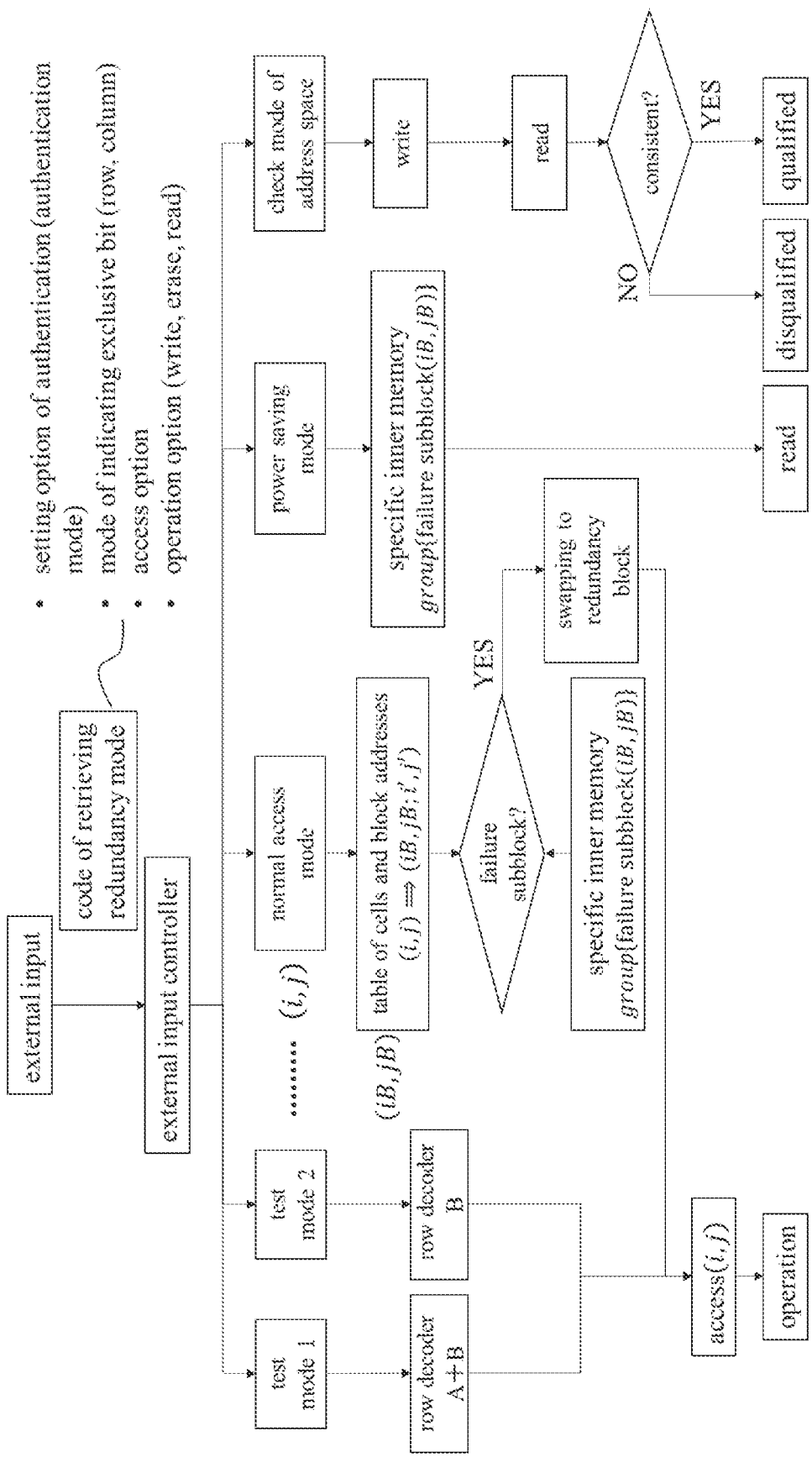
FIG. 77 is a drawing to illustrate an example of the utilization method of the code of retrieving redundancy mode.

However, information stored in a specific inner memory in FIGS. 75-77 has been replaced by a group (failure-subblock (iB, jB) which is a generalized version of the row lines division. Furthermore, thanks to the bit address conversion, it is required to refer the table of cells and block addresses in FIG. 66 in the normal access mode.

Figure 78:
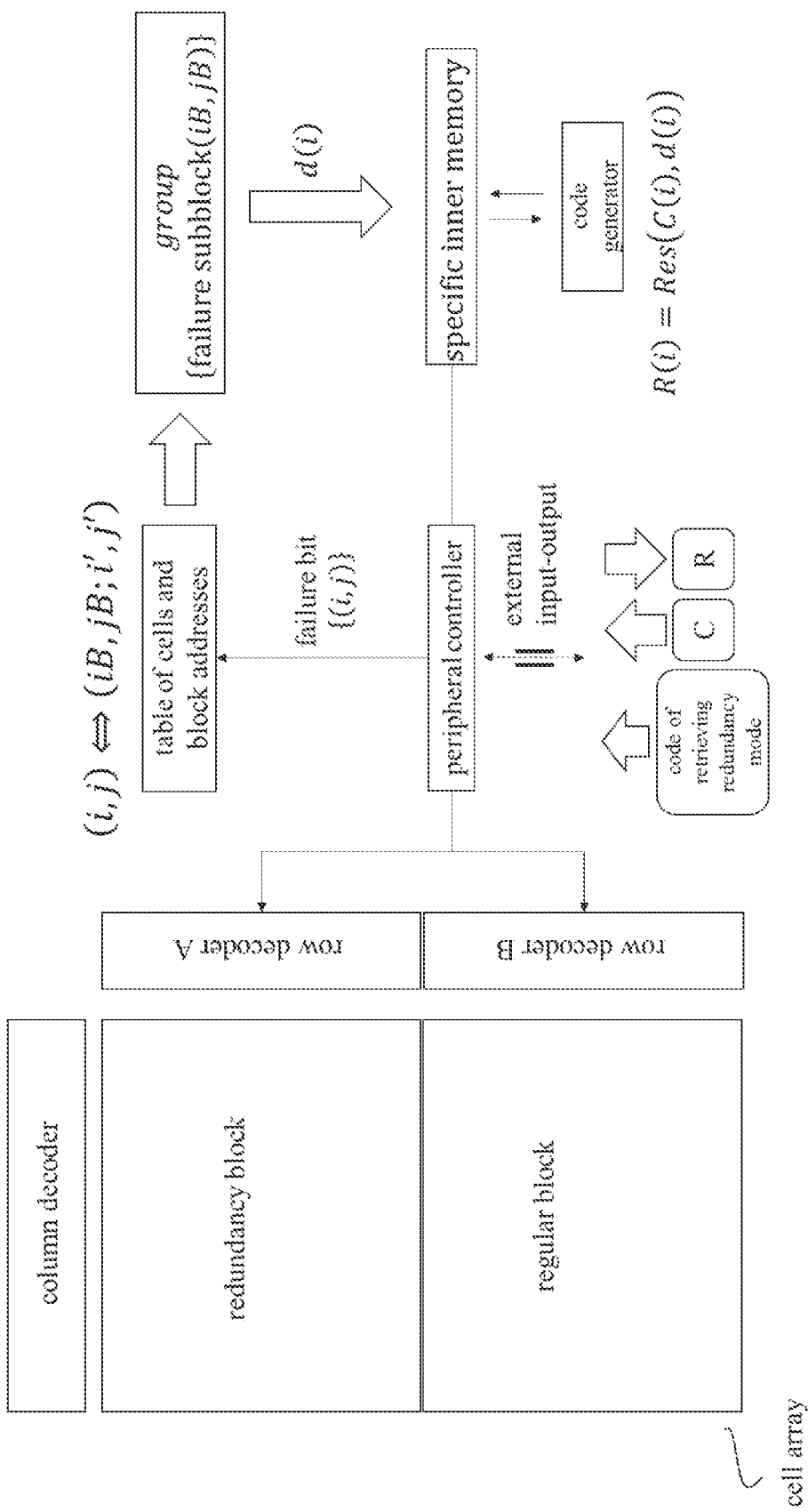
FIG. 78 is a drawing to illustrate an example to realize the authentication method of electronic apparatuses relating to the present invention by using the code of retrieving redundancy mode.

It may be once more necessary to explain generalized versions of test modes 1 and 2 to the block division FIG. 78 illustrates a method to control access to a redundancy block and a regular block by handling row decoders A and B and column decoder.

Figure 79:
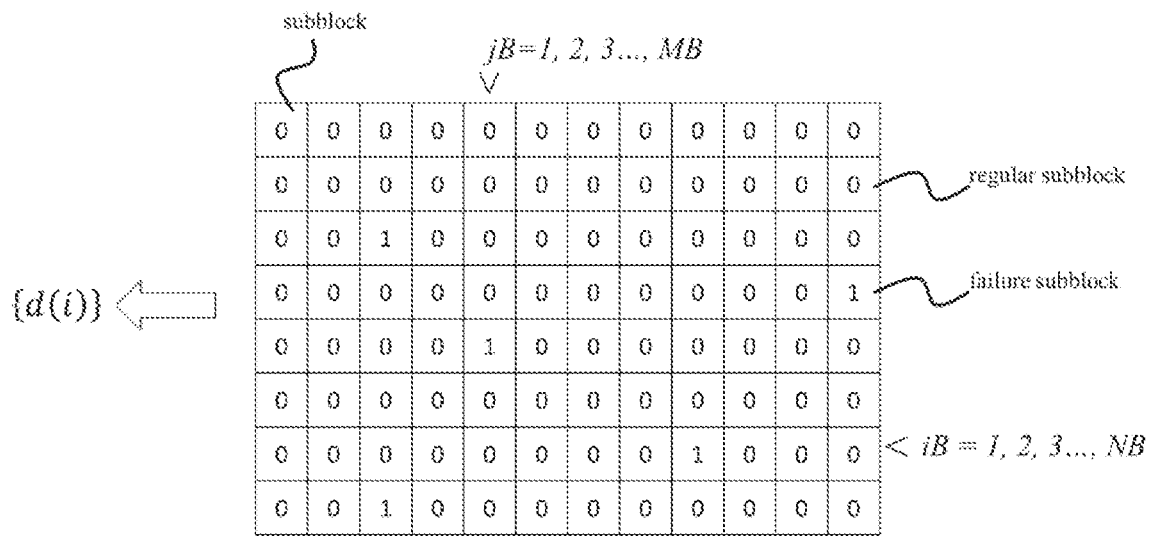
FIG. 79 is a drawing to illustrate that a distribution of failure subblocks can be converted to a specific random number.

A peripheral controller receives challenge C and code of retrieving redundancy mode via an external input-output. The row decoder A handles access to the redundancy block together with the column decoder according to an access option of the code of retrieving redundancy mode. The row decoder B handles access to the regular block together with the column decoder. Furthermore, by handling an operation option, an address group of failure bits {(i, j)} can be obtained. Using the table of cells and block address, this can be converted to an address group of failure-subblocks {(iB, jB)}. It may turn out being data that "0" and "1" are distributed in the checker-board pattern, as illustrated in FIG. 79 for example. A specific random number {d(i)} can be obtained by converting this by binary expression and then stored in a specific inner memory. The response {R(i)} can be obtained by inputting this specific random number and the challenge C obtained via the external input-output to the response function (Res) in Eq. 3. Finally, this {R(i)} may be output to the external as the response R via the external input-output.

Move back to FIG. 75. First, test mode 1 is chosen in the access option and then "0" is written at all accessible subblock addresses by using the row decoders A and B together with the column decoder. Subsequently, test mode 2 is chosen in the access option and then "1" is written at all accessible subblock addresses by using the row decoder A together with the column decoder. Subsequently, normal access mode is chosen to search in order for all accessible subblocks. Then, it is to check if the accessed subblock is a failure-subblock or not by reading data stored in the specific inner memory. If it is a failure subblock, then the swapping to a redundancy subblock may be performed and the readout results in "1". If it is a regular subblock, then the readout results in "0". Thus, the result turns out being data that "0" and "1" are distributed in a checkerboard pattern, as illustrated in FIG. 79 as an example. It is allowable to do the same by replacing "0" and "1". As mentioned above, this is a specific random number.

Move back to FIG. 76. First, test mode 1 is chosen in the access option and then "0" is written at all accessible subblock addresses by using the row decoder B together with the column decoder. Subsequently, test mode 2 is chosen in the access option and then "1" is written at all accessible subblock addresses by using the row decoder A together with the column decoder. Subsequently, normal access mode is chosen to search in order for all accessible subblocks. Then, it is to check if the accessed subblock is a failure-subblock or not by reading data stored in the specific inner memory. If it is a failure subblock, then the swapping to a redundancy subblock may be performed and the readout results in "1". If it is a regular subblock, then the readout results in "0". Thus, the result turns out being data that "0" and "1" are distributed in a checkerboard pattern, as illustrated in FIG. 79 as an example. It is allowable to do the same by replacing "0" and "1". As mentioned above, this is a specific random number.

Move back to FIG. 77. First, test mode 1 is chosen in the access option and then "1" is written at all accessible subblock addresses by using the row decoders A and B together with the column decoder. Subsequently, test mode 2 is chosen in the access option and then "0" is written at all accessible subblock addresses by using the row decoder B together with the column decoder. Subsequently, normal access mode is chosen to search in order for all accessible subblocks. Then, it is to check if the accessed subblock is a failure-subblock or not by reading data stored in the specific inner memory. If it is a failure subblock, then the swapping to a redundancy subblock may be performed and the readout results in "1". If it is a regular subblock, then the readout results in "0". Thus, the result turns out being data that "0" and "1" are distributed in a checkerboard pattern, as illustrated in FIG. 79 as an example. It is allowable to do the same by replacing "0" and "1". As mentioned above, this is a specific random number.

Figure 80:
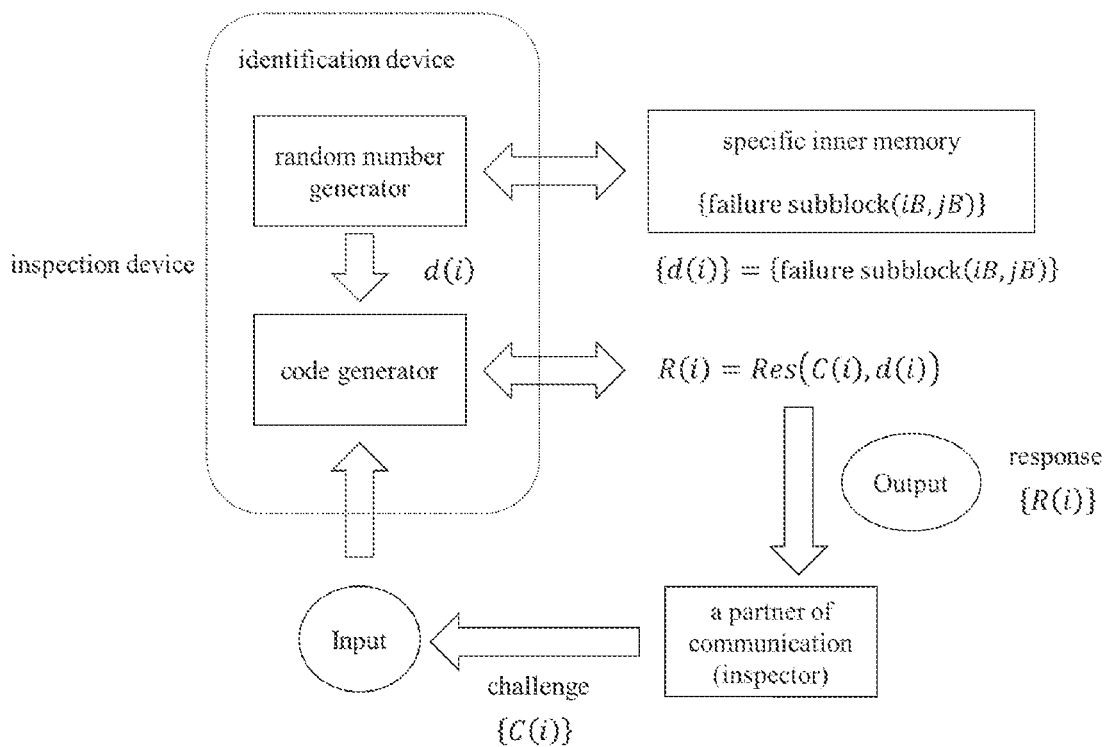
FIG. 80 is a drawing to illustrate an example of the concept of the authentication method of electronic apparatus relating to the present inventions.

The operation mentioned above can be conceptualized to FIG. 80. Only the difference from FIG. 61 is that a specific random number stored in a specific inner memory is a group of subblock addresses of failure-subblocks. The others are all same and then detailed illustration may be omitted.

(Exclusive Authentication Bit)

As mentioned above, the cell array of chip may be accessed randomly for the usage other than the authentication during chip operation. In this event, it may be necessary to avoid an inconsistency between the cell array accesses for the authentication process of the present invention and for the other operation process of chip.

Figure 81:
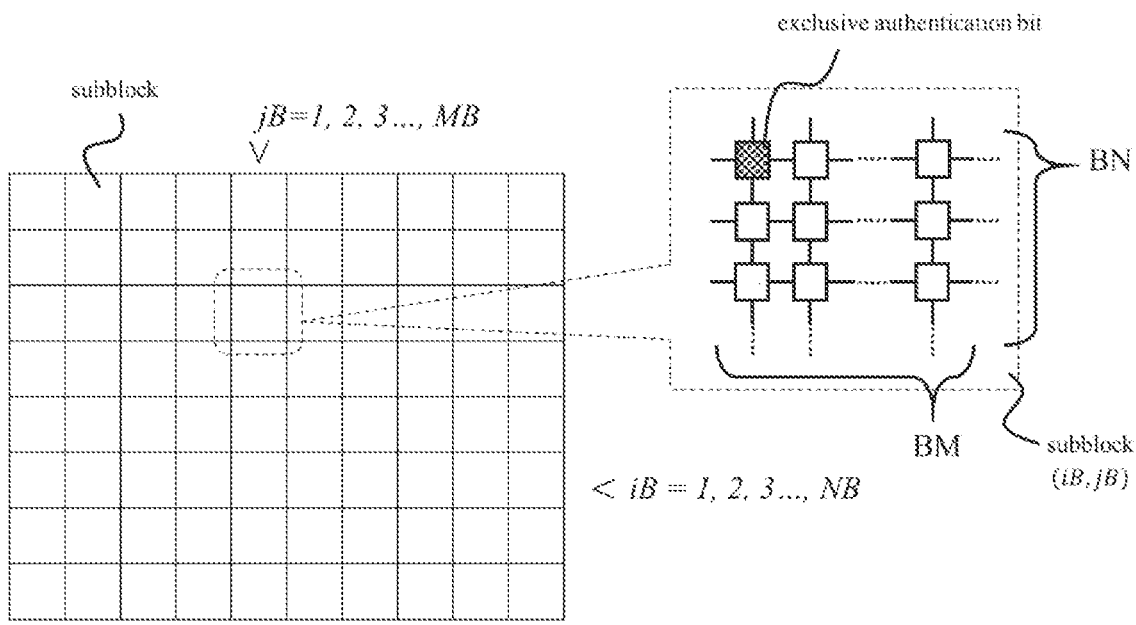
FIG. 81 is a drawing to illustrate an example of the utilization method of exclusive authentication bit.
Figure 82:
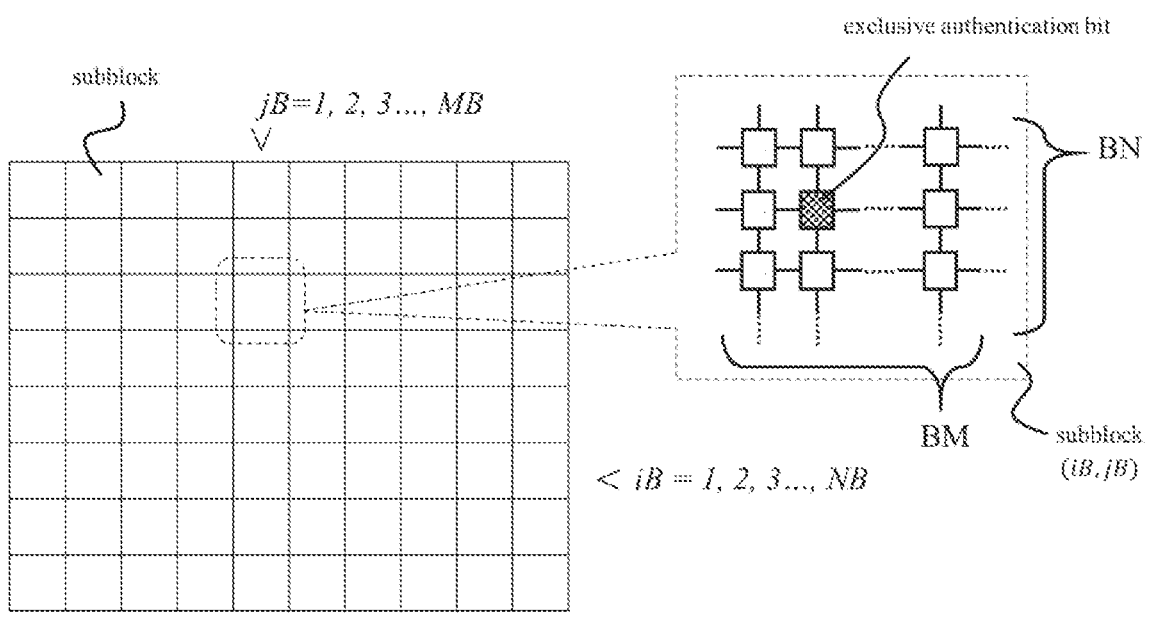
FIG. 82 is a drawing to illustrate an example of the utilization method of exclusive authentication bit.

In the present embodiment, there is a measure by preparing an exclusive authentication bit at an address inside a subblock. FIG. 81 illustrates an example wherein the said exclusive authentication bit is located at the left-top end. FIG. 82 illustrates another example wherein the said exclusive authentication bit is located near to the center from the left-top end.

It is required to prohibit the access to this exclusive authentication bit inside each subblock by choosing non-authentication mode in the setting option of authentication in a case that the chip operates a process other than the authentication. FIGS. 75-77 are an example wherein the authentication mode has been chosen.

Furthermore, it may be allowable to add a mode to choose an exclusive authentication bit (i.e., the mode of choosing exclusive authentication bit) as an argument of the code of retrieving redundancy mode. In this event, the row and column numbers of the exclusive authentication bit may be an argument of the mode of choosing exclusive authentication bit. For example, it may be expressed as "mode of choosing exclusive authentication bit (row number, column number)". However, what is chosen in the mode of choosing exclusive authentication bit is an address inside a subblock. FIG. 81 illustrates an example wherein the said exclusive authentication bit is located at the left-top end. FIG. 82 illustrates another example wherein the said exclusive authentication bit is located near to the center from the left-top end.

In a case wherein the authentication mode has been chosen as an argument of the option of setting authentication bit, the bit having been chosen by the mode of choosing exclusive authentication bit may be chosen as the exclusive authentication bit. Subsequently, one of test mode 1, test mode 2, and normal access mode in the access mode. And then, it is allowable that the authentication is processed according to the recipe of FIGS. 75-77.

In a case wherein non-authentication mode has been chosen as an argument of the setting option of authentication, a bit having not been chosen by the mode of choosing exclusive authentication bit may be chosen. Subsequently, the normal access mode may be chosen.

FIGS. 13 and 40 are drawings to illustrate the concept of the present invention. It is allowable to use the redundancy code {failure-subblock (iB, jB)} as data relating to a specific random number of FIGS. 13, 30-35, and 40 if adopting the present embodiment (block redundancy). Or it is allowable to use the redundancy code {(Fi, Ri)} as data relating to a specific random number of FIGS. 13, 30-35, and 40 if adopting the embodiment (row lines redundancy).

Anyway, in general, following the concept of FIGS. 13 and 40, an inspector may input data (code information) that turns out being a challenge {C(i)} to an inspection device. Furthermore, when BM=1 and BN=N in FIG. 65, we can find that (block redundancy) is a generalized version of (row line redundancy).

In a chip included in an inspection device, data (failure code information), which relates to a failure bit distribution specific to the chip, is stored as data relating to specific random number, which is specific to the chip.

The generation of a response R using this failure code information together with a challenge C according to the equation in Eq. 1 is identical to that of the response R using a specific random number together with the challenge C. While the specific random number is specific to the chip, said, while the specific random number can be deemed as satisfying the one-to-one relation to the chip, this response can be deemed as determined by the challenge C and the chip.

An inspector can receive this response R output from an inspection device and then perform the authentication using the set of C and R. Thus, it is preferable that the inspector plays a role of a test server in FIG. 41.

Moreover, it is possible to generate a pair of secret and public keys using the methods of FIGS. 30-35 with a response R according to a PKI algorithm. The pair of secret and public keys, which has been generated like this, may be used for data transmission using the methods of FIGS. 36 and 37.

As illustrated in FIGS. 13 and 40, this secret key has been linked to a specific random number, which is specific to a chip composing an inspection device, with no disconnection. Furthermore, as illustrated using the equations in Eq. 1 and Eq. 2, the challenge C is also included as an argument. Therefore, while an inspector itself has not been hacked, it is unable for a hacker to tamper the authentication of an inspection device even though the hacker successfully stole the specific random number of the inspection device. It is because the inspector uses a pair (C, R) for the authentication of the inspection device.

What stores data relating to a specific random number (failure code information etc.) is a specific inner memory inside an inspection device. It is preferable that the specific inner memory is equipped inside a chip relating to the specific random number. Or it may be allowable to equip the specific inner memory together with a chip relating to the specific random number inside the inspection device. Anyway, it may be preferable that this specific inner memory is specific to the inspection device. Or it may be preferable that the specific inner memory is disconnected to the external input-output of chip.

As illustrated in FIG. 41, there is a test server (a stem server) which plays a central role in a physical firewall. The test server can put other electronic apparatuses (peripheral devices) under his control. A peripheral device can use a public key or a code information generated from the public key as its logical address to communicate with another peripheral device. The difference between the cases that an electronic apparatus communicates with another inside a physical firewall and that it communicates with an external electronic apparatus is whether or not the external one can get the authentication from the test server. Since the external electronic apparatus cannot get the authentication from the test server, the supervisor of the test server may judge to deny any communication with the external electronic apparatus or permit which kind of communication with the external one. As an example, it may be preferable to communicate with an electronic apparatus in the external of the physical firewall via a test server.

A test server can manage the authentication of a peripheral device using the set of input (challenge C) and response R from the peripheral device under its central management. The test server can input a same challenge C to peripheral devices under its central management. One of the peripheral devices responds a response R which is different from those that the others respond. Thus, the test server obtains a set of response {R}. The test server can send a changed challenge C to the peripheral devices under its central control anytime as necessary. This is the update of the challenge C. The response from each peripheral device is also updated in response to the updated challenge C. That is, the test server can manage the authentication of the peripheral devices inside the physical firewall using the set of C and {R}, which is updatable anytime as necessary.

Moreover, the scope of the present invention is not limited to the above-mentioned embodiments and can be added with various changes while those changes do not deviate from the purpose of the present invention.

INDUSTRIAL APPLICABILITY

The chip authentication using a specific random number, which is specific to a chip, plays a role of central management. The communication between electronic apparatuses having the authenticated chip is protected by a decentralized system like blockchain. By this way, the central management and the decentralized management can complement each other, such that the security of IoT network can be reinforced. Additionally, it is preferable that a redundancy data is specific to a chip. similar to a specific random number.

Figure 83:
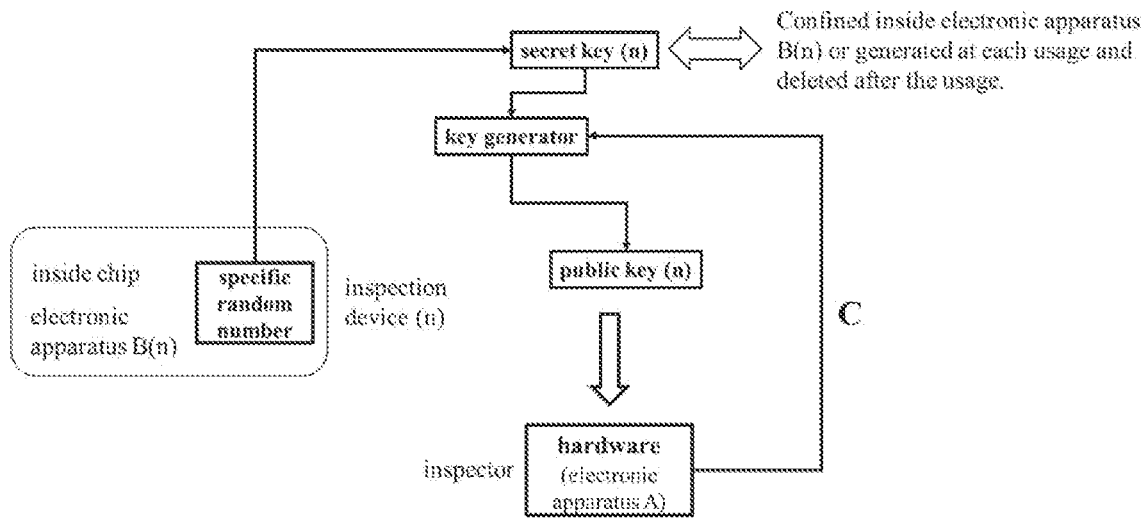
FIG. 83 is a drawing to illustrate an example of the generation method of the logical address in the authentication method of electronic apparatus relating to the present invention.
Figure 84:
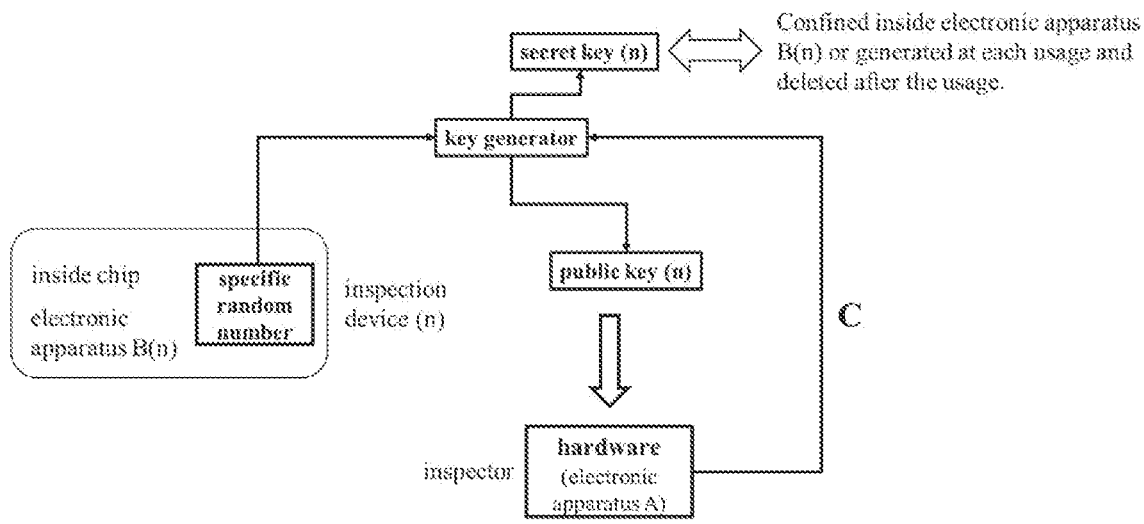
FIG. 84 is a drawing to illustrate an example of the generation method of the logical address in the authentication method of electronic apparatus relating to the present invention.

Finally, though, in FIGS. 30-35, the secret and public keys are generated using the response R(n), it is also allowable to generate the secret and public keys using a specific random number (n). In this event, an inspector (e.g., a test server) may input a challenge C to a key generator like in FIGS. 83 and 84 as an example. It is preferable that a pair of secret and public keys is generated according to a predetermined algorithm (RSA-type or Elgamal-type) using what the key generator obtained by compounding the specific random number (n) and this challenge C in some kind of method. FIGS. 83 and 84 respectively correspond to cases that the Elgamal-type and RSA-type algorithms are adopted to key generators. An example of the method to compound a specific random number (n) and challenge C may be a logical gate with two inputs and an output such as the logical AND, the logical NAND, the logical XOR, the logical OR, the logical NOR and so forth. Though not specially illustrated since it is self-evident, the second input can be also used in the embodiments of FIGS. 83 and 84, similar to the embodiments of FIGS. 31, 32, 34 and 35. Moreover, in this embodiment, it is not always to use the code generator in FIGS. 60, 61, 78, and 80. Furthermore, in FIGS. 60 and 78, it is allowable to equip a key generator in a peripheral controller. In this event, it is allowable that key generator is installed as software or as built-in circuit.

More concretely, the central management and the decentralized management may turn out being distinguishable by respectively seeing FIGS. 41 and 45 even for a same network. As illustrated in FIG. 41, for example, in the central management, a test server authenticates each node (i.e., a peripheral device) belonging to a network. On the contrary, as illustrated in FIG. 45, in the decentralized management, each node can communicate with another without the test server in the same network.

In the central management of FIG. 41, first, the registration (authentication) of N peripheral devices (i.e., inspection devices) that should be put under control is carried out. For example, a test server sends the first challenge (CA) to those N peripheral devices. The N peripheral devices may respectively generate responses (R1, R2, . . . RN) and then return those responses to the test server. The test server stores (named, registers) the pair of this challenge and responses (CAR1, CAR2, CAR3 . . . CARN). The stored data is expressed by {CAR}. The registration like this can be performed anytime at convenience of the central management. When a cyberterrorism occurs, for example, once the authentication of all nodes is revoked such that all nodes are disconnected from anyone on the network. After the safety check, the registration may be performed to recover the network appropriately.

Subsequently, the test server inspects if an arbitral node on the network is a peripheral device under its control. For example, the test server sends the first challenge to a peripheral node that the test server has arbitrarily chosen. This node may then return a response (RA) to the test server. The test server may then compare it with {CAR} having been stored inside. If the pair of CA and RA is found in this {CAR}, then this node turns out a registered node. Otherwise, the access will be denied. Thus, like in FIG. 44, the denied node will be excluded out of the physical firewall.

A free communication may be allowed between nodes having been certified as belonging to the physical firewall in the above-mentioned method. As illustrated in FIG. 45, this communication can be protected by cybersecurity and to be under the decentralized management. Cybersecurity that the present invention has proposed as an example is illustrated in FIGS. 27-35, 40, 83, and 84. Additionally, the cybersecurity technology of the present invention is fully compatible with Blockchain, as illustrated in FIGS. 36-39. For example, R (N) in FIGS. 36 and 37 corresponds to the response R (n) in FIGS. 27-35. In a case that a specific random number is used as a response R, as illustrated in FIGS. 83 and 84, the R (N) in FIGS. 36 and 37 may be replaced by the specific random number (N). The illustrations may be omitted since it is self-evident.

What is important here is that a challenge to be input to an IC chip in order to get a response using a specific random number in FIGS. 27-35 and 40 should be the second challenge (CB) that is different from the said first challenge (CA). Because the said first challenge (CA) has been exposed into the internet so that a hacker can theft it. Nevertheless, it may be allowable that the first and second challenge are the same if another method can avoid the theft of the first challenge. What is to distribute the second challenge to each peripheral device may be or may not always be the said test server. In the case that what is to distribute the second challenge is not the said test server, there may be two inspectors in one network. It may be more preferable because separation and cooperation of the central management and the decentralized management would be clearer.

What is claimed is:

1. A digital communication system comprising:
a network of electronic apparatuses, which comprises plural electronic apparatuses, wherein,
M of the said plural electronic apparatuses are the first to M-th inspection devices, at least one of the other among the said plural electronic apparatuses is an inspector, the said first to M-th inspection devices are the first to M-th peripheral devices, respectively,
the said inspector inputs the first challenge to the said first to M-th peripheral devices,
the said first to M-th peripheral devices respectively return the first to M-th responses to the said inspector in response to the said first challenge according to the response function,
the said first to M-th responses form the first response set, which comprises the said first to M-th responses,
the said inspector stores the said first challenge and the said first response set,
the said first to M-th peripheral devices respectively generate the pairs of the first to M-th secret keys and the first to M-th public keys using the said first to M-th responses, the said first to M-th peripheral devices respectively comprise the first to M-th integrated circuit (IC) chips, the said response function has the arguments, the said first challenge as well as the specific random numbers that are respectively specific to the said first to M-th IC chips, and respectively generates the said first to M-th responses, if an external electronic apparatus, which does not have the said first to M-th IC chips, and the said first peripheral device communicate, the said inspector notices to the said first peripheral device that the said external electronic apparatus has not been authenticated or terminates the communication between the said first peripheral device and the said external electronic apparatus, wherein, one of the first to M-th IC chips is chosen as the n-th IC chip, the said n-th IC chip has cell array, row decoder, peripheral controller, code generator, specific inner memory, and external input-output, wherein, the said cell array is divided into the first and second cell arrays, the said row decoder is divided into the first and second row decoders, wherein, the said first and second row decoders respectively control access to the said first and second cell arrays, the said peripheral controller receives the code of retrieving redundancy mode and the said challenge from the said external input-output, controls the said first and second row decoders based on the said code of retrieving redundancy mode, forwards the said challenge to the said code generator, retrieves the n-th specific random number from the access to the said first and second cell arrays based on the n-th redundancy code stored in the said specific inner memory, and forwards the said n-th specific random number to the said code generator, the said code generator uses the said response function, generates the n-th response using the said first challenge and the said n-th specific random number, and forwards the said n-th response to the external input-output, the said external input-output receives input of the said code of retrieving redundancy mode and the said first challenge from the external, receives the said n-th response from the said code generator, and outputs the said n-th response to the external of the said n-th IC chip, wherein, the said code of retrieving redundancy mode has the setting option of authentication, the mode of indicating exclusive bit, the access option, and the operation option, wherein, the said cell array is divided into plural subblocks, the said IC chip, further, has the table of cell block addresses, the said table of cell block addresses is the correspondence table of an arbitrary address on the said cell array and a set of a subblock address and an inner address inside a subblock, the said mode of indicating exclusive bit has an indicated bit address as an argument, the said indicated bit address is an exclusive authentication bit inside the said subblock, the said setting option of authentication comprises authentication mode and non-authentication mode, the said exclusive authentication bit is selected as a selected bit address inside the said subblock if the said authentication mode is chosen, a bit other than the said exclusive authentication bit is selected as a selected bit address inside the said subblock if the said non-authentication mode is chosen, the said access option controls the set of the said column decoder and the said first and second row decoders, and instructs access to each bit address on the said cell array, the said operation option has those of write, erase and read at the said each of bit address, the said peripheral controller reads the said n-th specific random number from the said cell array, based on the said n-th redundancy code, by switching the set of the said access option and the said operation option, if the said authentication mode is chosen.

2. The digital communication system as claimed in claim 1, wherein, a subblock with a failure bit which can be distributed on the said cell array among the said plural subblocks is a failure subblock, a subblock with no address of the said failure bit is a regular subblock, the said n-th redundancy code relates to the distribution of the said failure subblocks.

3. A digital communication system, comprising:

a network of electronic apparatuses, which comprises plural electronic apparatuses, wherein, M of the said plural electronic apparatuses are the first to M-th inspection devices, at least one of the other among the said plural electronic apparatuses is an inspector, the said first to M-th inspection devices are the first to M-th peripheral devices, respectively, the said inspector inputs the first challenge to the said first to M-th peripheral devices, the said first to M-th peripheral devices respectively return the first to M-th responses to the said inspector in response to the said first challenge according to the response function, the said first to M-th responses form the first response set, which comprises the said first to M-th responses, the said inspector stores the said first challenge and the said first response set, the said first to M-th peripheral devices respectively generate the pairs of the first to M-th secret keys and the first to M-th public keys using the said first to M-th responses, the said first to M-th peripheral devices respectively comprise the first to M-th Integrated circuit (IC) chips, the said response function has the arguments, the said first challenge as well as the specific random numbers that are respectively specific to the said first to M-th IC chips, and respectively generates the said first to M-th responses, if an external electronic apparatus, which does not have the said first to M-th IC chips, and the said first peripheral device communicate, the said inspector notices to the said first peripheral device that the said external electronic apparatus has not been authenticated or terminates the communication between the said first peripheral device and the said external electronic apparatus, wherein, one of the first to M-th IC chips is chosen as the n-th IC chip, the said n-th IC chip has cell array, row decoder, peripheral controller, code generator, specific inner memory, and external input-output, wherein, the said cell array is divided into the first and second cell arrays, the said row decoder is divided into the first and second row decoders, wherein, the said first and second row decoders respectively control access to the said first and second cell arrays, the said peripheral controller receives the code of retrieving redundancy mode and the said challenge from the said external input-output, controls the said first and second row decoders based on the said code of retrieving redundancy mode, forwards the said challenge to the said code generator, retrieves the n-th specific random number from the access to the said first and second cell arrays based on the n-th redundancy code stored in the said specific inner memory, and forwards the said n-th specific random number to the said code generator, the said code generator uses the said response function, generates the n-th response using the said first challenge and the said n-th specific random number, and forwards the said n-th response to the external input-output, the said external input-output receives input of the said code of retrieving redundancy mode and the said first challenge from the external, receives the said n-th response from the said code generator, and outputs the said n-th response to the external of the said n-th IC chip, wherein, the said code of retrieving redundancy mode has the setting option of authentication, the mode of indicating exclusive column, the access option, and the operation option, wherein, the said mode of indicating exclusive column has an indicated column number as an argument, the said setting option of authentication comprises authentication mode and non-authentication mode, the said indicated column number indicates an exclusive authentication column and the said exclusive authentication column is selected as a selected column, if the said authentication mode is chosen, a column other than the said indicated column number is chosen as a selected column, if the said non-authentication mode is chosen, the said access option chooses the set of the said first and second row decoders, and then instructs access to addresses defined by the said set of the said first and second row decoders and the said chosen column, the said operation option has those of write, erase and read at the said bit address, the said peripheral controller reads the said n-th specific random number from the said cell array, based on the said n-th redundancy code, by switching the set of the said access option and the said operation option, if the said authentication mode is chosen.

4. The digital communication system as claimed in claim 3, wherein, a row line with a failure bit which can be distributed on the said cell array is a failure row line, a row line without the said failure bit is a regular row line, the said n-th redundancy code relates to the distribution of the said failure row lines.

5. A digital communication system comprising:

a network of electronic apparatuses, which comprises plural electronic apparatuses, wherein, M of the said plural electronic apparatuses are the first to M-th inspection devices, at least one of the others among the said plural electronic apparatuses is an inspector, the said first to M-th inspection devices are the first to M-th peripheral devices, respectively, the said inspector inputs the first challenge to the said first to M-th peripheral devices, the said first to M-th peripheral devices respectively return the first to M-th responses to the said inspector in response to the said first challenge accordingly to the response function, the said first to M-th responses form the first response set, which comprises the said first to M-th responses, the said inspector stores the said first challenge and the said first response set, the said first to M-the peripheral devices respectively generates the first to M-th secret keys using the said first to M-th responses, and respectively generates pairs of the first to M-th public keys and the said first to M-th secret keys, using the said first to M-th secret keys, the said first to M-th peripheral devices respectively comprise the first to M-th integrated circuit (IC) chips, the said response function has the arguments, the said first challenge as well as the specific random numbers that are respectively specific to the said first to M-th IC chips, and respectively generates the said first to M-th responses, wherein, one of the first to M-th IC chip is chosen as the n-th IC chip, the said IC chip has cell array, row decoder, peripheral controller, code generator, specific inner memory, and external input-output, wherein, the said cell array is divided into the first and second cell arrays, the said row decoder is divided into the first and second row decoders, wherein, the said first and second row decoders respectively control access to the said first and second cell arrays, the said peripheral controller receives the code of retrieving redundancy mode and the said challenge from the said external input-output, controls the said first and second row decoders based on the said code of retrieving redundancy mode, forwards the said challenge to the said code generator, retrieves the n-th specific random number from the access to the said first and second cell arrays based on the n-th redundancy code stored in the said specific inner memory, and forwards the said n-th specific random number to the said code generator, the said code generator uses the said response function to generate the n-th response from a challenge to be forwarded to the said peripheral device and the said n-th specific random number, the said external input-output receives the input of the said code of retrieving redundancy mode and the said first challenge from the external, receives the said n-th response from the said code generator, and outputs the said n-th response to the external of the said n-th IC chip, wherein, the said code of retrieving redundancy mode has the setting option of authentication, the mode of indicating exclusive bit, the access option, and the operation option, wherein, the said cell array is divided into plural subblocks, the said IC chip, further, has the table of cell block addresses, the said table of cell block addresses is the correspondence table of an arbitrary address on the said cell array and a set of subblock addresses and inner addresses inside a subblock, the said mode of indicating exclusive bit has an indicated bit address as an argument, the said indicated bit address is an exclusive authentication bit inside the said subblock, the said setting option of authentication comprises authentication mode and non-authentication mode, the said exclusive authentication bit is selected as a selected bit address inside the said subblock if the said authentication mode is chosen, a bit other than the said exclusive authentication bit is selected as a selected bit address inside the said subblock if the said non-authentication mode is chosen, the said access option controls the set of the said column decoder and the said first and second row decoders, instructs access to each bit address on the said cell array, the said operation option has those of write, erase and read at the said each of bit address, the said peripheral controller reads the said n-th specific random number from the said cell array, based on the said n-th redundancy code, by switching the set of the said access option and the said operation option, if the said authentication mode is chosen.

6. The digital communication system as claimed in claim 5, wherein, a subblock with a failure bit which can be distributed on the said cell array among the said plural subblocks is a failure subblock, a subblock with no address of the said failure bit is a regular subblock, the said n-th redundancy code relates to the distribution of the said failure subblocks.

7. A digital communication system, comprising:

a network of electronic apparatuses, which comprises plural electronic apparatuses, wherein, M of the said plural electronic apparatuses are the first to M-th inspection devices, at least one of the others among the said plural electronic apparatuses is an inspector, the said first to M-th inspection devices are the first to M-th peripheral devices, respectively, the said inspector inputs the first challenge to the said first to M-th peripheral devices, the said first to M-th peripheral devices respectively return the first to M-th responses to the said inspector in response to the said first challenge accordingly to the response function, the said first to M-th responses form the first response set, which comprises the said first to M-th responses, the said inspector stores the said first challenge and the said first response set, the said first to M-the peripheral devices respectively generates the first to M-th secret keys using the said first to M-th responses, and respectively generates pairs of the first to M-th public keys and the said first to M-th secret keys, using the said first to M-th secret keys, the said first to M-th peripheral devices respectively comprise the first to M-th integrated circuit (IC) chips, the said response function has the arguments, the said first challenge as well as the specific random numbers that are respectively specific to the said first to M-th IC chips, and respectively generates the said first to M-th responses, wherein, one of the first to M-th IC chip is chosen as the n-th IC chip, the said IC chip has cell array, row decoder, peripheral controller, code generator, specific inner memory, and external input-output, wherein, the said cell array is divided into the first and second cell arrays, the said row decoder is divided into the first and second row decoders, wherein, the said first and second row decoders respectively control access to the said first and second cell arrays, the said peripheral controller receives the code of retrieving redundancy mode and the said challenge from the said external input-output, controls the said first and second row decoders based on the said code of retrieving redundancy mode, forwards the said challenge to the said code generator, retrieves the n-th specific random number from the access to the said first and second cell arrays based on the n-th redundancy code stored in the said specific inner memory, and forwards the said n-th specific random number to the said code generator, the said code generator uses the said response function to generate the n-th response from a challenge to be forwarded to the said peripheral device and the said n-th specific random number, the said external input-output receives the input of the said code of retrieving redundancy mode and the said first challenge from the external, receives the said n-th response from the said code generator, and outputs the said n-th response to the external of the said n-th IC chip, wherein, the said code of retrieving redundancy mode has the setting option of authentication, the mode of indicating exclusive column, the access option, and the operation option, wherein, the said mode of indicating exclusive column has an indicated column number as an argument, the said setting option of authentication comprises authentication mode and non-authentication mode, the said indicated column number indicates an exclusive authentication column and the said exclusive authentication column is selected as a selected column, if the said authentication mode is chosen, a column other than the said indicated column number is chosen as a selected column, if the said non-authentication mode is chosen, the said access option chooses the set of the said first and second row decoders, and then instructs access to addresses defined by the said set of the said first and second row decoders and the said chosen column, the said operation option has those of write, erase and read at the said bit address, the said peripheral controller reads the said n-th specific random number from the said cell array, based on the said n-th redundancy code, by switching the set of the said access option and the said operation option, if the said authentication mode is chosen.

8. The digital communication system as claimed in claim 7, wherein, a row line with a failure bit which can be distributed on the said cell array is a failure row line, a row line without the said failure bit is a regular row line, the said n-th redundancy code relates to the distribution of the said failure row lines.

45

9. A digital communication system comprising:
a network of electronic apparatuses, which comprises plural electronic apparatuses, wherein,
M of the said plural electronic apparatuses are the first to M-th inspection devices,
at least one of the others among the said plural electronic apparatuses is an inspector,
the said first to M-th inspection devices are the first to M-th peripheral devices, respectively,
the said inspector inputs the first challenge to the said first to M-th peripheral devices,
the said first to M-th peripheral devices respectively comprise the first to M-th integrated circuit (IC) chips,
the said first to M-th IC chips respectively have the first to M-th specific random number, which are respectively specific to the said first to M-th IC chip,
the said first to M-th peripheral devices generate respective pairs of the first to M-th secret keys and the first to M-th public keys, using the said first challenge and the said first to Mth specific random number, respectively,
wherein, one of the first to M-th IC chip is chosen as the n-th IC chip,
the said n-th IC chip has cell array, row decoder, peripheral controller, code generator, specific inner memory, and external input-output, wherein,
the said cell array is divided into the first and second cell arrays,
the said row decoder is divided into the first and second row decoders, wherein,
the said first and second row decoders respectively control access to the said first and second cell arrays,
the said external input-output receives the code of retrieving redundancy mode and the said first challenge from the external,
the said peripheral controller receives the said code of retrieving redundancy mode and the said challenge from the said external input-output, controls the said first and second row decoders based on the said code of retrieving redundancy mode, and retrieves the n-th specific random number from the access to the said first and second cell arrays based on the n-th redundancy code stored in the said specific inner memory,
wherein, the said code of retrieving redundancy mode has the setting option of authentication, the mode of indicating exclusive bit, the access option, and the operation option, wherein,
the said cell array is divided into plural subblocks,
the said IC chip, further, has the table of cell block addresses,
the said table of cell block addresses is the correspondence table of an arbitrary address on the said cell array and a set of subblock addresses and inner addresses inside a subblock,
the said mode of indicating exclusive bit has an indicated bit address as an argument,
the said indicated bit address is an exclusive authentication bit inside the said subblock,
the said setting option of authentication comprises authentication mode and non-authentication mode,
the said exclusive authentication bit is selected as a selected bit address inside the said subblock if the said authentication mode is chosen,
a bit other than the said exclusive authentication bit is selected as a selected bit address inside the said subblock if the said non-authentication mode is chosen,

46 the said access option controls the set of the said column decoder and the said first and second row decoders, instructs access to each bit address on the said cell array,
the said operation option has those of write, erase and read at the said each of bit address,
the said peripheral controller reads the said n-th specific random number from the said cell array, based on the said n-th redundancy code, by switching the set of the said access option and the said operation option, if the said authentication mode is chosen.

10. The digital communication system as claimed in claim 9, wherein,
a subblock with a failure bit which can be distributed on the said cell array among the said plural subblocks is a failure subblock,
a subblock with no address of the said failure bit is a regular subblock,
the said n-th redundancy code relates to the distribution of the said failure subblocks.

11. A digital communication system, comprising:
a network of electronic apparatuses, which comprises plural electronic apparatuses, wherein,
M of the said plural electronic apparatuses are the first to M-th inspection devices,
at least one of the others among the said plural electronic apparatuses is an inspector,
the said first to M-th inspection devices are the first to M-th peripheral devices, respectively,
the said inspector inputs the first challenge to the said first to M-th peripheral devices,
the said first to M-th peripheral devices respectively comprise the first to M-th integrated circuit (IC) chips,
the said first to M-th IC chips respectively have the first to M-th specific random number, which are respectively specific to the said first to M-th IC chip,
the said first to M-th peripheral devices generate respective pairs of the first to M-th secret keys and the first to M-th public keys, using the said first challenge and the said first to M-th specific random number, respectively,
wherein, one of the first to M-th IC chip is chosen as the n-th IC chip,
the said n-th IC chip has cell array, row decoder, peripheral controller, code generator, specific inner memory, and external input-output, wherein,
the said cell array is divided into the first and second cell arrays,
the said row decoder is divided into the first and second row decoders, wherein,
the said first and second row decoders respectively control access to the said first and second cell arrays,
the said external input-output receives the code of retrieving redundancy mode and the said first challenge from the external,
the said peripheral controller receives the said code of retrieving redundancy mode and the said challenge from the said external input-output, controls the said first and second row decoders based on the said code of retrieving redundancy mode, and retrieves the n-th specific random number from the access to the said first and second cell arrays based on the n-th redundancy code stored in the said specific inner memory,
wherein, the said code of retrieving redundancy mode has the setting option of authentication, the mode of indicating exclusive column, the access option, and the operation option, wherein, the said mode of indicating exclusive column has an indicated column number as an argument, the said setting option of authentication comprises authentication mode and non-authentication mode, the said indicated column number indicates an exclusive authentication column and the said exclusive authentication column is selected as a selected column, if the said authentication mode is chosen, a column other than the said indicated column number is chosen as a selected column, if the said non-authentication mode is chosen, the said access option chooses the set of the said first and second row decoders, and then instructs access to addresses defined by the said set of the said first and second row decoders and the said chosen column, the said operation option has those of write, erase and read at the said bit address, the said peripheral controller reads the said n-th specific random number from the said cell array, based on the said n-th redundancy code, by switching the set of the said access option and the said operation option, if the said authentication mode is chosen.

12. The digital communication system as claimed in claim 11, wherein, a row line with a failure bit which can be distributed on the said cell array is a failure row line, a row line without the said failure bit is a regular row line, the said n-th redundancy code relates to the distribution of the said failure row lines.

13. A digital communication system comprising, a network of electronic apparatuses, which comprises plural electronic apparatuses, wherein, M of the said plural electronic apparatuses are the first to M-th inspection devices, at least one of the others among the said plural electronic apparatuses is an inspector, the said first to M-th inspection devices are the first to M-th peripheral devices, respectively, the said inspector inputs the first challenge to the said first to M-th peripheral devices, the said first to M-th peripheral devices respectively comprise the first to M-th integrated circuit (IC) chips, the said first to M-th IC chips respectively have the first to M-th specific random number, which are respectively specific to the said first to M-th IC chip, the said first to M-th peripheral devices respectively generate the first to M-th secret keys using the said first challenge and the said first to M-th specific random number, and respectively generate pairs of the first to M-th public keys and the said first to M-th secret keys, using the said first to M-th secret keys, wherein, one of the first to M-th IC chip is chosen as the n-th IC chip, the said n-th IC chip has cell array, row decoder, peripheral controller, code generator, specific inner memory, and external input-output, wherein, the said cell array is divided into the first and second cell arrays, the said row decoder is divided into the first and second row decoders, wherein, the said first and second row decoders respectively control access to the said first and second cell arrays, the said external input-output receives the code of retrieving redundancy mode and the said first challenge from the external, the said peripheral controller receives the said code of retrieving redundancy mode and the said challenge from the said external input-output, controls the said first and second row decoders based on the said code of retrieving redundancy mode, and retrieves the n-th specific random number from the access to the said first and second cell arrays based on the n-th redundancy code stored in the said specific inner memory, wherein, the said code of retrieving redundancy mode has the setting option of authentication, the mode of indicating exclusive bit, the access option, and the operation option, wherein, the said cell array is divided into plural subblocks, the said IC chip, further, has the table of cell block addresses, the said table of cell block addresses is the correspondence table of an arbitrary address on the said cell array and a set of subblock addresses and inner addresses inside a subblock, the said mode of indicating exclusive bit has an indicated bit address as an argument, the said indicated bit address is an exclusive authentication bit inside the said subblock, the said setting option of authentication comprises authentication mode and non-authentication mode, the said exclusive authentication bit is selected as a selected bit address inside the said subblock if the said authentication mode is chosen, a bit other than the said exclusive authentication bit is selected as a selected bit address inside the said subblock if the said non-authentication mode is chosen, the said access option controls the set of the said column decoder and the said first and second row decoders, instructs access to each bit address on the said cell array, the said operation option has those of write, erase and read at the said each of bit address, the said peripheral controller reads the said n-th specific random number from the said cell array, based on the said n-th redundancy code, by switching the set of the said access option and the said operation option, if the said authentication mode is chosen.

14. The digital communication system as claimed in claim 13, wherein, a subblock with a failure bit which can be distributed on the said cell array among the said plural subblocks is a failure subblock, a subblock with no address of the said failure bit is a regular subblock, the said n-th redundancy code relates to the distribution of the said failure subblocks.

15. A digital communication system comprising, a network of electronic apparatuses, which comprises plural electronic apparatuses, wherein, M of the said plural electronic apparatuses are the first to M-th inspection devices, at least one of the others among the said plural electronic apparatuses is an inspector, the said first to M-th inspection devices are the first to M-th peripheral devices, respectively, the said inspector inputs the first challenge to the said first to M-th peripheral devices, the said first to M-th peripheral devices respectively comprise the first to M-th integrated circuit (IC) chips, the said first to M-th IC chips respectively have the first to M-th specific random number, which are respectively specific to the said first to M-th IC chip, the said first to M-th peripheral devices respectively generate the first to M-th secret keys using the said first challenge and the said first to M-th specific random number, and respectively generate pairs of the first to M-th public keys and the said first to M-th secret keys, using the said first to M-th secret keys, wherein, one of the first to M-th IC chip is chosen as the n-th IC chip, the said n-th IC chip has cell array, row decoder, peripheral controller, code generator, specific inner memory, and external input-output, wherein, the said cell array is divided into the first and second cell arrays, the said row decoder is divided into the first and second row decoders, wherein, the said first and second row decoders respectively control access to the said first and second cell arrays, the said external input-output receives the code of retrieving redundancy mode and the said first challenge from the external, the said peripheral controller receives the said code of retrieving redundancy mode and the said challenge from the said external input-output, controls the said first and second row decoders based on the said code of retrieving redundancy mode, and retrieves the n-th specific random number from the access to the said first and second cell arrays based on the n-th redundancy code stored in the said specific inner memory, wherein, the said code of retrieving redundancy mode has the setting option of authentication, the mode of indicating exclusive column, the access option, and the operation option, wherein, the said mode of indicating exclusive column has an indicated column number as an argument, the said setting option of authentication comprises authentication mode and non-authentication mode, the said indicated column number indicates an exclusive authentication column and the said exclusive authentication column is selected as a selected column, if the said authentication mode is chosen, a column other than the said indicated column number is chosen as a selected column, if the said non-authentication mode is chosen, the said access option chooses the set of the said first and second row decoders, and then instructs access to addresses defined by the said set of the said first and second row decoders and the said chosen column, the said operation option has those of write, erase and read at the said bit address, the said peripheral controller reads the said n-th specific random number from the said cell array, based on the said n-th redundancy code, by switching the set of the said access option and the said operation option, if the said authentication mode is chosen.

16. The digital communication system as claimed in claim 15, wherein, a row line with a failure bit which can be distributed on the said cell array is a failure row line, a row line without the said failure bit is a regular row line, the said n-th redundancy code relates to the distribution of the said failure row lines.

17. A digital communication system comprising:

a network of electronic apparatuses, which comprises plural electronic apparatuses, wherein, the first electronic apparatus is an inspector and the second electronic apparatus is an inspection device among the said plural electronic apparatuses, the said inspector inputs a challenge to the said second electronic apparatus, the said second electronic apparatus generates a response in response to the said challenge based on a response function, the said second electronic apparatus has at least one integrated circuit (IC) chip, the said IC chip has cell array, row decoder, peripheral controller, code generator, specific inner memory, and external input-output, wherein, the said cell array is divided into the first and second cell arrays, the said row decoder is divided into the first and second row decoders, wherein, the said first and second row decoders respectively control access to the said first and second cell arrays, the said peripheral controller receives the code of retrieving redundancy mode and the said challenge from the said external input-output, controls the said first and second row decoders based on the said code of retrieving redundancy mode, forwards the said challenge to the said code generator, retrieves a specific random number, which is specific to the said IC chip, from the access to the said first and second cell arrays based on the redundancy code stored in the said specific inner memory, the code generator generates the said response using the said challenge and the said specific random number, the said external input-output receives input of the said code of retrieving redundancy mode and the said challenge from the external, receives the said response from the said code generator, and outputs the said response to the external of the said IC chip, the said code of retrieving redundancy mode has the setting option of authentication, the mode of indicating exclusive bit, the access option, and the operation option, wherein, the said cell array is divided into plural subblocks, the said IC chip, further, has the table of cell block addresses, the said table of cell block addresses is the correspondence table of an arbitrary address on the said cell array and a set of subblock addresses and inner addresses inside a subblock, the said mode of indicating exclusive bit has an indicated bit address as an argument, the said indicated bit address is an exclusive authentication bit inside the said subblock, the said setting option of authentication comprises authentication mode and non-authentication mode, the said exclusive authentication bit is selected as a selected bit address inside the said subblock if the said authentication mode is chosen, a bit other than the said exclusive authentication bit is selected as a selected bit address inside the said subblock if the said non-authentication mode is chosen, the said access option controls the set of the said column decoder and the said first and second row decoders, instructs access to each bit address on the said cell array, the said operation option has those of write, erase and read at the said each of bit address, the said peripheral controller reads the said specific random number from the said cell array, based on the said redundancy code, by switching the set of the said access option and the said operation option, if the said authentication mode is chosen, the said response function generates the said response using the said challenge and the said specific random number that is specific to the said IC chip as arguments.

18. The digital communication system as claimed in claim 17, wherein,
a subblock with a failure bit which can be distributed on the said cell array among the said plural subblocks is a failure subblock,
a subblock with no address of the said failure bit is a regular subblock,
the said redundancy code relates to the distribution of the said failure subblocks.

19. A digital communication system comprising:
a network of electronic apparatuses, which comprises plural electronic apparatuses, wherein,
the first electronic apparatus is an inspector and the second electronic apparatus is an inspection device among the said plural electronic apparatuses,
the said inspector inputs a challenge to the said second electronic apparatus,
the said second electronic apparatus generates a response in response to the said challenge based on a response function,
the said second electronic apparatus has at least one integrated circuit (IC) chip,
the said IC chip has cell array, row decoder, peripheral controller, code generator, specific inner memory, and external input-output, wherein,
the said cell array is divided into the first and second cell arrays,
the said row decoder is divided into the first and second row decoders, wherein,
the said first and second row decoders respectively control access to the said first and second cell arrays,
the said peripheral controller receives the code of retrieving redundancy mode and the said challenge from the said external input-output, controls the said first and second row decoders based on the said code of retrieving redundancy mode, forwards the said challenge to the said code generator, retrieves a specific random number, which is specific to the said IC chip, from the access to the said first and second cell arrays based on the redundancy code stored in the said specific inner memory,
the code generator generates the said response using the said challenge and the said specific random number,
the said external input-output receives input of the said code of retrieving redundancy mode and the said challenge from the external, receives the said response from the said code generator, and outputs the said response to the external of the said IC chip,
the said code of retrieving redundancy mode has the setting option of authentication, the mode of indicating exclusive column, the access option, and the operation option, wherein,
the said mode of indicating exclusive column has an indicated column number as an argument,
the said setting option of authentication comprises authentication mode and non-authentication mode,
the said indicated column number indicates an exclusive authentication column and the said exclusive authentication column is selected as a selected column,
if the said authentication mode is chosen, a column other than the said indicated column number is chosen as a selected column, if the said non-authentication mode is chosen,
the said access option chooses the set of the said first and second row decoders, and then instructs access to addresses defined by the said set of the said first and second row decoders and the said chosen column,
the said operation option has those of write, erase and read at the said bit address, the said peripheral controller reads the said specific random number from the said cell array, based on the said redundancy code, by switching the set of the said access option and the said operation option, if the said authentication mode is chosen,
the said response function generates the said response using the said challenge and the said specific random number that is specific to the said IC chip as arguments.

20. The digital communication system as claimed in claim 19, wherein,
a row line with a failure bit which can be distributed on the said cell array is a failure row line,
a row line without the said failure bit is a regular row line,
the said redundancy code relates to the distribution of the said failure row lines.

21. A digital communication system comprising:
a network of electronic apparatuses, which comprises plural electronic apparatuses, wherein,
M of the said plural electronic apparatuses are the first to M-th inspection devices,
at least one of the others among the said plural electronic apparatuses is an inspector,
the said first to M-th inspection devices are the first to M-th peripheral devices, respectively,
the said inspector inputs the first challenge to the said first to M-th peripheral devices,
the said first to M-th peripheral devices respectively return the first to M-th responses to the said inspector in response to the said first challenge according to a response function,
the said first to M-th responses form the first response set, which comprises the said first to M-th responses,
the said inspector stores the said first challenge and the said first response set,
the said first peripheral device receives the second challenge to be sent from the said inspector, generates the (M+1)-th response based on the said response function, and generates the pair of the (M+1)-th secret key and the (M+1)-th public key using the said (M+1)-th response,
the said second peripheral device receives the said second challenge, generates the (M+2)-th response based on the said response function, and generates the pair of the (M+2)-the secret key and the (M+P2)-th public key using the said (M+2)-th response,
the said first to M-th peripheral devices respectively comprise the first to M-th integrated circuit (IC) chips,
the said response function has the arguments, the said first challenge as well as the specific random numbers that are respectively specific to the said first to M-th IC chips, and respectively generates the said first to M-th responses,
the said response function generates the said (M+1)-th response using the said second challenge and the specific random number that is specific to the said first IC chip to which the said second challenge was input as the arguments,
the said response function generates the said (M+2)-th response using the said second challenge and the specific random number that is specific to the said second IC chip to which the said second challenge was input as the arguments, the said (M+1)-th public key or a code information generated from the said (M+1)-th public key serves as the (M+1)-th logical address, the said (M+2)-th public key or a code information generated from the said (M+2)-th public key serves as the (M+2)-th logical address, the said first and second IC chips configure a part of the Merkle tree of IC chips by transferring data from the said (M+I)-th logical address to the (M+2)-th logical address, one of the first to M-th IC chips serves as the root of the said Merkle tree, and the said Merkle tree is the Merkle tree of IC chips.

22. A digital communication system comprising:

a network of electronic apparatuses, which comprises plural electronic apparatuses, wherein, M of the said plural electronic apparatuses are the first to M-th inspection devices, at least two of the others of the said plural electronic apparatuses are the first and second inspectors, the said first to M-th inspection devices are respectively the first to M-th peripheral devices, the said first inspector inputs the first challenge to the said first to M-th peripheral devices, the said first to M-th peripheral devices respectively respond the first to M-th responses to the said first inspector in response to the said first challenge according to a response function, the said first to M-th responses form the first response set, which comprises the said first to M-th responses, the said first inspector stores the said first challenge and the said first response set, the said first peripheral device receives the second challenge to be sent from the said second inspector, generates the (M+1)-th response, and generates the pair of the (M+1)-th secret key and the (M+1)-th public key using the said (M+1)-th response, the said second peripheral device receives the said second challenge, generates the said (M+2)-th response based on the said response function, and generates the pair of the (M+2)-th secret key and the (M+2)-th public key using the said (M+2)-th response, said first to M-th peripheral devices respectively comprise the first to M-th integrated circuit (IC) chips, the said response function has the arguments, the said first challenge as well as the specific random numbers that are respectively specific to the said first to M-th IC chips, and respectively generates the said first to M-th responses, the said response function generates the said (M+1)-th response using the said second challenge and the specific random number that is specific to the first IC chip to which the said second challenge was input as the arguments, the said response function generates the said (M+2)-th response using the said second challenge and the specific random number that is specific to the second IC chip to which the said second challenge was input as the arguments, the said (M+1)-th public key or a code information generated from the said (M+1)-th public key serves as the (M+1)-th logical address, the said (M+2)-th public key or a code information generated from the said (M+2)-th public key serves as the (M+2)-th logical address, the said first and second IC chips configure a part of the Merkle tree of IC chips by transferring data from the said (M+1)-th logical address to the (M+2)-th logical address, one of the first to M-th IC chip serves as the root of the said Merkle tree, and the said Merkle tree is the Merkle tree of IC chips.

* * * * *